(12) United States Patent
Saarenvirta

(10) Patent No.: US 11,887,138 B2
(45) Date of Patent: Jan. 30, 2024

(54) SYSTEM AND METHOD FOR RETAIL PRICE OPTIMIZATION

(71) Applicant: Daisy Intelligence Corporation, Toronto (CA)

(72) Inventor: Kari Saarenvirta, Toronto (CA)

(73) Assignee: Daisy Intelligence Corporation, Toronto (CA)

( * ) Notice: Subject to any disclaimer, the term of this patent is extended or adjusted under 35 U.S.C. 154(b) by 177 days.

(21) Appl. No.: 16/807,214

(22) Filed: Mar. 3, 2020

(65) Prior Publication Data

US 2021/0279753 A1 Sep. 9, 2021

(51) Int. Cl.
  *G06Q 30/0201* (2023.01)
  *G06Q 10/067* (2023.01)

(52) U.S. Cl.
  CPC ....... *G06Q 30/0206* (2013.01); *G06Q 10/067* (2013.01)

(58) Field of Classification Search
  None
  See application file for complete search history.

(56) References Cited

U.S. PATENT DOCUMENTS

| | | |
|---|---|---|
| 5,920,848 A | 7/1999 | Schutzer et al. |
| 5,926,798 A | 7/1999 | Carter |
| 5,953,707 A | 9/1999 | Huang et al. |
| 6,029,139 A | 2/2000 | Cunningham et al. |
| 6,032,146 A | 2/2000 | Chadha et al. |

(Continued)

FOREIGN PATENT DOCUMENTS

| | | | | |
|---|---|---|---|---|
| CA | 2982930 A1 | 4/2019 | | |
| CN | 111369108 A | * 7/2020 | ....... | G06Q 10/06315 |

(Continued)

OTHER PUBLICATIONS

N. Gun and B. Badur, "Assortment planning using data mining algorithms," PICMET '08—2008 Portland International Conference on Management of Engineering & Technology, 2008, pp. 2312-2322, doi: 10.1109/PICMET.2008.4599855 (Year: 2008).*

(Continued)

*Primary Examiner* — Shelby A Turner
(74) *Attorney, Agent, or Firm* — BERESKIN & PARR LLP/S.E.N.C.R.L. s.r.l; Isis E. Caulder; Paul Blizzard

(57) ABSTRACT

A computer system and computer-implemented method for retail merchandise planning, including promotional product selection, price optimization and planning. According to one or more embodiments, the computer system for generating an electronic retail plan for a retailer comprises, a data staging module configured to input retail sensory data from one or more computer systems associated with the retailer; a data processing module configured to pre-process the inputted retail sensory data; a data warehouse module configured to store the inputted retail sensory data and the pre-processed retail sensory data; a state model module configured to generate a retailer state model for modeling operation of the retailer based on the retail sensory data; a calibration module configured to calibrate the state model module according to one or more control parameters; and an output module for generating an electronic retail plan for the retailer based on the retailer state model.

12 Claims, 43 Drawing Sheets

(56) References Cited

U.S. PATENT DOCUMENTS

| | | | |
|---|---|---|---|
| 6,119,101 A | 9/2000 | Peckover | |
| 6,366,890 B1 | 4/2002 | Usrey | |
| 6,401,080 B1 | 6/2002 | Bigus et al. | |
| 6,609,101 B1 | 8/2003 | Landvater | |
| 6,892,376 B2 | 5/2005 | McDonald et al. | |
| 6,910,017 B1 | 6/2005 | Woo et al. | |
| 7,024,592 B1 | 4/2006 | Voas et al. | |
| 7,069,560 B1 | 6/2006 | Cheyer et al. | |
| 7,130,811 B1 | 10/2006 | Delurgio et al. | |
| 7,249,031 B2 | 7/2007 | Close et al. | |
| 7,249,032 B1 | 7/2007 | Close et al. | |
| 7,249,033 B1 | 7/2007 | Close et al. | |
| 7,302,410 B1 | 11/2007 | Venkatraman et al. | |
| 7,379,890 B2 | 5/2008 | Myr et al. | |
| 7,480,623 B1 | 1/2009 | Landvater | |
| 7,523,047 B1 | 4/2009 | Neal et al. | |
| 7,668,769 B2 | 2/2010 | Baker et al. | |
| 7,672,866 B2 | 3/2010 | Venkatraman et al. | |
| 7,752,067 B2 | 7/2010 | Fotteler et al. | |
| 8,010,404 B1* | 8/2011 | Wu | G06Q 30/0242 705/7.29 |
| 8,370,184 B2 | 2/2013 | Fotteler et al. | |
| 8,370,185 B2 | 2/2013 | Fotteler et al. | |
| 8,620,722 B2 | 12/2013 | Kettner et al. | |
| 8,639,548 B2 | 1/2014 | Fotteler et al. | |
| 8,639,558 B2* | 1/2014 | Desai | G06Q 30/02 705/7.29 |
| 9,940,649 B2 | 4/2018 | Rosenberg | |
| 10,074,142 B1 | 9/2018 | Rozenson | |
| 10,141,780 B2 | 11/2018 | Sun et al. | |
| 10,147,065 B1 | 12/2018 | Yiftachel et al. | |
| 10,567,402 B1 | 2/2020 | Comeaux et al. | |
| 10,621,533 B2 | 4/2020 | Saarenvirta | |
| 10,629,191 B1 | 4/2020 | Cheng et al. | |
| 10,832,251 B1 | 11/2020 | Pike et al. | |
| 10,878,460 B2 | 12/2020 | Genc-Kaya et al. | |
| 11,468,387 B2 | 10/2022 | Saarenvirta | |
| 11,562,386 B2 | 1/2023 | Saarenvirta | |
| 2002/0069134 A1 | 6/2002 | Solomon | |
| 2002/0116349 A1 | 8/2002 | Batachia et al. | |
| 2002/0147630 A1 | 10/2002 | Rose et al. | |
| 2003/0149578 A1 | 8/2003 | Wong | |
| 2003/0187708 A1 | 10/2003 | Baydar et al. | |
| 2003/0229502 A1 | 12/2003 | Woo | |
| 2003/0233305 A1 | 12/2003 | Solomon | |
| 2004/0059549 A1 | 3/2004 | Kropaczek et al. | |
| 2004/0205034 A1 | 10/2004 | Bigus et al. | |
| 2005/0091147 A1 | 4/2005 | Ingargiola et al. | |
| 2005/0125768 A1 | 6/2005 | Wong et al. | |
| 2005/0144218 A1 | 6/2005 | Heintz | |
| 2005/0189414 A1* | 9/2005 | Fano | G06Q 30/02 705/14.27 |
| 2005/0197882 A1 | 9/2005 | Fotteler et al. | |
| 2005/0197886 A1 | 9/2005 | Veit | |
| 2005/0197899 A1 | 9/2005 | Veit et al. | |
| 2005/0197901 A1 | 9/2005 | Veit et al. | |
| 2005/0197928 A1 | 9/2005 | Fotteler et al. | |
| 2005/0234696 A1 | 10/2005 | North et al. | |
| 2005/0256787 A1 | 11/2005 | Wadawadigi et al. | |
| 2005/0267807 A1 | 12/2005 | Bentley | |
| 2005/0273376 A1* | 12/2005 | Ouimet | G06Q 10/04 705/7.29 |
| 2005/0288993 A1 | 12/2005 | Weng et al. | |
| 2006/0020866 A1 | 1/2006 | Lo et al. | |
| 2006/0155660 A1 | 7/2006 | Koshizen et al. | |
| 2007/0033098 A1 | 2/2007 | Peters et al. | |
| 2007/0143186 A1 | 6/2007 | Apple et al. | |
| 2007/0192168 A1 | 8/2007 | Van Luchene | |
| 2007/0282668 A1 | 12/2007 | Cereghini et al. | |
| 2007/0282684 A1 | 12/2007 | Prosser et al. | |
| 2007/0294736 A1 | 12/2007 | Brady et al. | |
| 2008/0065476 A1 | 3/2008 | Klein et al. | |
| 2008/0077459 A1 | 3/2008 | Desai et al. | |
| 2008/0235076 A1 | 9/2008 | Cereghini et al. | |
| 2008/0288354 A1 | 11/2008 | Flinn et al. | |
| 2009/0070129 A1 | 3/2009 | Inbar et al. | |
| 2009/0112608 A1 | 4/2009 | Abu-Hakima et al. | |
| 2009/0138365 A1 | 5/2009 | Mueller et al. | |
| 2009/0249287 A1 | 10/2009 | Patrick | |
| 2009/0259516 A1 | 10/2009 | Zeevi et al. | |
| 2009/0271245 A1 | 10/2009 | Joshi et al. | |
| 2009/0327476 A1 | 12/2009 | Grell et al. | |
| 2010/0100418 A1 | 4/2010 | Richter et al. | |
| 2010/0106561 A1* | 4/2010 | Peredriy | G06Q 10/04 705/7.31 |
| 2010/0145773 A1* | 6/2010 | Desai | G06Q 30/0201 705/7.29 |
| 2010/0169114 A1 | 7/2010 | Henderson et al. | |
| 2010/0205044 A1 | 8/2010 | Scheer | |
| 2010/0217702 A1 | 8/2010 | Tu | |
| 2010/0235231 A1 | 9/2010 | Jewer et al. | |
| 2010/0287029 A1* | 11/2010 | Dodge | G06Q 30/02 705/7.31 |
| 2010/0318403 A1 | 12/2010 | Bottom | |
| 2010/0324941 A1 | 12/2010 | Stevenson et al. | |
| 2011/0107260 A1 | 5/2011 | Park et al. | |
| 2011/0153386 A1* | 6/2011 | Kim | G06Q 10/04 705/348 |
| 2012/0226613 A1 | 9/2012 | Adjaoute | |
| 2012/0245887 A1 | 9/2012 | Spears et al. | |
| 2013/0145174 A1 | 6/2013 | Hallum et al. | |
| 2013/0218498 A1 | 8/2013 | Droit et al. | |
| 2013/0325596 A1 | 12/2013 | Ouimet | |
| 2014/0058763 A1 | 2/2014 | Zizzamia et al. | |
| 2014/0222594 A1* | 8/2014 | Rose | G06Q 20/385 705/16 |
| 2014/0278479 A1 | 9/2014 | Wang et al. | |
| 2014/0314225 A1 | 10/2014 | Riahi et al. | |
| 2015/0032512 A1* | 1/2015 | Bateni | G06Q 30/0206 705/7.35 |
| 2015/0046332 A1 | 2/2015 | Adjaoute | |
| 2015/0081393 A1 | 3/2015 | Cohen et al. | |
| 2015/0161622 A1 | 6/2015 | Hoffmann et al. | |
| 2015/0195300 A1 | 7/2015 | Adjaoute | |
| 2015/0227951 A1 | 8/2015 | Hawley et al. | |
| 2015/0242947 A1 | 8/2015 | Wilson et al. | |
| 2015/0324828 A1 | 11/2015 | Ouimet | |
| 2015/0324884 A1 | 11/2015 | Ouimet | |
| 2015/0339672 A1 | 11/2015 | Adjaoute | |
| 2015/0379510 A1 | 12/2015 | Smith | |
| 2016/0055427 A1 | 2/2016 | Adjaoute | |
| 2016/0148227 A1 | 5/2016 | Choe et al. | |
| 2016/0180222 A1 | 6/2016 | Sierhuis et al. | |
| 2017/0004430 A1 | 1/2017 | Auradkar et al. | |
| 2017/0032400 A1 | 2/2017 | Gilmore et al. | |
| 2017/0116549 A1* | 4/2017 | Sunshine | G06Q 10/087 |
| 2017/0221086 A1 | 8/2017 | Zhou et al. | |
| 2017/0236153 A1 | 8/2017 | Ouimet | |
| 2017/0249648 A1 | 8/2017 | Garvey et al. | |
| 2017/0270582 A1 | 9/2017 | Forss | |
| 2017/0337198 A1 | 11/2017 | Saha et al. | |
| 2017/0357563 A1 | 12/2017 | Shah | |
| 2018/0033059 A1 | 2/2018 | Katsuki et al. | |
| 2018/0053114 A1 | 2/2018 | Adjaoute | |
| 2018/0060964 A1 | 3/2018 | Arora et al. | |
| 2018/0101876 A1 | 4/2018 | Rosenberg et al. | |
| 2018/0121988 A1 | 5/2018 | Hiranandani et al. | |
| 2018/0225607 A1 | 8/2018 | Girishankar et al. | |
| 2018/0293640 A1 | 10/2018 | Krappe | |
| 2018/0300337 A1 | 10/2018 | Thomas et al. | |
| 2019/0079958 A1 | 3/2019 | Bentley et al. | |
| 2019/0084420 A1 | 3/2019 | Kim et al. | |
| 2019/0114655 A1 | 4/2019 | Saarenvirta | |
| 2019/0114687 A1 | 4/2019 | Krishnamurthy et al. | |
| 2019/0130407 A1 | 5/2019 | Adjaoute | |
| 2019/0156357 A1* | 5/2019 | Palinginis | G06K 9/6218 |
| 2019/0189132 A1 | 6/2019 | Viswanathan | |
| 2019/0197441 A1 | 6/2019 | Park et al. | |
| 2019/0219993 A1 | 7/2019 | Jin et al. | |
| 2019/0220793 A1 | 7/2019 | Saarenvirta | |
| 2019/0228329 A1* | 7/2019 | Utsumi | G06Q 30/0202 |
| 2019/0259033 A1 | 8/2019 | Reddy et al. | |
| 2019/0318035 A1 | 10/2019 | Blanco et al. | |
| 2019/0362380 A1 | 11/2019 | Kochar et al. | |

(56) References Cited

U.S. PATENT DOCUMENTS

| | | | |
|---|---|---|---|
| 2021/0133752 | A1 | 5/2021 | Harris et al. |
| 2021/0173377 | A1 | 6/2021 | Aftchiev et al. |
| 2021/0217409 | A1 | 7/2021 | Choi et al. |
| 2021/0312488 | A1* | 10/2021 | Wick ............... G06Q 30/0206 |
| 2022/0237620 | A1 | 7/2022 | Saarenvirta |

FOREIGN PATENT DOCUMENTS

| | | | | |
|---|---|---|---|---|
| CN | 111539733 | A | | 8/2020 |
| GB | 2380000 | A | * 3/2003 | ............ G06Q 30/06 |
| GB | 2380000 | A | | 3/2003 |
| WO | 2005/089289 | A2 | | 9/2005 |
| WO | 2010/068551 | A1 | | 6/2010 |
| WO | 2013003064 | A1 | | 1/2013 |
| WO | 2016/137443 | A1 | | 9/2016 |

OTHER PUBLICATIONS

D. Schwalb, M. Faust, J. Krueger and H. Plattner, "Leveraging in-memory technology for interactive analyses of point-of-sales data,"2014 IEEE 30th International Conference on Data Engineering Workshops, 2014, pp. 97-102, doi: 10.1109/ICDEW.2014.6818311 (Year: 2014).*

A. H. Kopap and E.—E. Elfakharany, "Association and Classification Analysis in Retail Case Study," 2013 23rd International Conference on Computer Theory and Applications (ICCTA), 2013, pp. 141-149, doi: 10.1109/ICCTA32607.2013.9529677 (Year: 2013).*

A. Loebbert and G. Finnie, "A Multi-agent Framework for Distributed Business Intelligence Systems," 2012 45th Hawaii International Conference on System Sciences, Maui, HI, USA, 2012, pp. 4129-4137, doi: 10.1109/HICSS.2012.68 (Year: 2012).*

Final Office Action and Notice of References Cited dated May 12, 2021 in U.S. Appl. No. 16/587,960 (50 pages).

Final Office Action and Notice of References Cited dated Jul. 7, 2021 in U.S. Appl. No. 16/834,628 (51 pages).

"Autoencoder", Wikipedia, archives org, Jul. 20, 2017 <https://web.archive.org/web/20170720143217/https://en.wikipedia.org/wiki/Autoencoder> (4-5 pages).

Extended European Search Report dated Jul. 16, 2021 in EP Patent Application No. 21160557.1 (9 pages).

Final Office Action and Notice of References Cited dated May 14, 2020 in related U.S. Appl. No. 15/795,821 (39 pages).

Non-final Office Action and Notice of References Cited dated Apr. 6, 2021 in U.S. Appl. No. 15/795,821 (51 pages).

Saarenvirta, "Evaluation of Turbulence Models for Internal Flows", Thesis for Degree of Master of Applied Science, Dept. of Aerospace Science and Engineering, University of Toronto, 2002, published 2003. (187 pages).

Notices of Allowance and References Cited dated Oct. 17, 2019 in U.S. Appl. No. 15/872,530. (21 pages).

Non-final Office Action and Notice of References Cited dated Feb. 3, 2020 in U.S. Appl. No. 15/795,821 (35 pages).

Non-final Office Action, Applicant Initiated Interview Summary, and Notice of References Cited dated Jan. 1, 2021 in U.S. Appl. No. 16/587,960 (46 pages).

Non-final Office Action, Applicant Initiated Interview Summary, and Notice of References Cited dated Jan. 6, 2021 in U.S. Appl. No. 16/834,628 (35 pages).

"Identity Matrix", Wikipedia, Dec. 17, 2017 <https://web.archive.org/web/20171217060011/https://en.wikipedia.org/wiki/Identity_matrix>.

Final Office Action and Notice of References Cited dated Dec. 29, 2021 in U.S. Appl. No. 15/795,821 (54 pages).

Non-final Office Action and Notice of References Cited dated Feb. 9, 2022 in U.S. Appl. No. 16/834,628 (58 pages).

Notices of Allowance and References Cited dated Jun. 1, 2022 in U.S. Appl. No. 16/587,960 (16 pages).

Irofti et al., Quick survey of graph-based fraud detection methods, Jan. 11, 2021, Arxiv.org, entire document.

Final Office Action and Notice of References Cited dated Nov. 25, 2022 in U.S. Appl. No. 17/156,025 (26 pages).

International Search Report and Written Opinion dated Apr. 14, 2022 in International Patent Application No. PCT/CA2022/050079 (14 pages).

Non-Final Office Action and Notice of References Cited dated May 11, 2022 in U.S. Appl. No. 17/156,025.

* cited by examiner

530

532

Receiving, at a first server of the plurality of enterprise servers, transaction data from the plurality of point-of-sale devices, the transaction data defined as a time series including a plurality of transaction data items corresponding to one or more previous time periods, the plurality of transaction data items comprising at least one of price data, product data, and customer data

534

Determining, at the first server, transformed transaction data based on the transaction data

536

Determining one or more features from the transformed transaction data

538

Determining one or more actionable features from the one or more features

540

Generating an electronic retail price model from the one or more actionable features

542

Selecting a selected control policy for the electronic retail price model, wherein the electronic retail price model and the selected control policy cooperate with an intelligent agent to determine an electronic retail price plan by simulating a plurality of simulated pricing decisions

```
       GROCERY
       70882039307   TOMATO SAUCE
           3 @ .75                        2.25 F
1702   4608          GARLIC
           3 @ 3 / 1.00                   1.00 F
1704       0.49 lb @   1 lb /    1.29
       4067          ZUCCHINI              .63 F
       4125094763    MJ VINEGAR
           2 @ 2.79                       5.58 F
       1121000015    TABASCO              2.99 F
       7577931116    SUGAR 2LB            2.99 F
1706   4125095231    PIE SHELLS
           1 @ 2 / 3.00                   1.50 F
       5260306570    DRINK                3.79 F
       2550000398    COFFEE               7.33 F
       *70882039313  TOMATO PASTE
           2 @ .51
           was     1.14      now          1.02 F
       *3320001110   AH BAKE SODA
1708       was      .61      now           .59 F
       *4125003620   SPAGHETTI
           2 @ 1.09
           was     2.38      now          2.18 F
       *2670011513   COCONUT OIL
           was     4.99      now          4.49 F TOTAL
                    TOTAL TAX              .00
                    TOTAL                36.34
       PAYMENTS
         CASH              TENDER        40.00
         CASH              CHANGE         3.66

NUMBER OF ITEMS              20
```

FIG. 17

| $k$-itemset | An itemset having $k$ items |
|---|---|
| $L_k$ | Set of large $k$-itemsets (those with minimum support). Each member of this set has two fields:<br>i) Itemset and<br>ii) Support count |
| $C_k$ | Set of candidate $k$-items (potentially large itemsets). Each member of this set has two fields:<br>i) Itemset and<br>ii) Support count |
| $\overline{C}_k$ | Set of candidate $k$-itemsets when the TIDs of the generating transactions are kept associated with the candidates |

FIG. 18A

1) $L_1$ = {large 1-itemsets};
2) $\overline{C}_1$ = database $\mathcal{D}$;
3) for ( $k = 2$; $L_{k-1} \neq \emptyset$; $k$++ ) do begin
4)    $C_k$ = apriori-gen($L_{k-1}$); // New candidates
5)    $\overline{C}_2$ = $\emptyset$;
6)    forall entries $t \in \overline{C}_{k-1}$ do begin
7)      // determine candidate itemsets in $C_k$ contained
      // in the transaction with identifier $t$.TID
      $C_t = \{c \in C_k \mid (c - c[k]) \in t.\text{set-of-itemsets}\} \wedge$
      $(c - c[k-1]) \in t.\text{set-of-itemsets}\}$;
     forall candidates $c \in C_t$ do
8)       c.count++;
9)
10)    if ($C_t \neq \emptyset$) then $\overline{C}_k$ += $< t.\text{TID}, C_t >$;
11)   end
12)   $L_k = \{c \in C_k \mid c.\text{count} \geq \text{minsup}\}$
13) end
14) Answer = $\bigcup_k L_k$;

FIG. 18B $$A = \begin{pmatrix} a_{11} & a_{12} & \cdots & a_{1m} \\ a_{21} & a_{22} & \cdots & a_{2m} \\ \vdots & \vdots & \vdots & \vdots \\ a_{n1} & a_{n2} & \cdots & a_{nm} \end{pmatrix}_{n \times m} = (a_{ij})_{n \times m}$$

FIG. 19

| Promotion ID for Product I | Promotional period sales for Product I | 1 period after promo sales for Product I or J | 2 periods after promo sales for Product I or J | ... | Y periods after promo sales for Product I or J |
|---|---|---|---|---|---|
| 1 | $P_{11}$ | $P_{12}$ | $P_{13}$ | ... | $P_{1Y}$ |
| 2 | $P_{21}$ | $P_{22}$ | $P_{23}$ | ... | $P_{2Y}$ |
| 3 | $P_{31}$ | $P_{32}$ | $P_{33}$ | ... | $P_{3Y}$ |
| ... | ... | ... | ... | ... | ... |
| Z | $P_{Z1}$ | $P_{Z2}$ | $P_{Z3}$ | ... | $P_{ZY}$ |

FIG. 29

Figure 31:
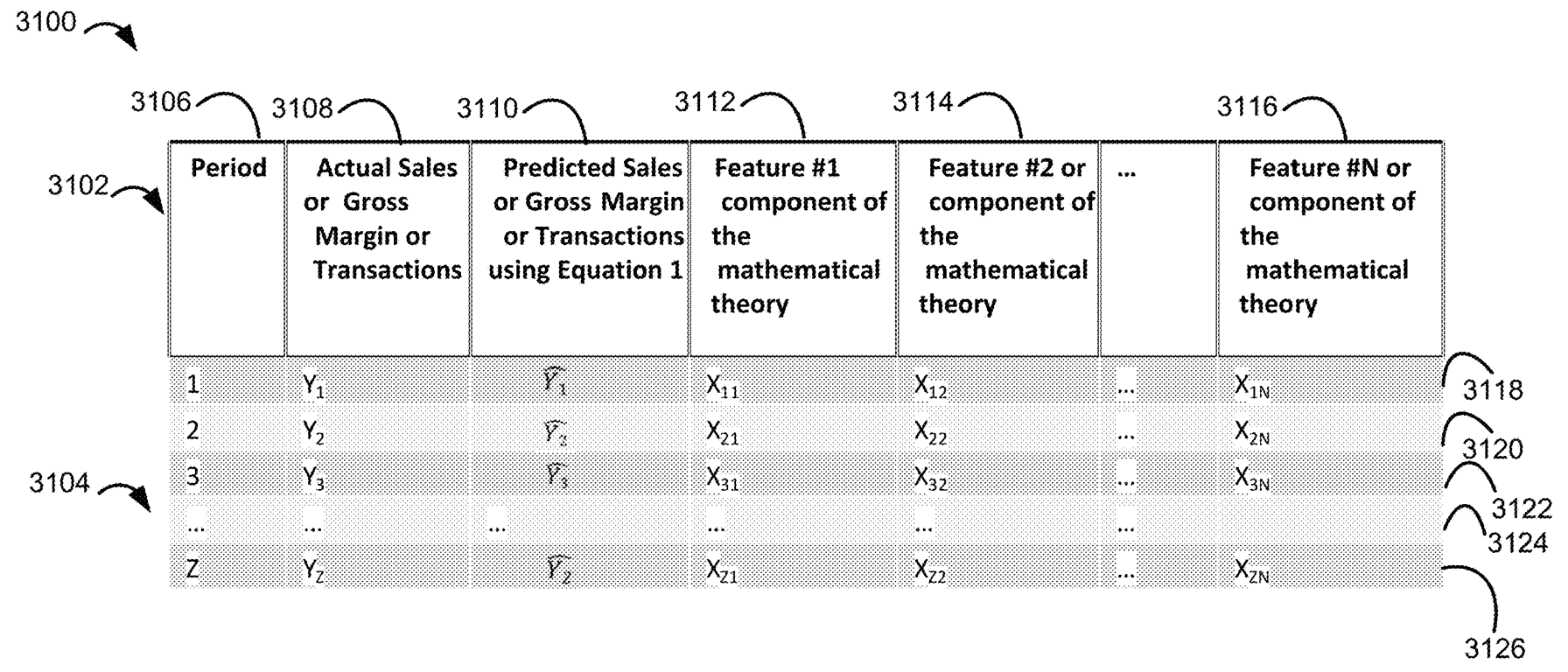

| Period | Actual Sales or Gross Margin or Transactions | Predicted Sales or Gross Margin or Transactions using Equation 1 | Feature #1 component of the mathematical theory | Feature #2 or component of the mathematical theory | ... | Feature #N or component of the mathematical theory |
|---|---|---|---|---|---|---|
| 1 | $Y_1$ | $\hat{Y}_1$ | $X_{11}$ | $X_{12}$ | ... | $X_{1N}$ |
| 2 | $Y_2$ | $\hat{Y}_2$ | $X_{21}$ | $X_{22}$ | ... | $X_{2N}$ |
| 3 | $Y_3$ | $\hat{Y}_3$ | $X_{31}$ | $X_{32}$ | ... | $X_{3N}$ |
| ... | ... | ... | ... | ... | ... | ... |
| Z | $Y_Z$ | $\hat{Y}_Z$ | $X_{Z1}$ | $X_{Z2}$ | ... | $X_{ZN}$ |

$$\varepsilon_{ij} = f(L_{ij}) \frac{\Delta Q_i/Q_i}{\Delta P_j/P_j} \Big|g, t^n, P, p \quad (1)$$

$\varepsilon_{ij}$ = price cross-elasticity between product i and j; it is simple price elasticity when i=j
g = geography
$t^n$ = time
P = price
p = promo type
Q = quantity
$L_{ij}$ = association rule lift between product i and j
$f(L_{ij})$ = linear function in $L_{ij}$; $L_{ij} = 1$ when i=j $$Q_i = f(L_{ij})Q_j \quad (2)$$

$$\Delta Q_i = Q_i^b - Q_i^a; \Delta P_i = P_i^b - P_i^a; \quad (3)$$

Where point b is the region of interest and point a is the closest known point to b. Point a is in the region of $|g,t,P,p$

FIG. 36

SYSTEM AND METHOD FOR RETAIL PRICE OPTIMIZATION

FIELD

The described embodiments relate to computer systems and more particularly, to a system and method for retail price optimization and forecasting.

BACKGROUND

Several challenges have been identified in retail price planning systems and methods.

A first challenge for retailers is that existing retail price planning systems and methods generally lack sophisticated analyses to plan prices for regularly assorted products or product promotions/markdowns. Prices are typically set using a projected cost for a given period or based on the cost of product inventory already purchased. The retailer marks up the cost to achieve a desired product gross margin. Setting prices involves the following factors: (1) manufacturers offering products at a discounted cost to the retailer, and/or discounted cost of products in exchange for advertising executed by the retailer; (2) competitor pricing on the same or similar products for those products that a retailer has competitive price information for; (3) pricing at lower target margins with a goal to clear excess or left-over product inventory; (4) considering the performance of historical price changes and the impact on the sales of the product (simple price elasticity).

A second challenge for retailers is that existing retail price planning systems and methods only consider the performance of a single product promotion, and only consider the performance of retail price promotions as isolated from one another.

Accordingly, there remains a need for improvements in the art.

SUMMARY

Provided are methods and systems for price selection and forecasting in a retail application. The price selection of a selected mix of promotional and non-promotional products may incorporate the interaction between products (affinities and cannibalization), promotional placement, recent results, recent promotions, prior time period results and prior time period promotions in the determination of a retail pricing plan for the products.

In a first aspect there is provided a method of generating an electronic retail price model and a selected control policy for retail operations performed within an enterprise network comprising a plurality of distributed computing devices, the plurality of distributed computing devices comprising a plurality of point-of-sale devices and a plurality of enterprise servers, the plurality of distributed computing devices in network communication, comprising: receiving, at a first server of the plurality of enterprise servers, transaction data from the plurality of point-of-sale devices, the transaction data defined as a time series including a plurality of transaction data items corresponding to one or more previous time periods, the plurality of transaction data items comprising at least one of price data, product data, and customer data; determining, at the first server, transformed transaction data based on the transaction data, determining one or more features from the transformed transaction data; determining one or more actionable features from the one or more features; generating an electronic retail price model from the one or more actionable features; and selecting a selected control policy for the electronic retail price model, wherein the electronic retail price model and the selected control policy cooperate with an intelligent agent to determine an electronic retail price plan by simulating a plurality of simulated pricing decisions.

In one or more embodiments, the method may further comprise: transmitting the electronic retail price model to a second server in the plurality of enterprise servers.

In one or more embodiments, the determining the one or more features from the transformed transaction data may further comprise: determining at least one of a plurality of cannibalization matrices, a plurality of cadence matrices, or a plurality of affinity matrices.

In one or more embodiments, the method may further comprise: the determining, at the first server, transformed transaction data based on the transaction data further comprises: sorting the transaction data into a first transaction set and a second transaction set; wherein the transformed transaction data may further comprise a first transaction set comprising transactions having one or more promotional products, and a second transaction set comprising transactions having one or more non-promotional products.

In one or more embodiments, the method may further comprise: sorting the first transaction set into a promoted products set, a promoted item associated product set, and an associated product set; wherein the first transaction set may comprise the promoted products set, the promoted item associated product set, and the associated product set.

In one or more embodiments, the determining the transformed transaction data may further comprise: determining one or more transaction values of the transaction data for each of the two or more previous time periods.

In one or more embodiments, the selecting the selected control policy may further comprise: executing a reward function based on the retail data for each time period in the one or more time periods; and selecting one or more coefficients that maximize the output of the reward function for the one or more time periods.

In a second aspect, there is provided a system for generating a retail price model for retail operations performed within an enterprise network comprising a plurality of distributed computing devices, the plurality of distributed computing devices comprising a plurality of point-of-sale devices and a plurality of enterprise servers, the plurality of distributed computing devices in network communication, comprising: a memory, the memory comprising: transaction data from the plurality of point-of-sale devices, the transaction data defined as a time series including a plurality of transaction data items corresponding to one or more previous time periods, the plurality of transaction data items comprising at least one of price data, product data, and customer data, a processor in communication with the memory, the processor configured to: determine transformed transaction data by determining one or more transaction values of the transaction data for each of the two or more previous time periods, determine one or more features from the transformed transaction data; determine one or more actionable features from the one or more features; generate an electronic retail price model from the one or more actionable features; store the electronic retail price model in the memory; select a selected control policy for the retail promotional model, by executing a reward function based on the retail data for each time period in the one or more time periods; and selecting one or more coefficients that maximize the output of the reward function for the one or more time periods, and store the selected control policy in the memory; wherein the electronic retail price model and the selected control policy cooperate to determine an electronic retail price plan by simulating a plurality of simulated pricing decisions.

In one or more embodiments, the processor may be further configured to: transmit, using a network interface in communication with the processor, the electronic retail price model to a second server in the plurality of enterprise servers.

In one or more embodiments, the processor may be further configured to: determine at least one of a plurality of cannibalization matrices, a plurality of cadence matrices, or a plurality of affinity matrices; and store the at least one of a plurality of cannibalization matrices, a plurality of cadence matrices, or a plurality of affinity matrices in the memory.

In one or more embodiments, the processor may be further configured to: determine, at the first server, transformed transaction data based on the transaction data further comprising: sorting the transaction data into a first transaction set and a second transaction set; wherein the transformed transaction data may further comprise a first transaction set comprising transactions having one or more promotional products, and a second transaction set comprising transactions having one or more non-promotional products.

In one or more embodiments, the processor may be further configured to: sort the first transaction set into a promoted products set, a promoted item associated product set, and an associated product set; wherein the first transaction set may comprise the promoted products set, the promoted item associated product set, and the associated product set.

In one or more embodiments, the processor may be further configured to determine the transformed transaction data further by: determining one or more transaction values of the transaction data for each of the two or more previous time periods.

In one or more embodiments, the processor may be further configured to select the selected control policy further by: executing a reward function based on the retail data for each time period in the one or more time periods; and selecting one or more coefficients that maximize the output of the reward function for the one or more time periods.

In a third aspect, there is provided a method of generating an electronic retail price plan for retail operations performed within an enterprise network comprising a plurality of distributed computing devices, the plurality of distributed computing devices comprising a plurality of point-of-sale devices and a plurality of enterprise servers, the plurality of distributed computing devices in network communication, comprising: receiving an electronic retail price model and a selected control policy; simulating, using an intelligent agent, a plurality of simulated pricing decisions at a first hierarchy level for two or more future time periods using the electronic retail price model and the selected control policy, by, determining, at the intelligent agent, for each product in the first hierarchy level, a plurality of simulated quantity forecasts corresponding to a plurality of simulated price levels; determining, at the intelligent agent, an aggregated quantity and an aggregated price corresponding to the first hierarchy level based on the electronic retail price model and the selected control policy; determining, at the intelligent agent, an item quantity and an item price for an item in the first hierarchy level based on the electronic retail price model and the selected control policy; and determining, at the intelligent agent, a simulated reward value based on the item quantity, item price, aggregated quantity and aggregated price, and generating an electronic retail price plan comprising a plurality of selected pricing decisions for two or more future time periods selected from the plurality of simulated pricing decisions, the plurality of selected pricing decisions comprising a plurality of price levels for a first product category, and a plurality of price levels for a second product category; and wherein the first product category comprises pricing decisions for one or more promotional products, and the second product category comprises pricing decisions for one or more non-promotional products.

In one or more embodiments, the method may further comprise: transmitting the electronic retail price plan to a retail pricing system within the enterprise network.

In one or more embodiments, the electronic retail price model may further comprise at least one of a plurality of cannibalization matrices, a plurality of cadence matrices, or a plurality of affinity matrices.

In one or more embodiments, the determining, at the intelligent agent, an aggregated quantity and an aggregated price corresponding to the first hierarchy level based on the electronic retail price model and the selected control policy may further comprise: determining a first hierarchy level affinity matrix based on the plurality of affinity matrices; determining a first hierarchy level cadence matrix based on the plurality of affinity matrices; determining a first hierarchy level cannibalization matrix based on the plurality of cannibalization matrices, determining the aggregated quantity based on the first hierarchy level affinity matrix, the first hierarchy level cadence matrix, and the first hierarchy level cannibalization matrix; and determining the aggregated price based on the first hierarchy level affinity matrix, the first hierarchy level cadence matrix, and the first hierarchy level cannibalization matrix.

In one or more embodiments, the determining, at the intelligent agent, an item quantity and an item price for an item in the first hierarchy level based on the electronic retail price model and the selected control policy may further comprise: determining a product affinity matrix based on the plurality of affinity matrices; determining a product cadence matrix based on the plurality of affinity matrices; determining a product cannibalization matrix based on the plurality of cannibalization matrices; determining the item quantity based on the product affinity matrix, the product cadence matrix, and the product cannibalization matrix; and determining the item price based on the product affinity matrix, the product cadence matrix, and the product cannibalization matrix.

In one or more embodiments, the method may further comprise: receiving one or more configuration inputs, the one or more configuration inputs comprising a price minimum and a price maximum; and wherein the determining the item price may further comprise: comparing the item price to the price minimum; if the item price is below the price minimum, changing the item price to the price minimum; comparing the item price to the price maximum; if the item price is above the price maximum, changing the item price to the price maximum.

In a fourth aspect, there is provided a system for generating a retail price plan for retail operations performed within an enterprise network comprising a plurality of distributed computing devices, the plurality of distributed computing devices comprising a plurality of point-of-sale devices and a plurality of enterprise servers, the plurality of distributed computing devices in network communication, comprising: a memory, the memory comprising: an intelligent agent comprising: an electronic retail price model; and a selected control policy, a processor in communication with the memory, the processor configured to: operate the intelligent agent to simulate a plurality of simulated pricing decisions at a first hierarchy level for two or more future time periods using the electronic retail price model and the selected control policy, by, determining, for each product in the first hierarchy level, a plurality of simulated quantity forecasts corresponding to a plurality of simulated price levels; and determining an aggregated quantity and an aggregated price corresponding to the first hierarchy level based on the electronic retail price model and the selected control policy; determining an item quantity and an item price for an item in the first hierarchy level based on the electronic retail price model and the selected control policy; and determining a simulated reward value based on the item quantity, item price, aggregated quantity and aggregated price, and generating an electronic retail price plan comprising a plurality of selected pricing decisions for two or more future time periods selected from the plurality of simulated pricing decisions.

In one or more embodiments, the processor may be further configured to: transmit, using a network interface in communication with the processor, the electronic retail price plan to a retail pricing system within the enterprise network.

In one or more embodiments, the electronic retail price model may further comprise at least one of a plurality of cannibalization matrices, a plurality of cadence matrices, or a plurality of affinity matrices.

In one or more embodiments, the processor may be further configured to: operate the intelligent agent to simulate a plurality of simulated pricing decisions at a first hierarchy level for two or more future time periods using the electronic retail price model and the selected control policy, by: determining an aggregated quantity and an aggregated price corresponding to the first hierarchy level based on the electronic retail price model and the selected control policy, by: determining a first hierarchy level affinity matrix based on the plurality of affinity matrices; determining a first hierarchy level cadence matrix based on the plurality of affinity matrices; determining a first hierarchy level cannibalization matrix based on the plurality of cannibalization matrices; determining the aggregated quantity based on the first hierarchy level affinity matrix, the first hierarchy level cadence matrix, and the first hierarchy level cannibalization matrix; and determining the aggregated price based on the first hierarchy level affinity matrix, the first hierarchy level cadence matrix, and the first hierarchy level cannibalization matrix.

In one or more embodiments, the processor may be further configured to: operate the intelligent agent to simulate a plurality of simulated pricing decisions at a first hierarchy level for two or more future time periods using the electronic retail price model and the selected control policy, by: determining an item quantity and an item price for an item in the first hierarchy level based on the electronic retail price model and the selected control policy, by: determining a product affinity matrix based on the plurality of affinity matrices; determining a product cadence matrix based on the plurality of affinity matrices; determining a product cannibalization matrix based on the plurality of cannibalization matrices; determining the item quantity based on the product affinity matrix, the product cadence matrix, and the product cannibalization matrix; and determining the item price based on the product affinity matrix, the product cadence matrix, and the product cannibalization matrix.

In one or more embodiments, the processor may be further configured to receive one or more configuration inputs, the one or more configuration inputs comprising a price minimum and a price maximum; and wherein the determining the item price may further comprise: comparing the item price to the price minimum; if the item price is below the price minimum, changing the item price to the price minimum; comparing the item price to the price maximum; if the item price is above the price maximum, changing the item price to the price maximum.

BRIEF DESCRIPTION OF THE DRAWINGS

FIG. 5B is a method diagram for generating an electronic retail price model according to one or more embodiments.

FIG. 10B shows a user interface diagram of an output retail price plan generated according to one or more embodiments.

FIG. 10C shows a user interface diagram of an output retail price plan generated according to one or more embodiments.

FIG. 17 shows a transaction receipt diagram indicating specific examples of sales segmentation.

FIGS. 18A to 18B shows an association rule mining diagram based on the aprioriTID algorithm.

FIG. 19 shows an example of an affinity matrix according to one or more embodiments.

FIG. 29 shows a table diagram of an example data set for determining cannibalization cadence and magnitude according to one or more embodiments.

FIG. 31 shows a table diagram of an example data set configured for determining a selected control policy according to one or more embodiments.

FIG. 36 shows a determination of cross-price elasticity. Like reference numerals indicate like or corresponding elements or components in the drawings.

DESCRIPTION OF EMBODIMENTS

Figure 1:
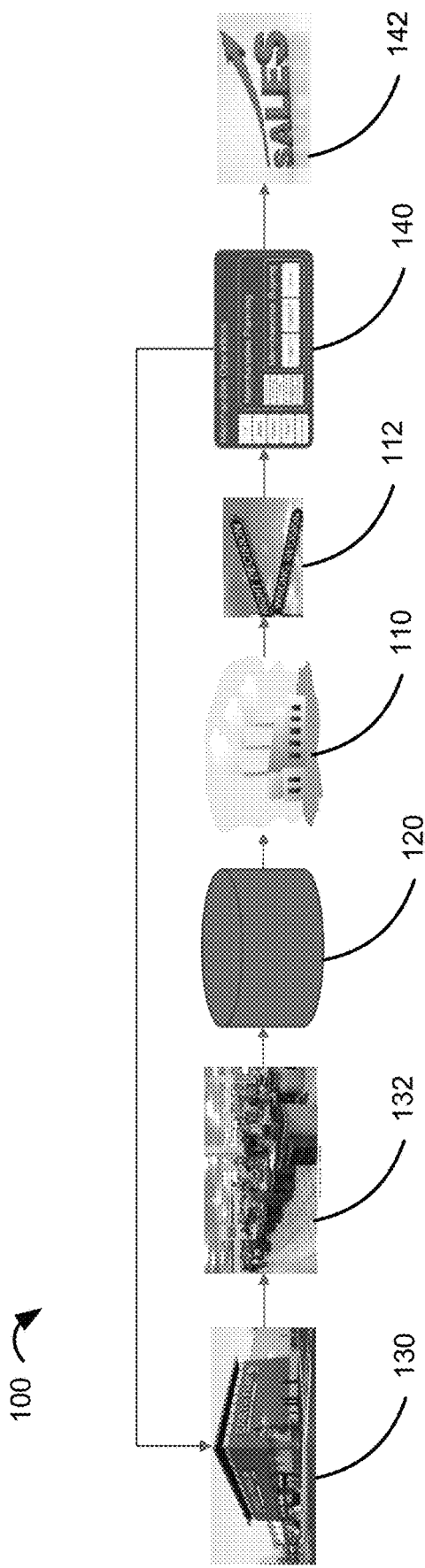
FIG. 1 is a workflow diagram of a retailer having a retail merchandise planning system according to one or more embodiments.

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example and without limitation, the programmable computers (referred to below as computing devices) may be a server, network appliance, embedded device, computer expansion module, personal computer, laptop, personal data assistant, cellular telephone, smart-phone device, tablet computer, wireless device or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and a combination thereof.

Program code may be applied to input data to perform the functions described herein and to generate output information. The output information is applied to one or more output devices, in known fashion.

Each program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloads, magnetic and electronic storage media, digital and analog signals, and the like. The computer useable instructions may also be in various forms, including compiled and non-compiled code.

Various embodiments have been described herein by way of example only. Various modification and variations may be made to these example embodiments without departing from the spirit and scope of the embodiments, which is limited only by the appended claims. Also, in the various user interfaces illustrated in the figures, it will be understood that the illustrated user interface text and controls are provided as examples only and are not meant to be limiting. Other user interface elements may be possible.

In order to address the identified problems in retail price planning, systems and methods have been developed in order to account for one or more of the following: (1) cannibalization; (2) cadence; (3) associated/halo sales; (4) promotional elasticity; (5) forward buying/pantry loading; (6) performance of recent and historical promotions and regular sales; (7) impact on long term performance of a sequence of promotions; (8) price elasticity; (9) price cross-elasticity between products.

As referred to herein, cannibalization refers to a situation where a product on promotion (i.e. with a price reduction) affects the sales of other first or second degree related products during the same promotion period. This reflects a tendency of consumers to buy the discounted product rather than competing products with higher prices. When the promotion event is over and prices return to normal, however, the effect may tend to disappear.

As referred to herein, cadence generally refers to the time period between when an item was last promoted and the currently intended promotion. Future item demand may be affected by customers who "pantry load" by stocking up on promoted items and the product lifecycle. This may be especially important with non-perishable products.

As referred to herein, associated sales or halo sales refer to the situation where other products are purchased in the same transaction as promoted products. The associated or halo products typically complete a product use case for the promoted item. For example, hot dogs and hot dog buns are a trivialized example of associated or halo products because they are commonly purchased together.

As referred to herein, promotional elasticity refers to the impact of the promotional type and placement of item within promotional advertising which impacts the sales of the promoted over its non-promoted baseline sales.

As referred to herein, forward buying or pantry loading refers to a situation where promoted product sales affect the same promoted product's future sales due to "pantry loading", i.e. situations where customers stock up on a particular product that is on sale, as well as situations affecting the future sales of $1^{st}$ and $2^{nd}$ degree related products.

The present systems and methods determine the historical performance of recent promotions and regular sales as a measure of the time series impact of recently promoted items and $1^{st}$ and $2^{nd}$ degree related items on total sales including both promoted and non-promoted items.

Referred to herein, price elasticity of a product is the ratio of % change in quantity sold divided by the % change in price. This ratio may vary based on time of year, geographic location, whether or not price change was advertised, customer purchasing the product, and the reference price point. Price elasticity is a measure of how much price changes will affect the quantity of products sold. For example, consider two retail products A and B. Price cross-elasticity is the impact of a price change on product A to the quantity of product B sold.

Reference is made to FIG. 1, showing a workflow diagram 100 of a retailer having a retail merchandise planning system according to one or more embodiments. As shown in FIG. 1, the workflow 100 of a retail merchandise planning system comprises one or more retail stores or online retailers 130, a plurality of point-of-sale devices 132, a retail database 120, one or more retail merchandise planning systems 110, a retail plan 112, a retail operations interface 140, and a retail sales report 142.

The one or more of retail stores or online retailers 130 may be traditional "brick and mortar" retailers, web-based retailers, or other retailer entities. The retailer 130 may have one or more stores, locations, kiosks, etc. The one or more retail stores or online retailer 130 may have a plurality of point-of-sale devices 132 for processing payment for transactions.

The plurality of point-of-sale devices 132 (or transaction processing software in the case of online retailers), may collect transaction data. The transaction data may be transmitted to a retail database 120 from the plurality of point of sale devices 132 (or transmitted from a server forming part of the retailer's transaction processing system).

The retail database 120 may store transaction data including customer data, transactions, price information for products, product information, and promotional information. The retail database 120 may further store point-of-sale transaction logs including, but not limited to, receipt information from the plurality of point-of-sale devices.

The retail database 120 may be queried by the processing facility 110 for the customer data, transaction data, price data, and promotion data as described herein.

The retail merchandise planning system 110 may comprise a plurality of servers and/or processors implemented in hardware and/or software that are configured to process the transaction data and generate retail merchandise operational plans, sales/margins results measurements and forecasts, and an electronic retail price plan 112 for one or more of the retailers.

The retail merchandise planning system 110 may create and send the electronic retail price plan 112 to a retail operations interface 140. The retail operations interface 140 may be a user interface where a user interacts with enterprise retail systems of the retailer to make adjustments to the product inventory, product prices, promotions, marketing systems, etc. The retail operations interface 140 may apply changes to the one or more retail stores 130, and may form a closed control loop as shown, and may use the retail price plan 112 as control inputs for the management of the retail operations of the one or more retail stores 130.

In one embodiment the retail operations interface 140 may be a software application that a user may use to implement the recommendations of the electronic retail price plan 112.

In another embodiment, the retail operations interface 140 may have an Application Programming Interface (API) that the retail merchandise planning system 110 may use to directly apply the recommended actions in the electronic retail price plan 112.

The retail sales report 142 may be generated by the retail operations interface 140, and may generally inform an organization about the various aspects of the sales of products or services at the one or more retail stores 130.

Figure 2A:
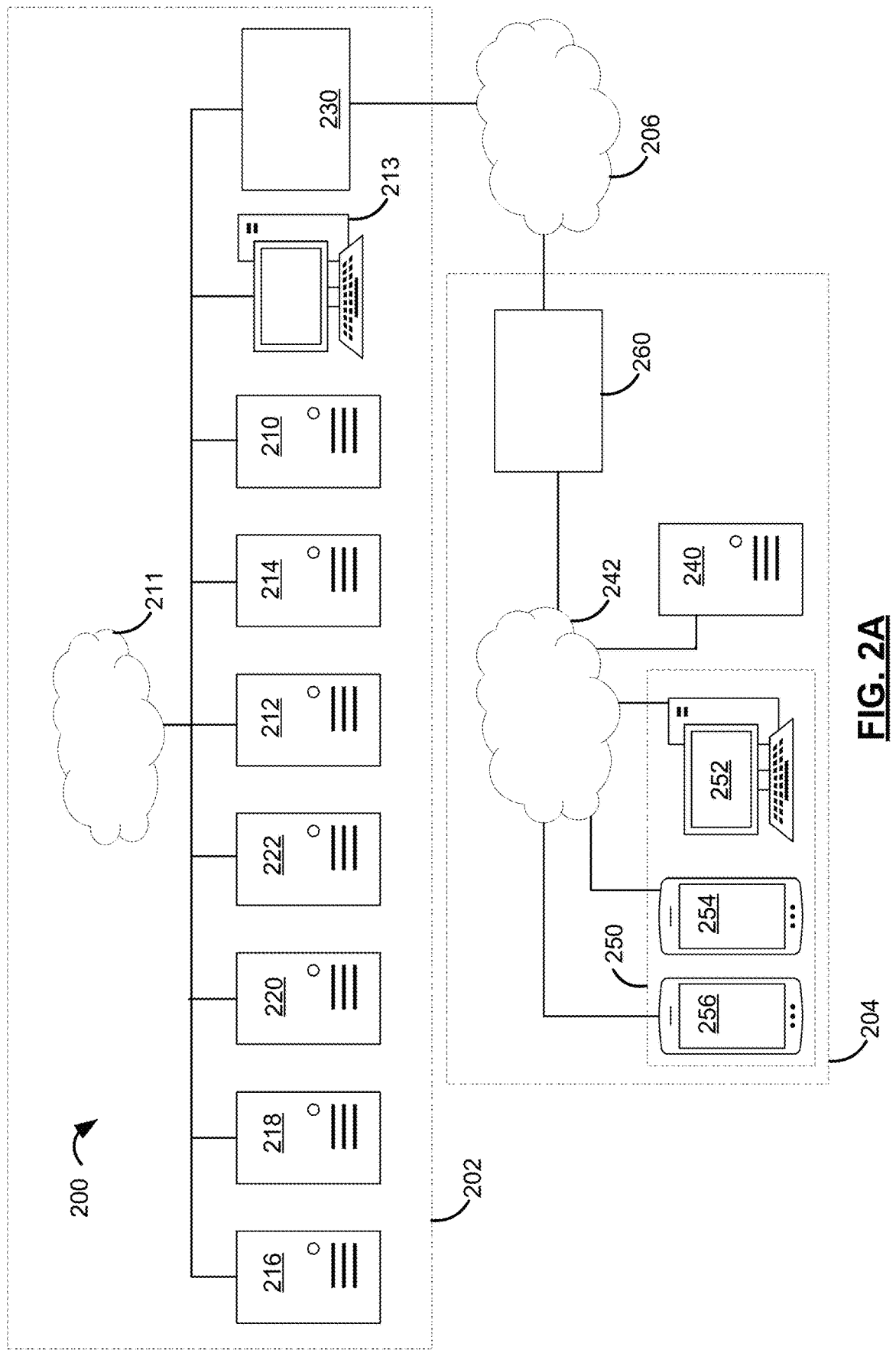
FIG. 2A is a system diagram for the retail merchandise price planning system of FIG. 1 according to one or more embodiments.

Reference is next made to FIG. 2A, which shows a system diagram of retail merchandise planning system 200. The system 200 comprises a retail planning system 202 and a retailer system 204.

The retail planning system 202 comprises a control server 210, a data warehouse server 212, a web server 214, an ETL ("Extract, Transform, Load") server 216, a reporting server 218, one or more computational servers 220 and a metadata server 222. The servers and devices of the retail planning system 202 may be coupled through a network 211, or another communication mechanism, for example, an Ethernet network.

Network 211 may be any network or network components capable of carrying data including Ethernet, fiber optics, satellite, mobile, wireless (e.g. Wi-Fi, WiMAX), SS7 signaling network, fixed line, local area network (LAN), wide area network (WAN), a direct point-to-point connection, mobile data networks (e.g., Universal Mobile Telecommunications System (UMTS), 3GPP Long-Term Evolution Advanced (LTE Advanced), Worldwide Interoperability for Microwave Access (WiMAX), etc.) and others, including any combination of these.

The retail planning system 202 may further be coupled to the network 206 via firewall 230.

The control server 210, data warehouse server 212, web server 214, ETL server 216, reporting server 218, one or more computational servers 220 and a metadata server 222 may be commercial off-the-shelf servers, may be virtual servers or containers, or may run on a cloud provider such as Amazon® Web Services (AWS®). These servers may be implemented separately on their own server (virtual, physical or container), or the functionality of two or more servers may be combined and provided by the server (virtual, physical or container). Each of the servers may comprise computer hardware and stored program code/software to perform the processes and functions associated with core computer system functions, and the processes and operations according to embodiments herein.

In an alternate embodiment, the control server 210, the data warehouse server 212, the web server 214, the ETL server 216, the reporting server 218, the one or more computational servers 220 and the metadata server 222 may reside at the retailer system 204, and this may be referred to as a "locally" hosted retail price planning system.

The control server 210 includes an administrative console (not shown) for accessing and configuring the control server 210. The control server 210 may be configured to execute processes and functions associated with an intelligent agent 400 (FIG. 4), as described in more detail below, and also with reference to FIGS. 3, 5 and 7.

Figure 4:
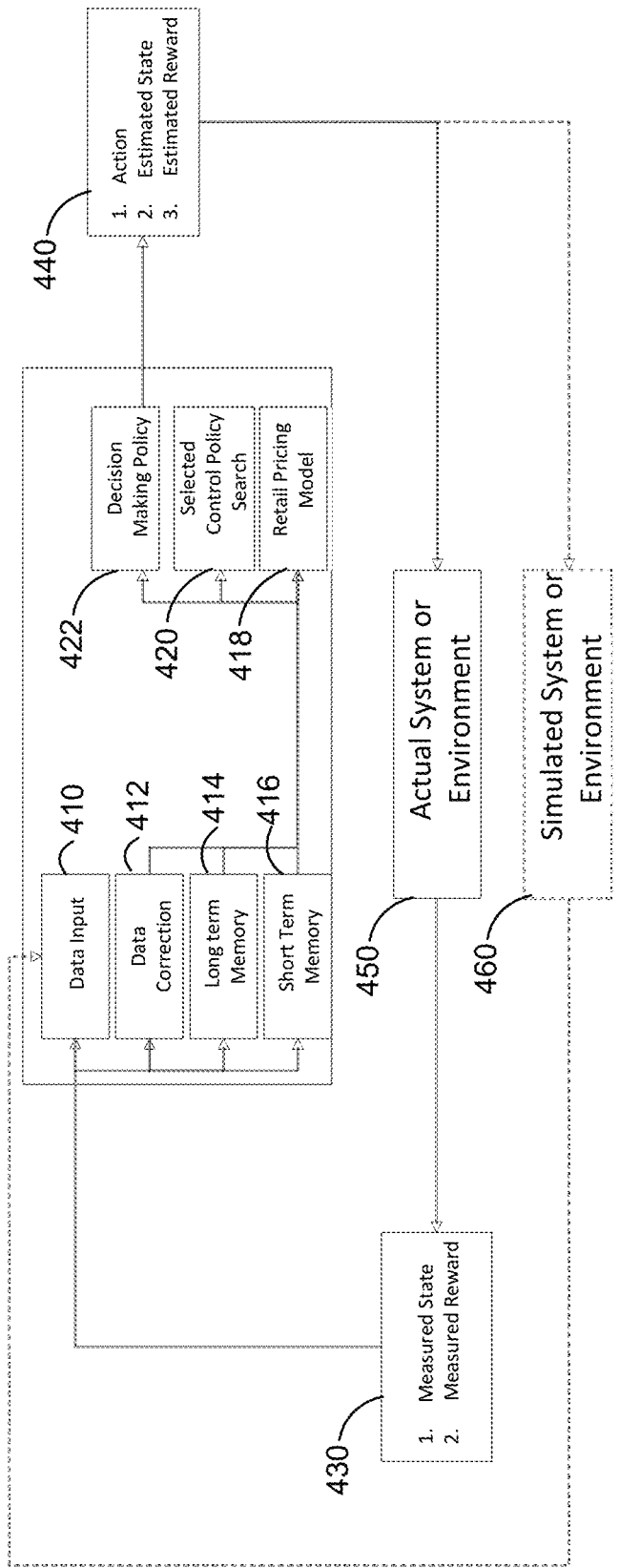
FIG. 4 is a block diagram of one or more embodiments of an intelligent agent module for the retail merchandise price planning system of FIG. 1 according to an embodiment.

The data warehouse server 212, may be configured to store raw and processed data, i.e. comprising retail data 120 obtained from the retailers 130. The data warehouse server 212 may provide a long-term memory or component for the intelligent agent 400 (FIG. 4). The data warehouse server 212 may have a database, and the database may be a Structured Query Language (SQL) database such as PostgreSQL or MySQL or a not only SQL (NoSQL) database such as MongoDB.

The web server 214, may be configured to deliver a retail price plan, generated by one or more methods or systems herein, to the retailer system 204, and for example, to one or more of the user devices 250. The retail merchandising plan may be transmitted through the network 211, firewall 230 and network 206 to the retailer system 204. The web server 214 may be, for example, Apache® Tomcat, or Microsoft® IIS® servers.

The ETL server 216, may be one or more servers, (i.e. a cluster of servers) configured to execute data processing jobs or operations associated with retail data obtained from the retailer environment (see e.g. 130 in FIG. 1). The output generated by the ETL server 216 may populate a long-term memory component 414 in the intelligent agent 400 (see FIG. 4) and a state measurement component 430 in the intelligent agent 400 (see FIG. 4). The ETL Server 216 may be a server or cluster of servers that receives and processes retail data from the one or more retail stores (see 130-132 in FIG. 1). The ETL server 216 may populate the long term memory component and the state measurement component.

The reporting server 218, may be configured to execute a process or operations to display one or more of the group of report data on retail operations of the retailer, state information including a new state and/or reward that may occurs in the retail environment 130 (FIG. 1) based on the state measurement component 430. The reporting server 218 may utilize retail data that has been received and processed by the ETL server 216 and processed and received from the ETL server 216.

The one or more computational servers 220 may be configured to execute processes to perform analysis of the retail data and determine an electronic retail price model (see 418 in FIG. 4), to determine a selected control policy for retail operations (see 422 in FIG. 4). The one or more computational servers 220 may be further configured to apply the selected control policy (see 440 in FIG. 4) to the electronic retail price model. The one or more computational servers 220 may also be configured to store or process a control policy in short term memory (see 416 in FIG. 4).

The metadata server 222 may be configured to store configuration data that is used by the control server 210 to execute processes and functions associated with the operation of the intelligent agent 400.

Network 206 may be any network or network components capable of carrying data including the Internet, Ethernet, fiber optics, satellite, mobile, wireless (e.g. Wi-Fi, WiMAX), SS7 signaling network, fixed line, local area network (LAN), wide area network (WAN), a direct point-to-point connection, mobile data networks (e.g., Universal Mobile Telecommunications System (UMTS), 3GPP Long-Term Evolution Advanced (LTE Advanced), Worldwide Interoperability for Microwave Access (WiMAX), etc.) and others, including any combination of these.

The retailer computer system 204 includes retailer operational systems 240 coupled and one or more retail operational servers 240 and one or more user devices 250 such as, for example, a user laptop or desktop computer 252, user tablets (e.g. Apple iPads) 254, and/or smart phones and other mobile devices 256.

The retailer operational systems 240 and the one or more user devices 250 are connected via a retailer network 242 and the internet 206 to retail planning system 202. The network connection may further include a firewall 260. The one or more user devices 250 may be used by an end user to access a software application (not shown) running on web server 214 at retail planning system 202.

The one or more retail operational servers 240 may include one or more enterprise retail software applications for inventory management, store management, employee scheduling, etc. The one or more retail operational servers 240 may include one or more enterprise retail software applications supporting retail point-of-sale transactions, which may be through a payment processor coupled via the network 206.

Network 242 may be any network or network components capable of carrying data including Ethernet, fiber optics, satellite, mobile, wireless (e.g. Wi-Fi, WiMAX), SS7 signaling network, fixed line, local area network (LAN), wide area network (WAN), a direct point-to-point connection, mobile data networks (e.g., Universal Mobile Telecommunications System (UMTS), 3GPP Long-Term Evolution Advanced (LTE Advanced), Worldwide Interoperability for Microwave Access (WiMAX), etc.) and others, including any combination of these.

The retail planning computer system 202 may be coupled to the retailer computer system 204 through the network 206. As also shown in FIG. 2A, the retail planning computer system 202 may interface to the network 206 through a VPN (Virtual Private Network) Firewall 230, and similarly the retailer computer system 204 may connect to the network 206 through a client VPN firewall 260.

Figure 2B:
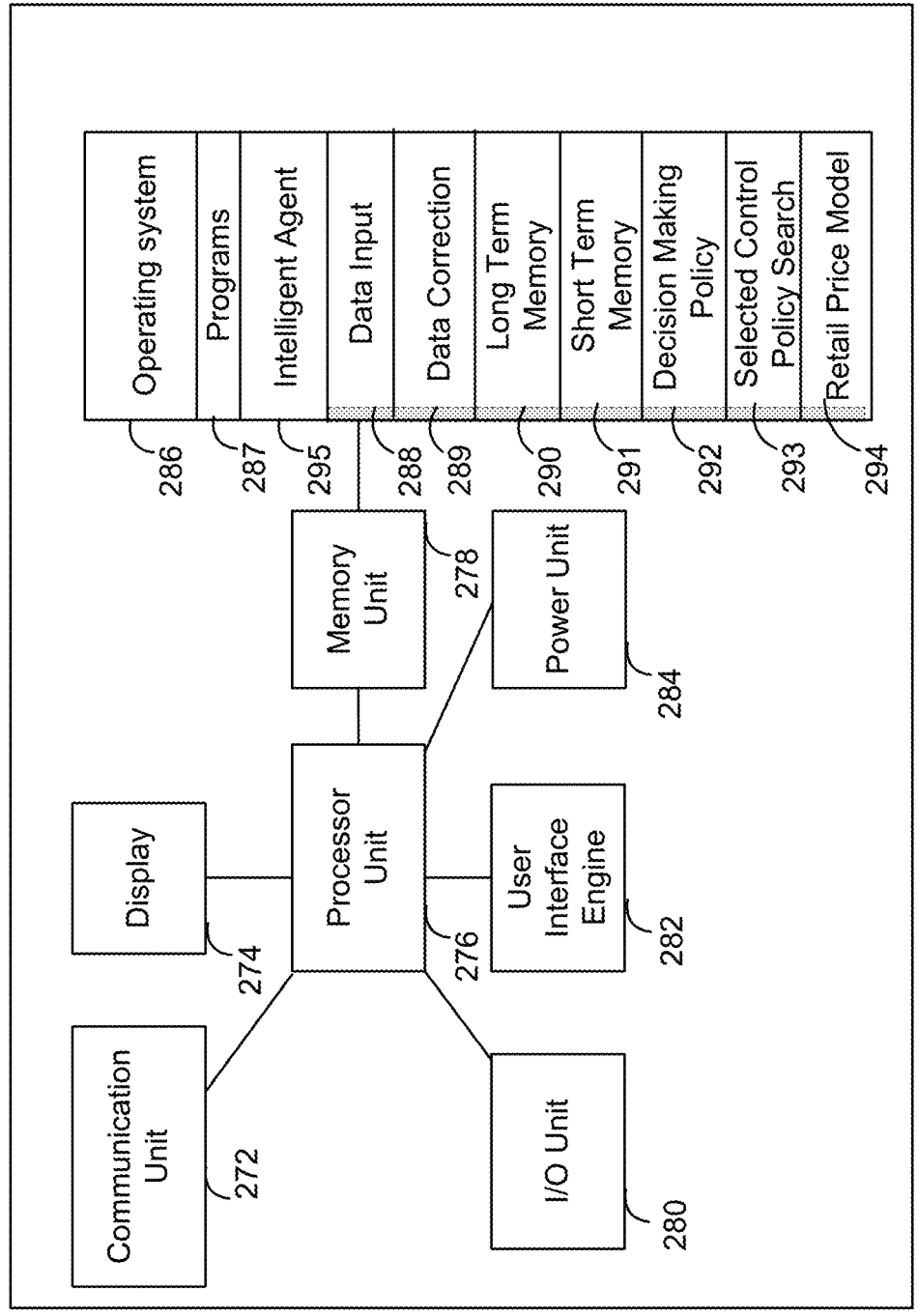
FIG. 2B is a block diagram of the control server according to one or more embodiments.

Reference is next made to FIG. 2B, which shows a block diagram 270 of the control server according to one or more embodiments. As noted above, the control server 270 may communicate with the servers of the retail planning system 202.

The control server 270 includes one or more of a communication unit 272, a display 274, a processor unit 276, a memory unit 278, I/O unit 280, a user interface engine 282, and a power unit 284.

The communication unit 272 can include wired or wireless connection capabilities. The communication unit 272 can include a wired connection such as an Ethernet connection. The communication unit 272 can include a radio that communicates using CDMA, GSM, GPRS or Bluetooth protocol according to standards such as IEEE 802.11a, 802.11b, 802.11g, or 802.11n. The communication unit 202 can be used by the control server 270 to communicate with other devices or computers.

The display 274 may be an LED or LCD based display.

The processor unit 276 controls the operation of the control server 270. The processor unit 276 can be any processor that can provide sufficient processing power depending on the configuration, purposes and requirements of the control server as is known by those skilled in the art. For example, the processor unit 276 may be a high performance general processor such as an Intel® Xeon®. In alternative embodiments, the processor unit 276 can include more than one processor in a multiprocessor configuration.

The processor unit 276 can also execute a user interface (UI) engine 282 that is used to generate various UIs, some examples of which are shown and described herein, such as interfaces shown in FIGS. 10A, 10B, 10C, and 10D. The generated user interfaces may be transmitted from the retail planning system 202 via web server 214 (see FIG. 2A).

The memory unit 278 comprises software code for implementing an operating system 286, programs 287, and an intelligent agent 295.

The memory unit 278 can include RAM, ROM, one or more hard drives, one or more flash drives or some other data storage elements such as disk drives, etc. The memory unit 278 may be used to store an operating system 286 and programs 287 as is commonly known by those skilled in the art.

The I/O unit 280 can include at least one of a mouse, a keyboard, a touch screen, a thumbwheel, a track-pad, a track-ball, a card-reader, voice recognition software and the like again depending on the particular implementation of the server 270. In some cases, some of these components can be integrated with one another.

The user interface engine 282 is configured to generate interfaces for users to view and edit the configuration of the intelligent agent, one or more interfaces to view and edit a generated retail price plan interfaces, one or more interfaces to review retail performance reports, and other user interfaces of the retail price planning system 202 (see FIG. 2A). The various interfaces generated by the user interface engine 282 may be displayed to the user on display 274, or may be transmitted to the user via web server 214 (see FIG. 2A).

The power unit 284 can be any power source that provides power to the control server 270 such as a power adaptor.

The operating system 286 may provide various basic operational processes for the user device 200. For example, the operating system 286 may be Microsoft® Windows® Server operating system, a Unix or Linux based operating system, or another operating system.

The programs 287 include various user programs so that a user can interact with the control server 270 to perform various functions such as, but not limited to, requesting retail price plans, configuring the retail price planning system, viewing sales performance reports, etc.

The intelligent agent 295 may have one or more of the group of a data input 288, a data correction 289, a long term memory 290, a short term memory 291, a decision making policy 292, an selected control policy search 293, and an electronic retail price model 294. The intelligent agent 295 may implement one or more methods described herein to generate an electronic pricing plan for a retailer. The electronic price plan may comprise product pricing information, store pricing information. The electronic price plan may be for a single store, a particular geographic area associated with multiple stores, a particular price zone having two or more stores. The electronic price plan may include details such as product identifiers, a group of product identifiers, a date range for the pricing (including a start date and an end date). The electronic price plan may be generated in a web portal that is made available to users. The electronic price plan may be generated periodically and delivered to users via email as an attachment. The attachment may be a Portable Document File (PDF), an Excel® file, or another file format as is known.

The data input 288 may be configured to receive the retail environment data using the communication unit 272, i.e. from one or more retail stores of the retailer or ecommerce organization. The received retail data may be received and parsed by the data input 288, and may be processed using the data correction 289. The received retail data from the one or more retail stores may be received as is known, for example by File-Transfer-Protocol using flat files, Excel® files, Comma Separated Value (CSV) files, or other data interchange formats as is known. The format of the received retail data may be standardized, or may be an agreed upon format.

Figure 3:
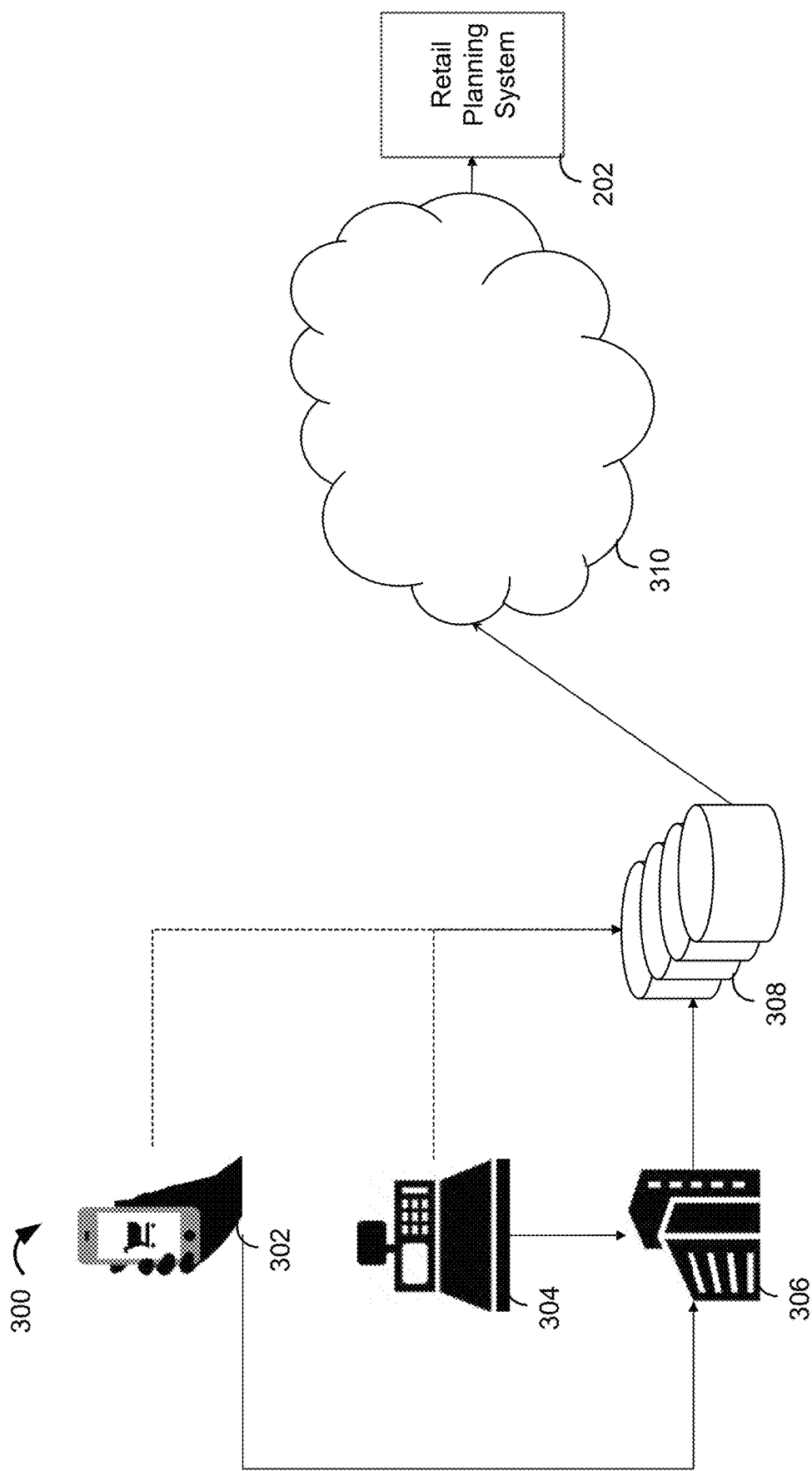
FIG. 3 is a data flow diagram for retail data collection from retail entities that is received by the data input module according to one or more embodiments.

Referring next to FIG. 3, a data flow diagram 300 is shown for retail data collection from retail entities that is received by the data input 288 (FIG. 2B). The data flow 300 shows the generation of data at retail touchpoints such as a retailer website 302, a retail point-of-sale device 304, or other retail devices (not shown). The retail point-of-sale devices 304 may send retail point-of-sale data to retail data center 306, or using a cloud-based retail transaction processing system. The retail data from the retailer website 302 or the point-of-sale devices 304 may be stored at a database 308. The collected retail data in the database 308 may be packaged and transmitted in real-time and/or as batch data extracts to the retail planning system 202.

The collected retail data in the database 308 may be encrypted for transmission over network 310, for example, by the firewall at the retail planning system 202 (FIG. 2A) and the firewall at the retailer system 204 (FIG. 2A).

Referring back to FIG. 2B, the data input may be configured to receive, and the data correction 289 may be configured to process the retail data from the retail environment on a periodic basis, for example, in near real-time, intra-daily, daily, intra-weekly or weekly.

The data input 288 may be configured to execute data warehousing operations in the collection, correction and/or management of retail data inputs. The retail data may be stored in the long-term memory 290, i.e. for a data warehouse, and in the short-term memory 291, i.e. for data mart(s), or recent control actions and/or control action candidates, as described in more detail below.

The retail data received by the data input 288 may include:

1) POS receipts data for several years—TLOG (transactions, receipts, data)
    a) Transaction identifier
    b) Sequence Number
    c) Customer Identifier
    d) Date
    e) Time
    f) Store identifier
    g) Product Identifier
    h) Promo Identifier
    i) Unit Price (or price per weight)
    j) Unit Cost (or cost per weight)
    k) Quantity (integer for countable items, fractional for weighted items)
    l) Extended Sale Amount
2) Promotion Master for same data range as TLOG
    a) Promotion identifier
    b) Promotion start and end data
    c) Promotion Type
    d) Promotion Marketing Channel
3) Promotion Product Master for same date range as TLOG
    a) Promotion Identifier
    b) Product Identifier
    c) Store Identifier
    d) Product placement identifier
        i) Circular page identifier
        ii) Page location identifier
        iii) Planogram location identifier
        iv) Website location identifier
        v) Etc.
4) Promotion Product Customer for same date range as TLOG
    a) Promotion identifier
    b) Product Identifier
    c) Customer Identifier
5) Product Master
    a) Product Identifier (UPC or PLU)
    b) Product Description
    c) Product Attributes
        i) Brand
        ii) Packaging
        iii) Size
        iv) Ingredients
        v) Warnings
        vi) Images
6) Product Hierarchy 1
    a) Line of Business
    b) Department
    c) Sub-Department
    d) Category
    e) Subcategory
    f) Product Identifier
7) Product Hierarchy 2
    a) Ad Group Identifier
    b) Item Identifier
    c) Product Identifier
8) Store Master
    a) Store Identifier
    b) Store Full Address
    c) Store Longitude/Latitude
    d) Store Square Footage
    e) Planogram Identifier
    f) Store Type
9) Planogram
    a) Planogram identifier
    b) Planogram location
    c) Planogram sub-location
    d) Product identifier
    e) Planogram Image
    f) Start Date
    g) End Date
10) Store Groupings
    a) Store Cluster Identifier
    b) Store Cluster Description
    c) Start Date
    d) End Date
    e) Store Identifier
11) Time
    a) Date
    b) Calendar Week (ISO)
    c) Calendar Month (ISO)
    d) Calendar Year
    e) Fiscal Week
    f) Fiscal Month
    g) Fiscal Year
    h) Promo Week
    i) Promo Year The data correction 289 may be configured to correct or adjust the retail data input for "measurement noise". The correction may include executing holiday adjustments, comparable store adjustments, price correction for planner intent and de-trending, as described below. The data correction 289 may take retail data (as above) as input and may determine transformed retail data as output, which may be stored in the long term memory 290 and the short term memory 291.

The long term memory 290 may be a database or cache configured to store retail data for use by the retail planning system 202 (FIG. 2A) having a longer term frequency response and/or historical control actions. The long term memory 290 may store baseline values for store retail data, including averages, maximum values, minimum value, frequency data, price data, quantity data, etc. for a plurality of products and a plurality of stores. The long term memory 290 may store historical data for a plurality of products, a plurality of stores, a plurality of price points, a plurality of sales quantity, sales profit, etc.

The short term memory 291 may be a database or cache configured to store retail data for the retail planning system 202 (FIG. 2A) having a shorter term frequency response and/or recent control actions.

The decision making policy 292 may be configured to utilize the output of the selected control policy search 293 and the retail price model 294 to search and select a stable next action based on the long-term memory 290 and/or the short-term memory 291.

The selected control policy search 293 may be configured to utilize the current state in the short term memory 291, and historical states of the retailer or retail environment in the long term memory 290 and the retail system planning process to search for and determine a selected control policy that changes the long-term reward or merchandising goals for the retailer.

The electronic retail price model 294 may be configured to generate a retail pricing model that governs the behavior and operation of the retail planning system 202 (FIG. 2A).

Reference is next made to FIG. 4 which shows the intelligent agent 400 according to one or more embodiments. The intelligent agent module 400 may be run at the control server 210 (FIG. 2A) in the retail planning system 202 (FIG. 2A), or where locally-hosted, at the retailer system 204 (see FIG. 2A). The intelligent agent 400 corresponds to the intelligent agent 295 in FIG. 2B.

The intelligent agent 400 may have one or more of the group of a data input 410 corresponding to data input 288 (see FIG. 2B), a data correction 412 corresponding to data correction 289 (see FIG. 2B), a long term memory 414 corresponding to long term memory 290 (see FIG. 2B), a short term memory 416 corresponding to short term memory 291 (see FIG. 2B), a decision making policy 422 corresponding to decision making policy 292 (see FIG. 2B), a selected control policy search 420 corresponding to a selected control policy search 293 (see FIG. 2B), and a retail pricing model 418 corresponding to retail price model 294 (see FIG. 2B).

The intelligent agent 400 may receive at the data input 410 (corresponding to data input 288 in FIG. 2A) a simulated system state and a simulated system reward from a simulated system 460 that may be stored in short term memory 416. The intelligent agent 400 may receive at the data input 410 a measured system state and a measured system reward from an actual system 450 that may be stored in short term memory 416. The measured state and reward 450 may be from an actual retail system, and may include retail data as measured from the retailer. The intelligent agent 400 may receive at a data input 410 retail data that may be stored in the long term memory 414 or the short term memory 416. The intelligent agent 400 may generate as output a retail pricing plan 440 that may include an estimated state and an estimated reward.

The system state may be defined by time series retail data received and processed by the retail planning system 202, and where the time series retail data comprises data typically collected by a retailer in real-time from its computer and operational systems.

The intelligence agent 400 may be configured to operate in two environments or modes: an actual or operational control loop 450 and a simulated control loop 460. The actual control loop 450 operates in an actual retail environment and inputs/processes measured retail data. The simulated control loop 460, on the other hand, is configured to operate in a simulated environment where the estimated state and estimated rewards or benefits are determined and used as a proxy for actual measurements. The simulation may determine a vector of product price points for determining the effect of a plurality of pricing decisions. The intelligent agent 400 may be further configured to use a simulated control loop and an actual control loop simultaneously, and actual measurements may be used to correct the simulated state at a regular interval, for example, every N simulations, where N is a user configurable integer. The simulated control loop may determine simulated metrics such as affinity, cannibalization, cadence, halo effects and may be corrected based on the observed metrics in the actual control loop. Further, price elasticities may be simulated using the simulated control loop and corrected based on observed elasticities in the actual control loop.

The intelligent agent 400 may generate a retail pricing plan 440 that may have an action output. The action output of the retail pricing plan 440 may include an estimated state for the retailer environment and/or an estimated reward for the retailer environment. The retail pricing plan 440 may be transmitted to a retailer for implementation at 450. The retail pricing plan may be transmitted to retailer computer system 204, including to retailer operational systems 240 (see FIG. 2A). The retailer operation system 240 (see FIG. 2A) may implement the retail pricing plan 440, manually by a user, or automatically, to affect product price changes at the retailer.

The intelligent agent module 400 may be configured to receive or measure measured state parameters and/or measured reward parameters of the retailer system or environment in response to the application of the retail pricing plan at 430.

The simulation control loop 460 may be configured to apply the retail pricing plan 440 to a simulated system or environment 460, and the response of the simulated system or environment may be received by the data input component 410 and processed by the intelligent agent module 400.

The data correction 412 corresponds to data correction 289 in FIG. 2B, and may be configured to correct or adjust the data inputs for "measurement noise". In simulated control loop operation, the data correction 412 may be configured to correct the simulated state of the environment based on a measured state and/or measured reward.

The long-term memory component 414 corresponds to the long term memory 290 in FIG. 2B, and is configured to store retail data for use by the intelligent agent 400 having a longer term frequency response and/or historical control actions.

The short-term memory component 416 corresponds to the short term memory 291 in FIG. 2B, and is configured to provide functionality and store data for the retail system planning process having a shorter term frequency response and/or recent control actions.

The retail pricing model 418 corresponds to the retail pricing model 294 in FIG. 2B, and is configured to execute a retail system planning process as described herein.

The selected control policy search component 420 corresponds to the selected control policy search 293 in FIG. 2B and may be configured to utilize the current state of the retailer or retail environment in the short term memory 291 and the historical state of the retailer or retail environment in the long term memory 290 to generate a selected control policy and/or retail pricing plan 440 that changes long-term reward or merchandising goals for the retailer and which maintains stable control in the intelligent agent module 400. Stable control may refer to the generation of pricing plans that do not have significant price oscillations from one period to the next. The stable control may be determined by applying a hysteresis function to the pricing decisions in the electronic price plan. Thus, stable control may produce pricing decisions in the electronic price plan that do not change drastically, and may be more predictable from one pricing period to the next. Stable control may be implemented using a maximum price change value that is configurable. For example, the maximum price change value may be 10% of the current price of the product.

The decision making policy 422 is configured to utilize the output of the selected control policy 420 to search and select a stable next action which can be executed by the retailer system 204 (see FIG. 2A). The search and selection of the next stable action may be determined based on the current state of the long-term memory component 414 and/or the short-term memory component 416.

Figure 5A:
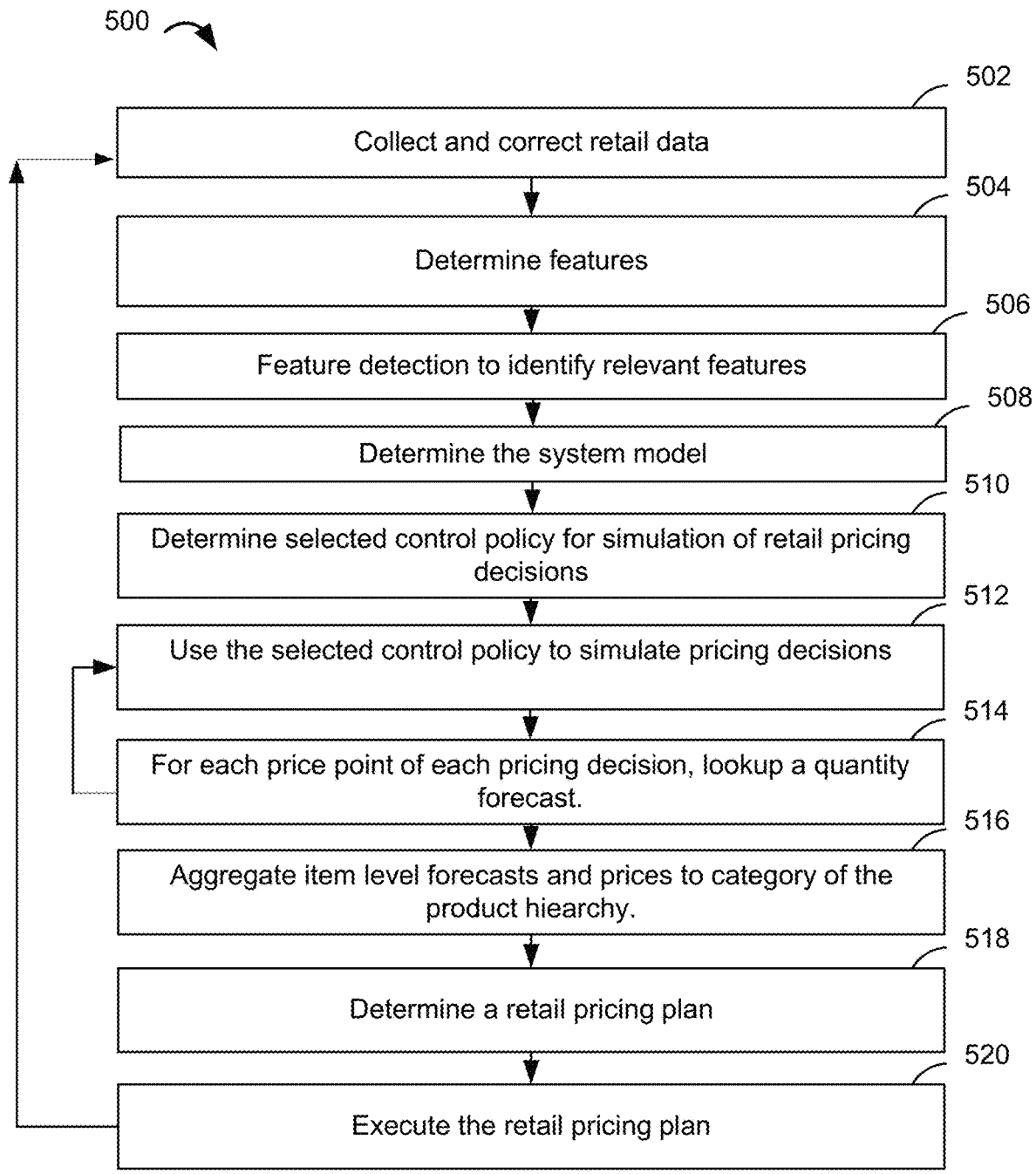
FIG. 5A is a method diagram for an intelligent agent module according to one or more embodiments.

Reference is next made to FIG. 5A, which shows a method diagram 500 for the intelligent agent module according to one or more embodiments. The method 500 may be provided in order to assist the retailer with the objective of growing overall sales by providing a retail price plan for weekly promotional sales that may be promoted in flyers or other promotional vehicles.

At 502, retail data is collected and/or corrected at the data input 410 of the intelligent agent module 400. Collecting and correcting sensory input 502 may comprise executing data management data flows.

Figure 12:
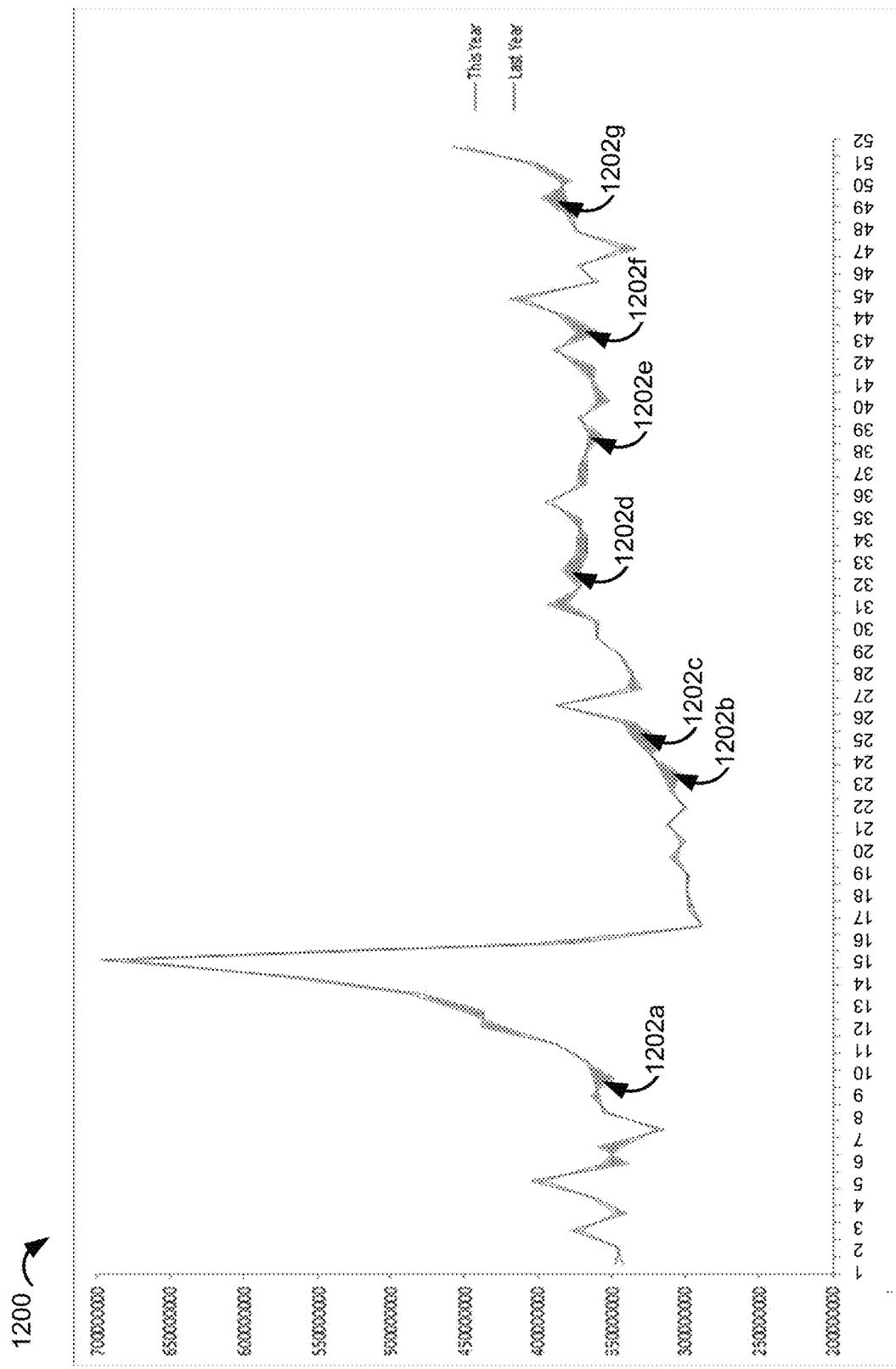
FIG. 12 shows a sales diagram showing year over year sales for a retailer or retail environment.

Reference is made to FIG. 12, which shows a sales diagram 1200 of year over year sales for a retailer or retail environment. The sales diagram 1200 may show a vertical axis of gross sales, and a horizontal axis of calendar week number (i.e. the number of weeks through the year). In particular, the graph diagram 1200 may show how retail sales may have variances year over year. As shown in sales diagram 1200, variances 1202 may be shown where year-over-year sales have varied from one year to another. There may be different reasons for comparable year over year variation for a retailer or a store, including year over year and period over period variation in promotional activity by the retailer, season effects, or other variations as described herein. For example, the retailer may put particular products on promotion with offers of reduced prices, or other sales strategies.

The promotion of products has different dimensions, including differing promotional product mix, and promotional price mix. The promotional price mix may have different effects on a retailer, including increased or decreased consumer traffic to the stores, increased or decreased associated product sales, increased or decreased stock-outs (i.e. where a product runs out of stock at a retail location), or increased or decreased cyclical trends.

There may be important periods in retail sales, typically within an 8 week, a 13 week, a 26 week and 52 week periods. These important periods may reflect a variety of human time cycles, including seasonality, weather cycle effects, product lifecycles, holiday adjustments, etc.

Figure 13:
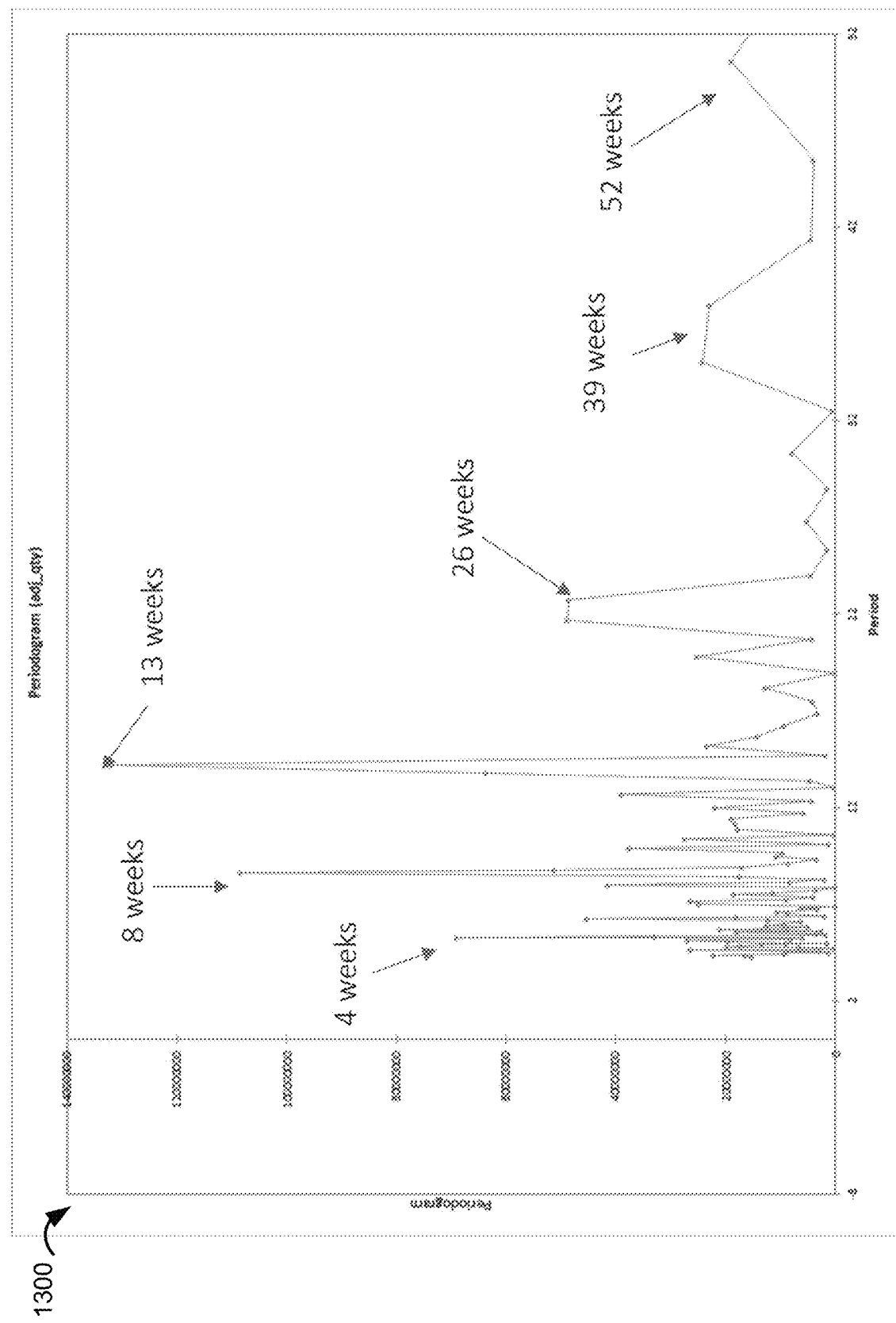
FIG. 13 shows a power spectrum diagram showing a representation of retail time series data showing cyclical trend data.

Referring next to FIG. 13, there is shown transformed retail data, including a power spectrum diagram (or a periodogram) 1300 showing a representation of retail time series data showing cyclical trend data. The power spectrum diagram (or a periodogram) 1300 has a vertical axis of amplitude and a horizontal axis of frequency. For example, there may be particular high sales time periods such as near the holidays in December, near March break, etc.

In one embodiment, the data correction 412 (see FIG. 4) may perform signal analysis on the retail data. The retail data may include retail time series data, including, for example, one or more transactions with provided time indices. The signal analysis may include mathematical transformations of the time series retail data, for example, a Fourier Transform analysis may be performed on retail data to generate transformed retail data. The transformed retail data may include the original transaction data, along with the generated data from the signal analysis. The signal analysis may generate a power spectrum showing the amount of "energy" in the time series at various frequencies. The notion of "energy" in the retail context may be used given retail time series data, which may reveal cyclic trends, seasonal activity, and other effects in the retail sales data and history, i.e. time cycles that may affect current sales. As shown in FIG. 13, the retail data for the retailer has peaks at 13 weeks, 26 weeks and 52 weeks, and a significant energy peak at 8 weeks.

Figure 14:
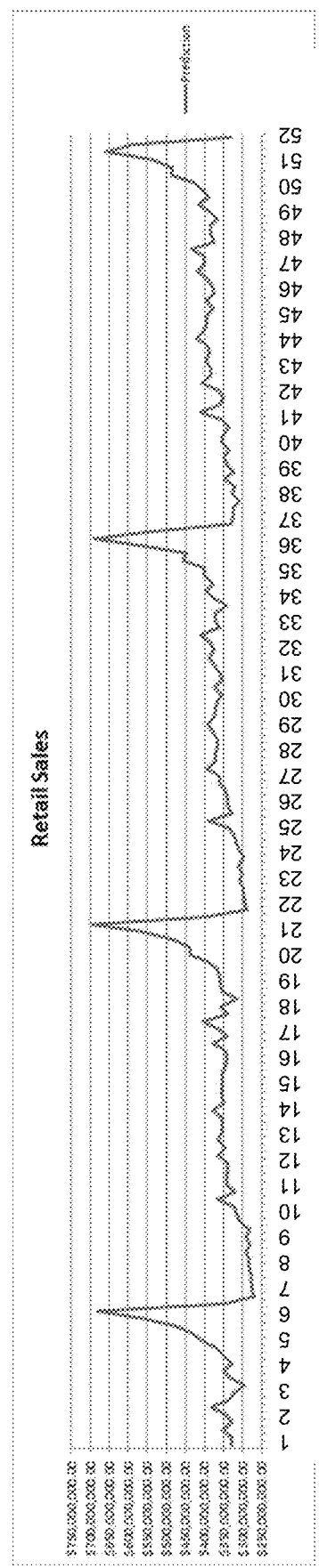
FIG. 14 shows retail sales as a time series diagram with weekly level of time aggregation.

Referring next to FIG. 14, there is shown transformed retail sales as a time series diagram 1400 with weekly level of time aggregation. The time series diagram 1400 may show a vertical axis of gross sales, and a horizontal axis of calendar week number (i.e. the number of weeks through the year). In one or more embodiments, the retail time series data may be transformed to generate stationary time series data by using comparable retailer (or location level) sales to minimize the year over year trend, i.e. remove gross or aberrant trends in the data. If a strong trend exists then further de-trending may be performed using a first order difference i.e. $d_t = S_t - S_{t-1}$ where $d_t$ is the difference at time t and $S_t$ is the comparable store sales at time t, where the time scale may be related to the key power spectrum peaks. In the case where first order de-trending is used, further determinations using store sales may instead use $d_t$.

Figure 15:
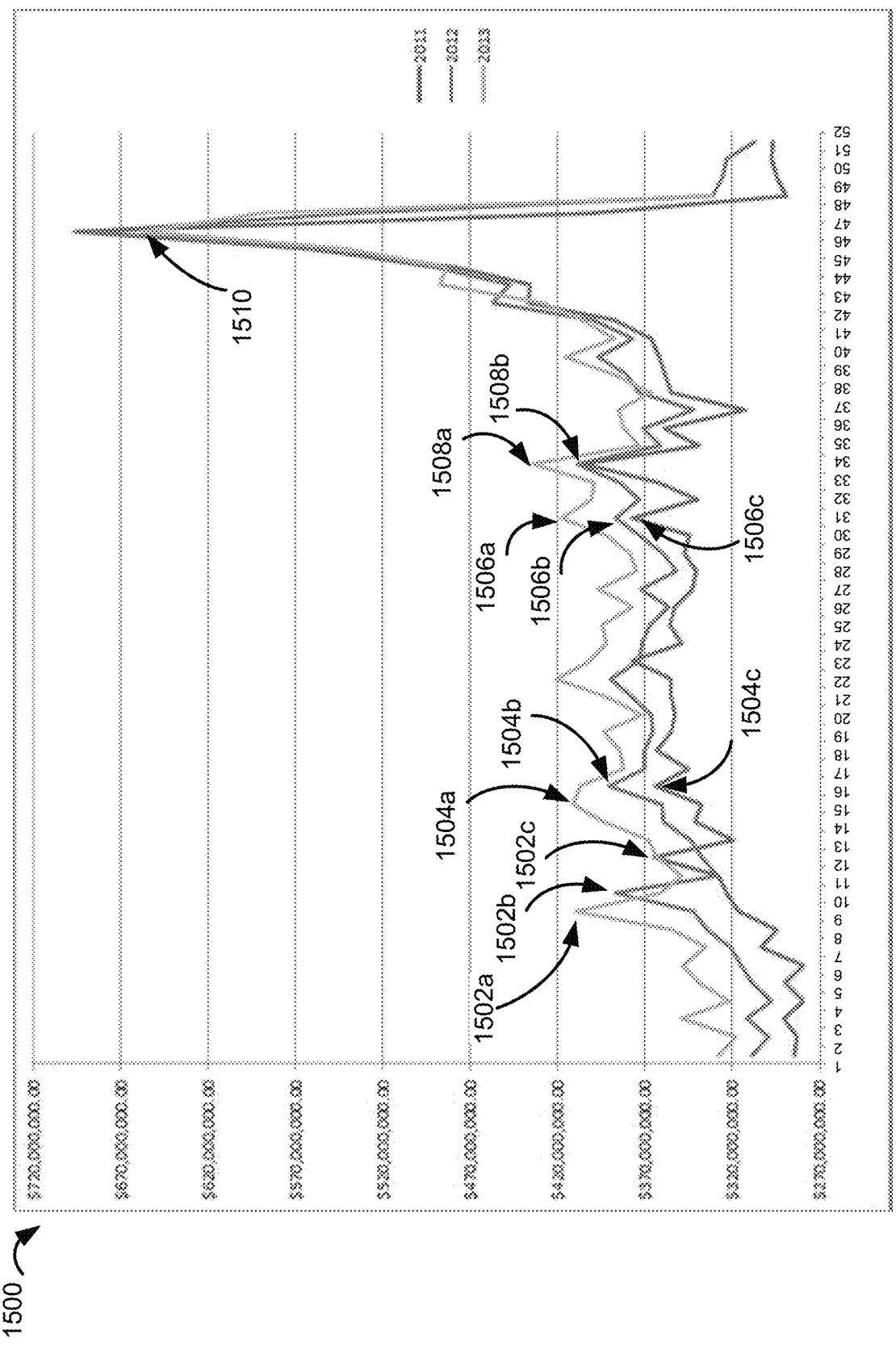
FIG. 15 shows a holiday adjustment diagram for typical year over year retail sales and the misalignment of key holidays.

Referring next to FIG. 15, there is shown a sales diagram 1500. The sales diagram 1500 may show a vertical axis of gross sales, and a horizontal axis of calendar week number (i.e. the number of weeks through the year). In one or more embodiments, the retail data may be corrected by the sensor correction 412 (see FIG. 4), for example for holiday adjustment. The sales diagram 1500 may show a vertical axis of gross sales, and a horizontal axis of calendar week number (i.e. the number of weeks through the year). The sales diagram 1500 shows example year over year retail sales, including the alignment and misalignment of several holidays. For example, Easter may vary in date between March 22 and April 25, and Easter 1502*a* in 2013, Easter 1502*b* in 2014, and Easter 1502*c* in 2015 may move or shift and the sales peak associated with the holiday may not be aligned. Victoria Day in Canada is celebrated on the last Monday preceding May 25, and Victoria Day 1504*a* in 2013, Victoria Day 1504*b* in 2014, and Victoria Day 1504*c* in 2015 may also not be aligned. Similarly, Labour day 1506 is celebrated on the first Monday in September (and therefore varies), Canadian Thanksgiving 1508 is celebrated on the second Monday in October (and therefore varies), and Christmas 1510 is always celebrated on the 25$^{th}$ of December (and is therefore generally aligned in the sales data).

Holidays on fixed dates, i.e. December 25, may move or shift 2 days per year. Holidays such as Victoria Day, Labour Day and Thanksgiving may move as they are not fixed dates. The Easter holiday, may move as much as a month from year to year. Accordingly, a holiday adjustment may be performed on the retail data in order to generate a holiday adjusted calendar. The holiday adjusted calendar may include aligning holiday sales peaks year over year. Alignment of major and minor holiday peaks and key retailer annual sales events may be performed to determine transformed retail data including a power spectrum of the retail sales time series.

Referring back to FIG. 5A, at 504 features are determined. According to one or more embodiments, the determination of a plurality of features may include determination of cannibalization, cadence, affinities, baselines, power spectra, promotional elasticities, price elasticities and cross-price elasticities for actionable features and non-actionable features. The plurality of features may include features determined per product, per level of a product hierarchy, per retail location, etc. The plurality of features determined for a level of a product hierarchy may be used to determine the cannibalization, cadence, affinities, baselines, power spectra, promotional elasticities, price elasticities and cross-price elasticities as between a first level in the hierarchy and second level in the hierarchy (see FIG. 20 for further information on the product hierarchy).

Figure 16:
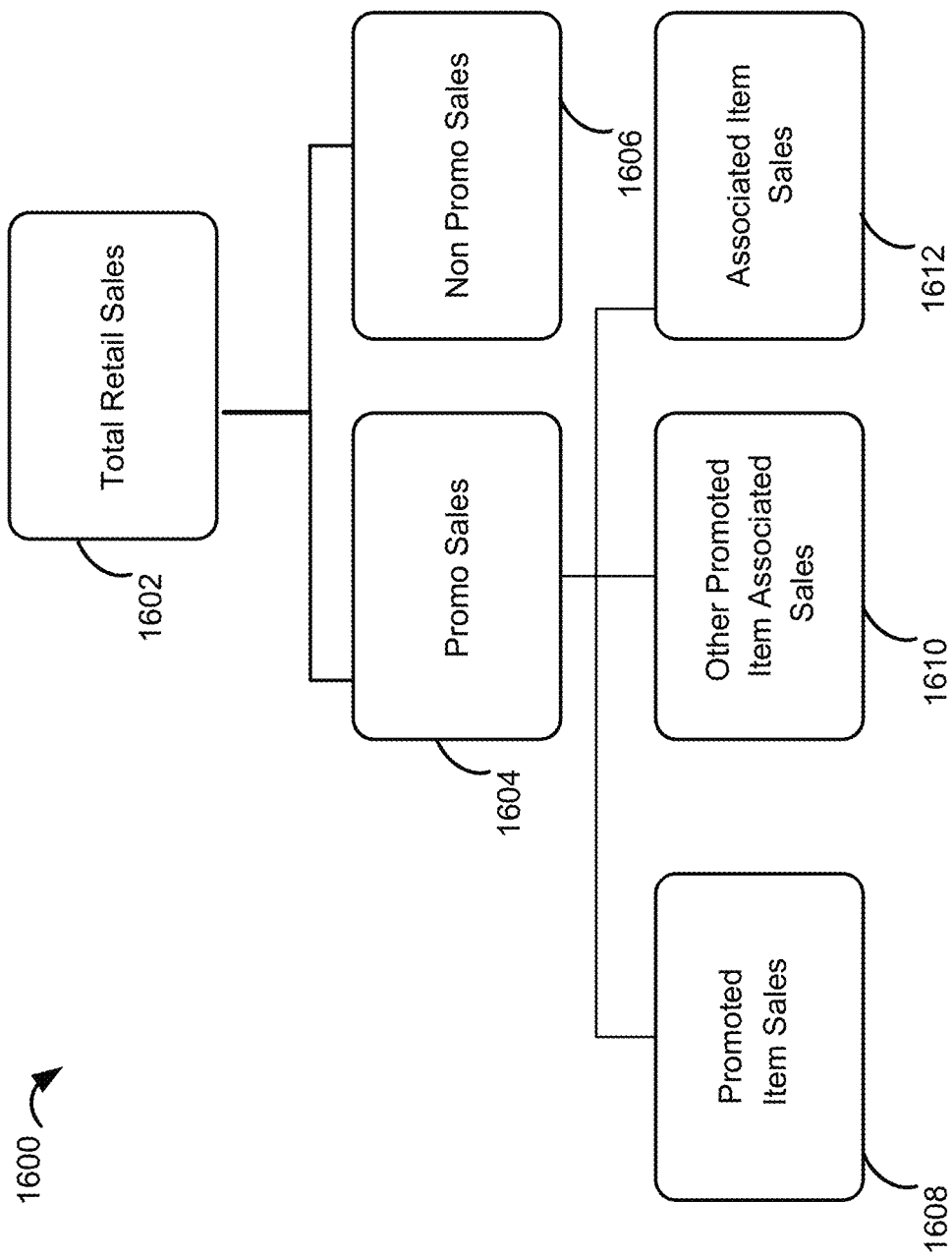
FIG. 16 shows an example of retail sales segmentation.

Referring next to FIG. 16, there is shown an example of retail sales segmentation 1600. In one or more embodiments, the determination of features may include processing of the retail data, including sorting retail total sales by sub-dividing a plurality of transactions in the transformed retail data into a first group having transactions that contain at least one promoted item and a second group having transactions that contain only non-promoted items. For each transaction in the first group (i.e. having promoted items), the other items in the same transaction are referred to as associated or halo items. The associated items may further be sub-divided into non-promoted associated items and other promoted items.

Total Retail Sales 1602 comprises Promo Sales 1604 and Non-Promo Sales 1606. Promo Sales 1604 may be further divided into Promoted Item Sales 1608, Other Promoted Item Associated Sales 1610 and Associated Item Sales 1612. The promoted item 1608 comprises an item that was part of the promotion. The other promoted item 1610 comprises other promoted items in the same transaction as the promoted item 1608. The associated item 1612 comprises a non-promoted item in the same transaction as at least one of the promoted items.

Referring next to FIG. 17, there is shown an example transaction receipt 1700. The example transaction receipt 1700 may be segmented according to FIG. 16. The promotional-transaction 1700 comprises a transaction including at least one promotional item 1708 (for example Tomato Paste), a non-promoted item 1706 (for example Tabasco). Items in the promotional transaction 1700 may be identified by a Universal Product Code (UPC) 1702, a Price Look-Up Code (PLU) 1704, or another type of product identifier as known. A total sales segmentation may be determined by aggregating all receipts across all stores.

In one or more embodiments, it may be desirable for the retailer to increase total retail sales, and this may include increasing sales of promoted items while maintaining the sales of non-promoted items by promoting items that drive sales of a large number of associated items. The selection of price of both promoted and non-promoted items may further increase promoted item sales and may increase non-promoted sales.

In one or more embodiments, items that increase the purchase of associated items may be determined using association rule mining. Various association rule mining functions may be used, for example an association rule mining function based on the aprioriTID algorithm.

Referring next to FIGS. 18A and 18B together, the aprioriTID algorithm is described in further detail. The aprioriTID algorithm may be in the form: $X \Rightarrow Y$ where $X \subset I$, $Y \subset I$ and I is the set of all possible itemsets (i.e. a group of items). The support for an item set X may be the percentage of transactions containing X, the support may also be referred to as p(X) where p indicates the probability of occurrence of the argument.

A rule's support in a transaction set D may be the percentage of transactions which contain $X \cap Y$ or $p(X \cap Y)$.

A rule's confidence in a transaction set D may be the percentage of transactions which contain X also contain Y or $conf(X) = p(X \cap Y)/p(X)$.

A rule's lift in a transaction set D is the support over the expected support if X and Y are independent or $Lift = p(X \cap Y)/p(X)p(Y)$.

The aprioriTID algorithm may operate to find rules with a specified minimum support (minsup) and minimum confidence (minconf).

Referring next to FIG. 19, there is shown an example of an affinity matrix according to one or more embodiments. The output of the association rule mining function may comprise an N×N matrix 1900. The N×N matrix 1900 may represent the affinity, and each entry may be an itemset that provides a measure of halo sales or halo transaction effect, for instance, when multiplying a single category by a column of the matrix. In the context of a sales and profit determination, each entry in the matrix may be a confidence measure from apriorTID. The diagonal elements may be equal to 1 and the sub- and super-diagonal elements may be the confidence for rule with item set n as the rule body and item m as the rule head. In the N×N matrix 1900, each element $a_{ij}$ may be a floating point value representing either the support, lift or confidence for the relationship between item sets i and j. For sales determination $a_{ij}$ confidence may be used as an affinity measure and for transaction determination, support may be used. Association rule mining may be executed at any level in a retail product hierarchy.

In one or more embodiments, cannibalization may be determined using association rule mining. The cannibalization, i.e. implicit cannibalization, may be represented by support, lift and confidence that may be built into the affinity matrix.

Figure 20:
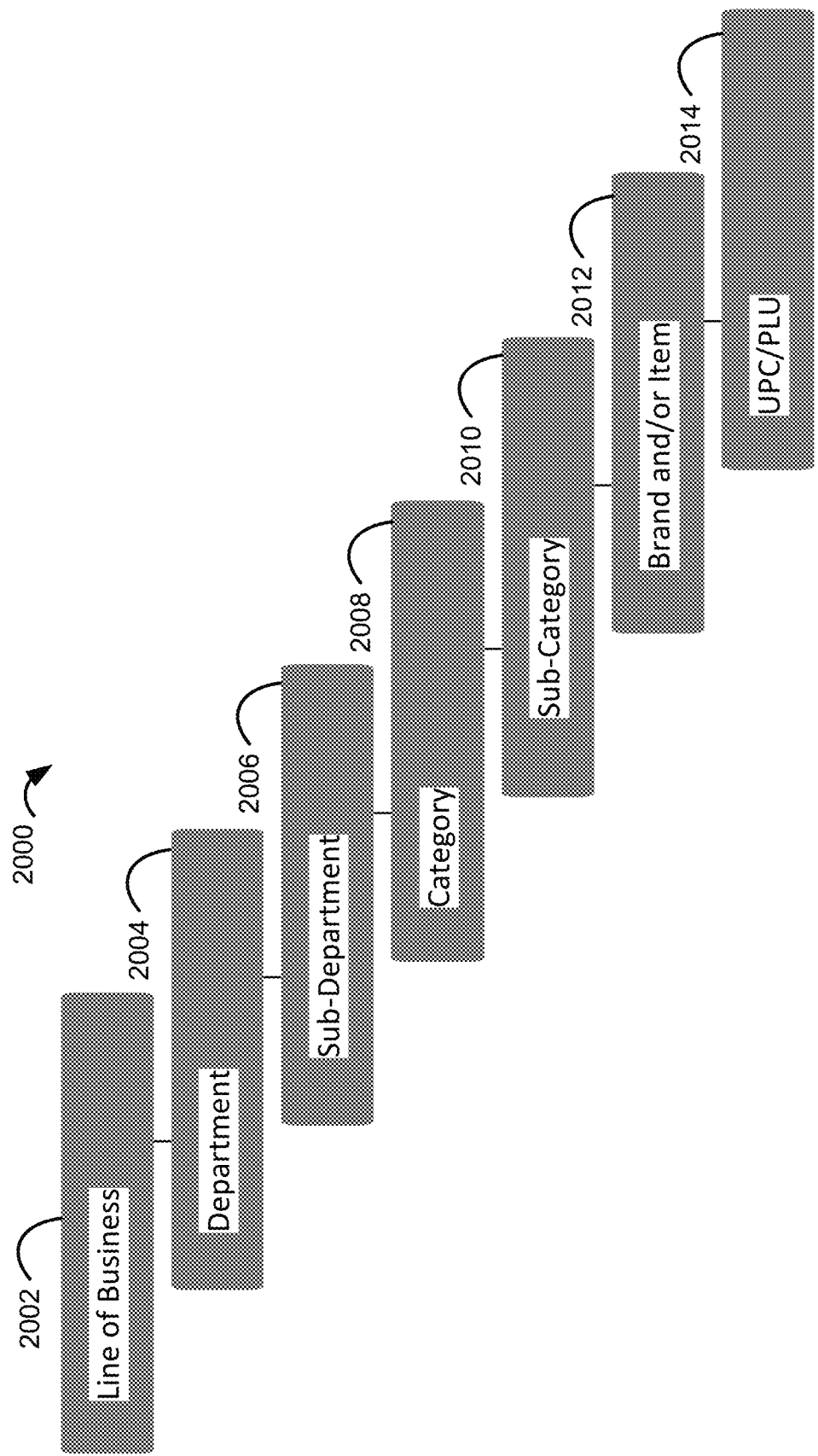
FIG. 20 shows a product hierarchy structure diagram.

Referring next to FIG. 20, a product hierarchy structure 2000 is shown. The product hierarchy 2000 may comprise a top-down hierarchy having multiple levels. The product hierarchy 2000 may comprise a Line of Business level 2002, a Department level 2004, a Sub-Department level 2006, a Category level 2008, a Sub-Category level 2010, and a Brand and/or Item level 2012 to UPC/PLU level 2014. The UPC is a number code (Universal Product Code) that is used in barcodes on a product to permit scanning by a point of sale device. There are several international standard UPC formats. The PLU (Price Look Up) is a typically 4 or 5-digit number for non-barcoded products that a cashier can manually type into a point of sale device to look up its price. The UPC Codes 1702 and PLU Codes 1704 may appear on the transaction receipt 1700, as shown in FIG. 17. The Sub-Category level 2010 may reflect a group of products, a group of products having the same brand and/or packaging. The Sub-Category level 2010 may further include advertising groups (i.e. item groups that have been advertised together), for example, different pack sizes of the same brand of yoghurt. The Brand and/or Item level 2012 may reflect particular manufacturers and products associated with each manufacturer. The product hierarchy structure 2000 may generally describe the different levels of product hierarchy that may appear in a product hierarchy tree.

Figure 21:
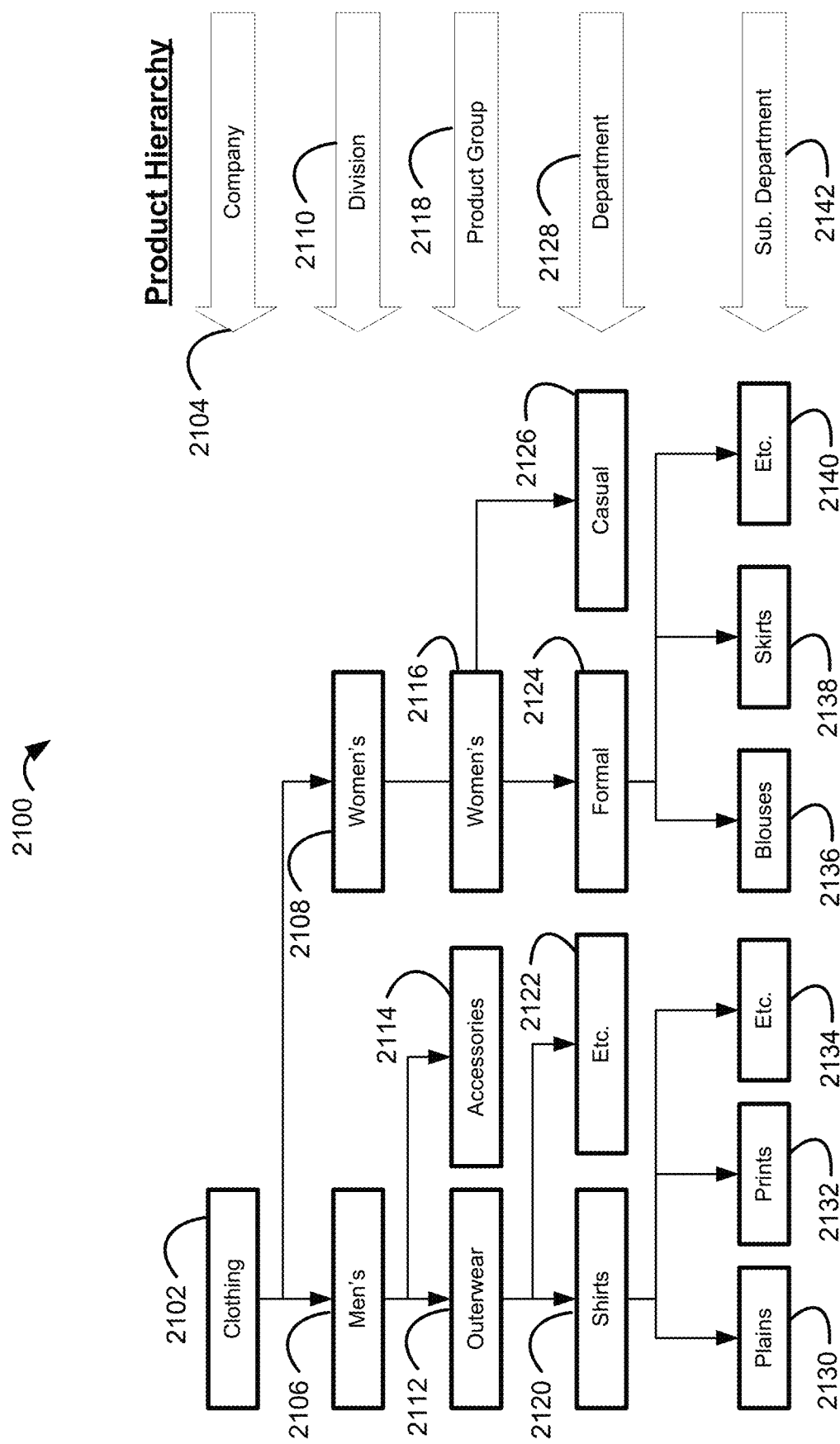
FIG. 21 shows an example product hierarchy diagram for clothing.

Referring next to FIG. 21, there is shown an example product hierarchy 2100 for clothing. The product hierarchy 2100 comprises a company level 2104 having a clothing node 2102. The division level 2110 may include at least a Men's clothing node 2106 and a Women's clothing node 2108. The Product Group level 2118 may have at least a Men's Outerwear node 2112, a Men's Accessories node 2114, and a second Women's node 2116. The department level 2128 may have a Shirts node 2120, an Etc. node 2122, a Women's Formal node 2124, and a Women's Casual node 2126. The Sub. Department level 2142 may have a Men's Shirt Plains node 2130, a Men's Shirt Prints node 2132, a Men's Shirts Etc. node 2134, a Women's Blouses node 2136, a Women's Skirts node 2138, and a Women's Etc. node 2140. As shown, nodes in the hierarchy may have a parent node (for example, Men's clothing node 2106 has a parent node of Clothing node 2102. As shown, nodes in the hierarchy may have child nodes (for example, Men's clothing node 2106 has at least two child nodes: Men's Outerwear node 2112 and Men's Accessories node 2114. It will be appreciated that the product hierarchy may be much larger than shown, and nodes may have many child nodes. It is understood that a "sub-tree" of the product hierarchy includes the parent node, the child nodes of the parent node, and any subsequent nodes below the child nodes such as grandchild nodes or great-grandchild nodes, etc. It will be appreciated that the product hierarchy and number of levels (i.e. granularity) may be based on the particular product and industry.

In one or more embodiments, cannibalization may occur when a product on promotion affects the sales of other first or second degree related products during the same promotion period. The intelligent agent (see 400 in FIG. 4) may determine cannibalization features, and may determine a retail pricing plan using the cannibalization features by reducing the cannibalization of promoted and non-promoted item sales.

In one or more embodiments, cannibalization may be determined for a given period of time at a level in the product hierarchy (i.e. category) by determining baseline sales for each item at one hierarchy level below (i.e. sub-category), as follows:
  for each category in the hierarchy, aggregating the difference between the actual sales for that given week of each item and the associated baseline sales
  repeating this process for each category
  repeating the process at the next highest level, and subtracting the cannibalization accounted for at the lower level In one or more embodiments, cannibalization may be determined across a time period for a given level in the hierarchy (i.e. sub-category) by determining a baseline for each sub-category, and then measuring the difference between the actual sales and the baseline sales for the sub-category and the other sub-categories for each future week, up to a cadence duration for each sub-category pair, as described in more detail below.

Referring back to FIG. 19, it will be appreciated that cannibalization between itemsets may be implicit in the affinity matrix 1900 when determining the lift measure. In particular, itemsets with a lift of less than 1.0 may cannibalize each other, and itemsets with a lift of greater than 1.0 may support each other. Cannibalization in a given time period may be measured using the retail hierarchy.

Figure 22:
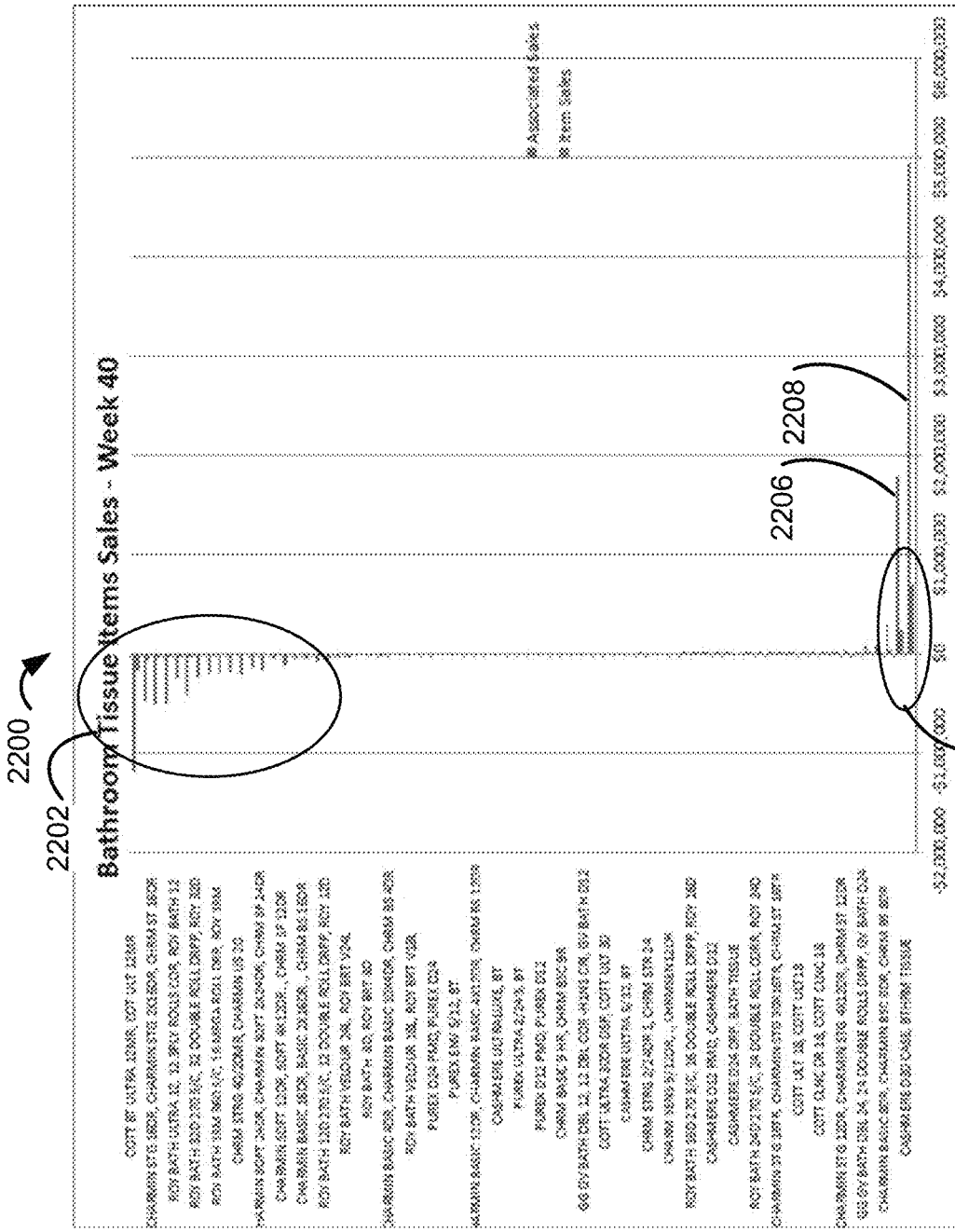
FIG. 22 shows a sales diagram showing cannibalization in a given time period for a product within a sub-tree of a product hierarchy.

Referring next to FIG. 22, there is shown a sales diagram 2200 showing cannibalization in a given time period for a product within a sub-tree of the product hierarchy. The sales diagram 2200 shows positive affinity sales 2204 and cannibalized sales 2202. Promoted items 2206 and 2208 in the sales diagram 2200 may have incremental sales and associated sales above their normal non-promoted sales amount. Other products in the same sub-level of the product hierarchy, for example, the Department Level for Outerwear 2112 in FIG. 21 may be cannibalized (i.e. have a negative incremental sales result compared to their normal sales), or can be supported (i.e. have positive incremental sales compared to their normal sales), even though those item were not promoted.

Figure 23:
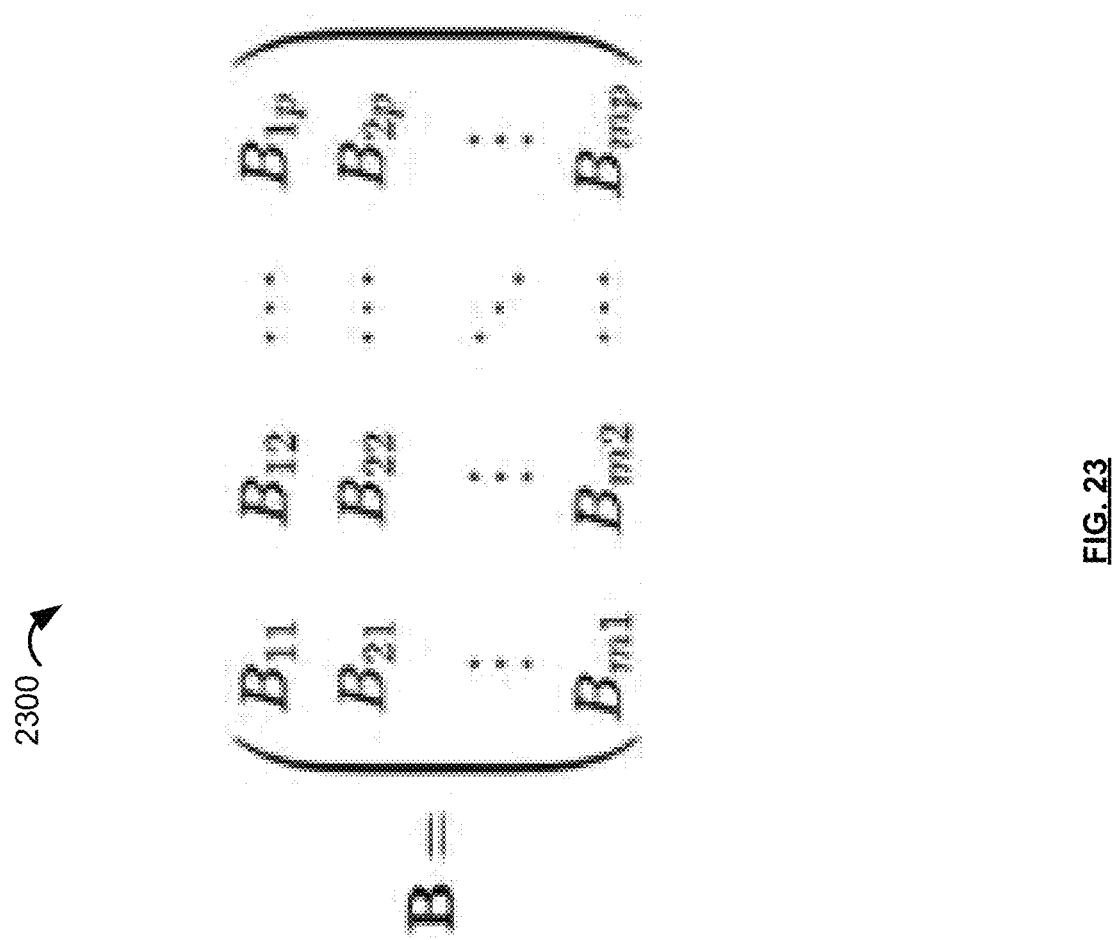
FIG. 23 shows a cannibalization matrix diagram in accordance with one or more embodiments.

Referring next to FIG. 23, there is shown a cannibalization matrix 2300. In the matrix 2300, each entry represents the cannibalization of the sub-tree element m versus element p as a fraction between 0 and 1, and indicating the fraction of the sales p that is cannibalized when product m is purchased. According to one or more embodiments, the cannibalization relationship between itemsets may be determined by performing recursive aggregation of cannibalization at all sub-trees in the product hierarchy and correlation between the promoted and non-promoted items within each sub-tree.

Figure 24:
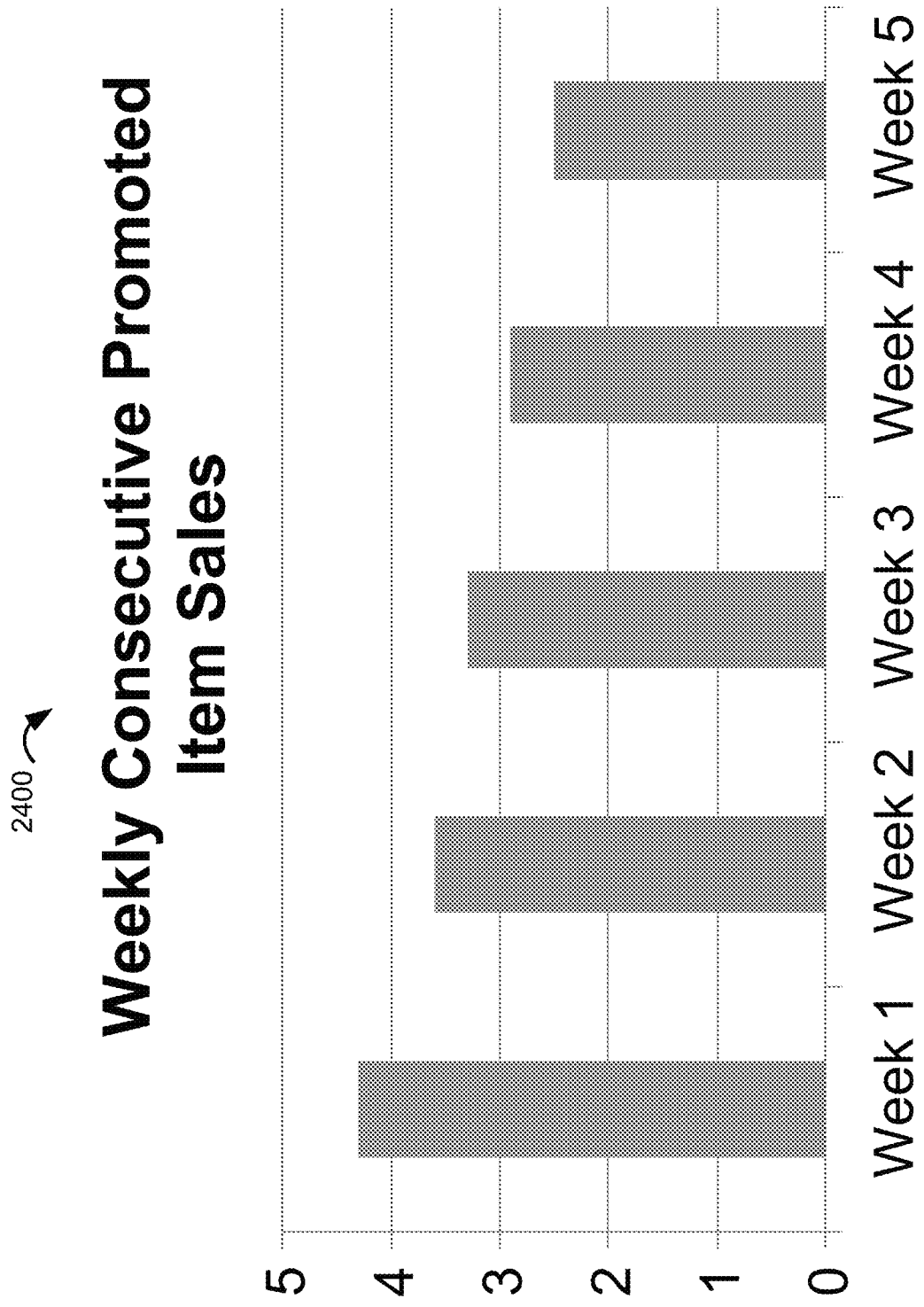
FIG. 24 shows an example sales diagram showing product cannibalization over time resulting from over promotion.

Referring next to FIG. 24, a sales diagram 2400 of product sales cannibalization over time is shown. Product sales cannibalization over time may occur when consumers purchase products intended to be used over a period of time. For example, retailer promotion of non-perishable items week over week may result in decreased sales performance in subsequent weeks due to customers "stocking" up. Furthermore, decreased sales performance in subsequent weeks may also result from promotional fatigue with same products (including associated products appearing too frequently). Thus, inefficient promotion and promotional pricing may result in overall "lost sales".

Promotions may typically increase "consumer forward buying behavior" as consumers stock up on products at a favourably perceived price. Each promoted product may cannibalize its own future sales.

Figure 25:
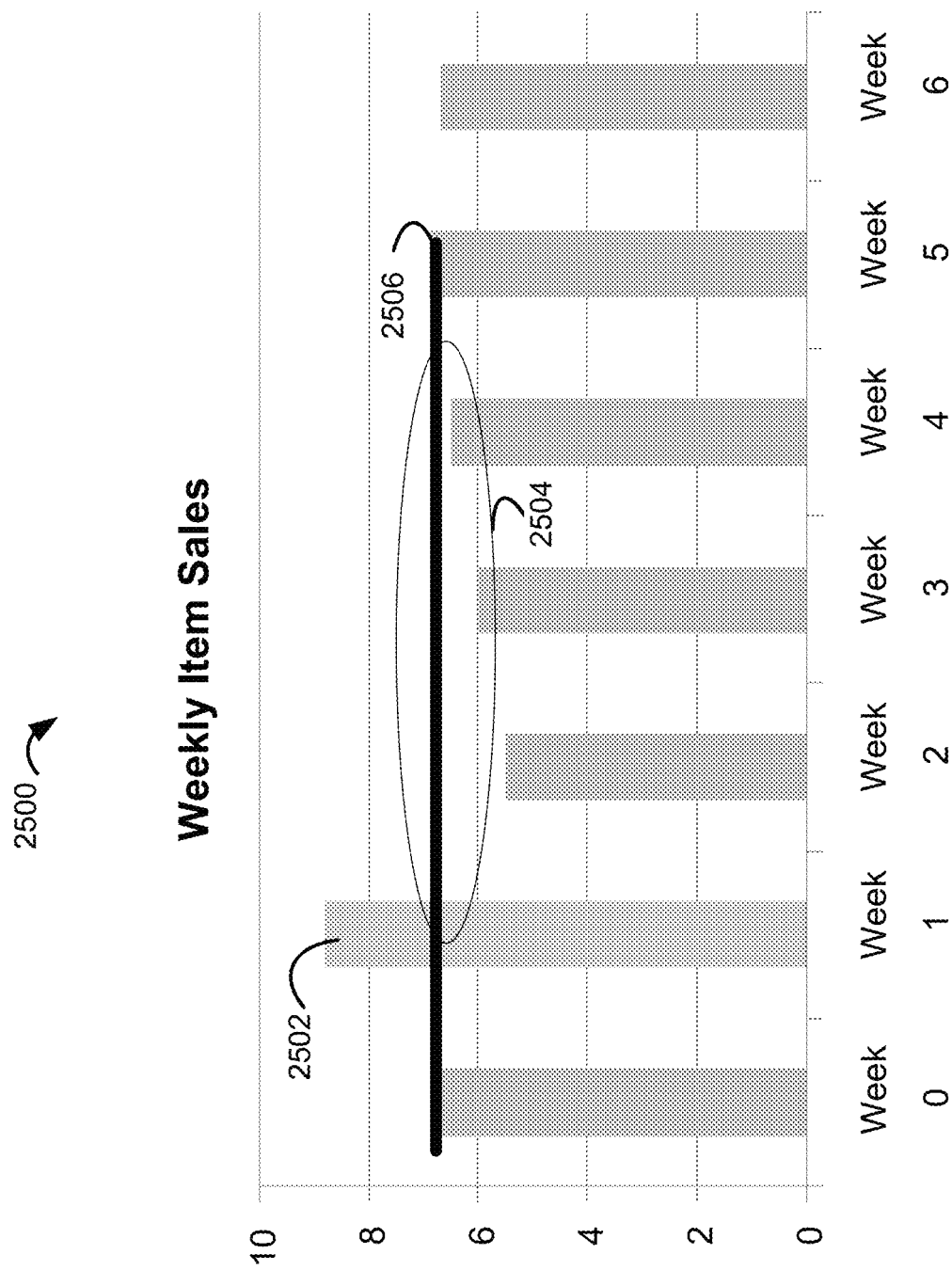
FIG. 25 shows another example sales diagram showing product cannibalization over time.

Referring next to FIG. 25, a sales diagram 2500 shows cannibalization over time that may also occur between products in product hierarchy sub-trees. Promotion of non-perishable items 2502 in week 1 "steals" from future sales of other products indicated by reference 2504 and the sales totals are lower for weeks 2, 3, and 4, and the promoted product may be different from the product being cannibalized. A non-perishable item may have a natural cadence defined as the number of weeks for sales to return to a "baseline" level 2506 following the promotion.

In one or more embodiments, cannibalization that occurs across time may be defined by two measures: (1) duration or cadence; and (2) magnitude. The duration or cadence may be defined as the length of the time that cannibalization occurs.

Figure 26:
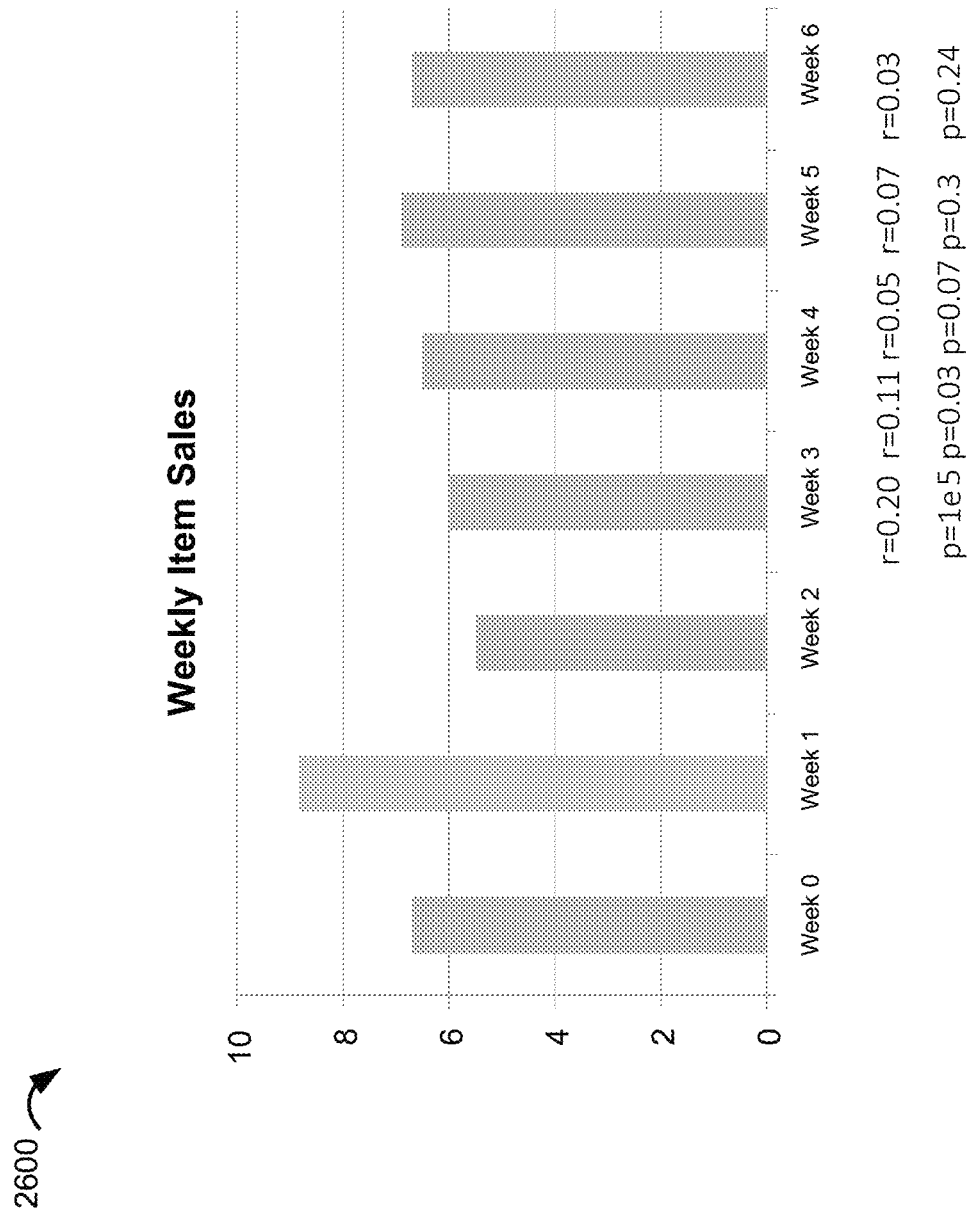
FIG. 26 shows a sales diagram and a method for determining a cannibalization period or cadence according to one or more embodiments.
Figure 27:
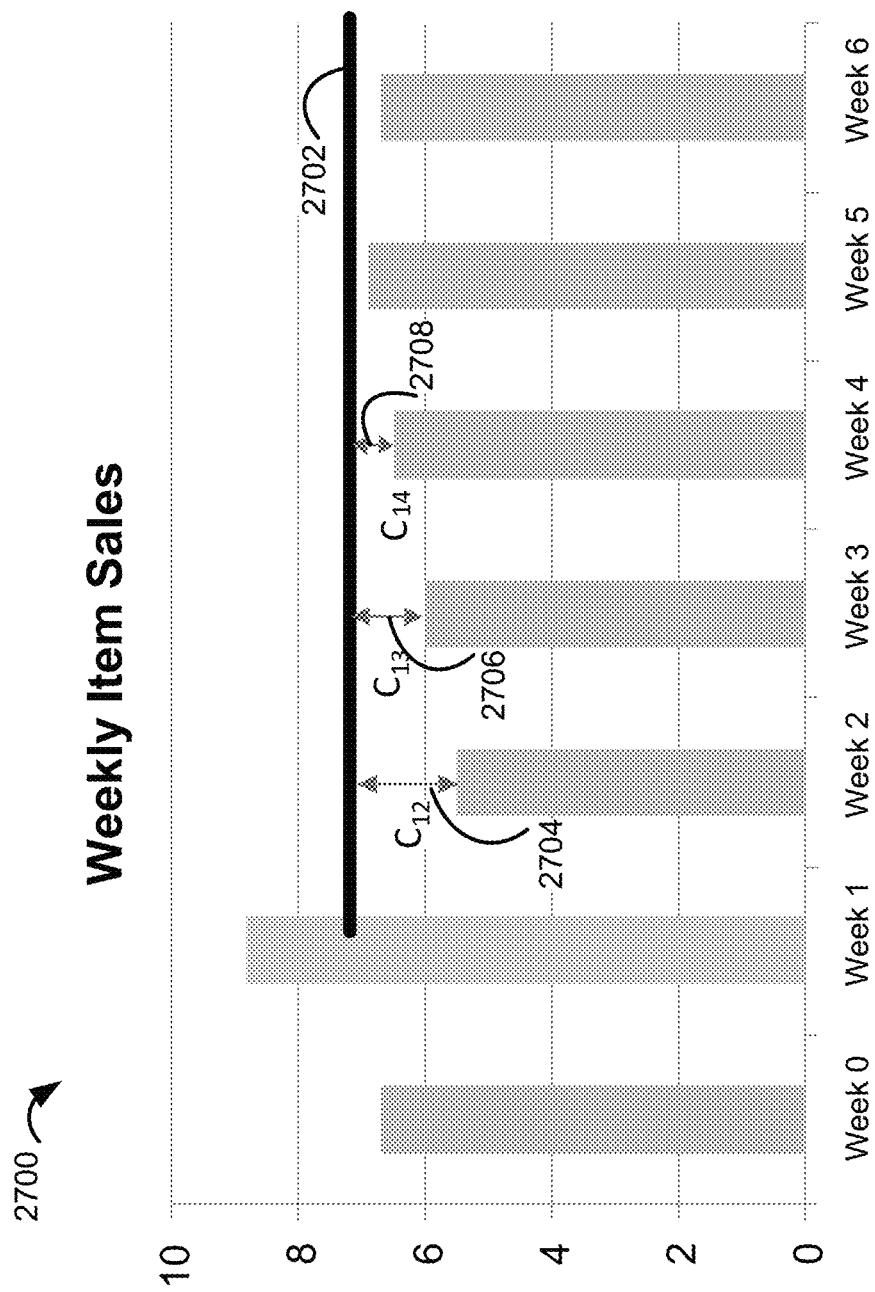
FIG. 27 shows a sales diagram and a method for determining cannibalization magnitude by time according to one or more embodiments.

Referring next to FIGS. 26 and 27 together, there is shown a sales diagram 2600 showing a determination of a cannibalization period or cadence and a sales diagram 2700 for determining the magnitude of cannibalization. The cannibalization period or cadence may be measured in days or weeks. The sales diagram shows weekly item sales per week, and includes a P value and an R value for each week as shown. If the weeks after a promotion are correlated to the promotion week sales then there exists a sales impact. A cadence value may be selected by fitting the change in retail sales after a promotion to an exponential decay function, for example, with a decay constant $\lambda=1.0$. When a product is promoted, a historical data set may be used, including the promoted period and the following sales periods (for example, 10 periods after the historical promotion) may be used to determine a correlation end where the decay effect ceases. The decay function may be exponential decay, or another mathematical function as is known. The decay function may also reflect a product lifecycle. In some cases, the determinations of cadence using historical data may be limited in the number of weeks that may be used to determine the correlation end, for example, if the product is promoted again before the correlation has ended.

As shown in FIG. 26, the weeks of sales after a promotion are correlated to the promotion week of sales to determine if there may be a sales impact, e.g. cannibalization. The cannibalization period may be determined using two methods. The first method may comprise determining a decreased statistical correlation indicated by the p-value of the Pearson correlation coefficient. The second method may comprise using the decay constant to fit the Pearson correlation coefficients with an exponential decay. For example, as illustrated in FIG. 26 a cannibalization period between 3 and 4 is determined when the P-value falls below 90% significance threshold (the first method), or when the decay constant of λ=1.0.

Referring to FIG. 27, a sales diagram 2700 is shown indicating the cannibalization magnitude. The cannibalization magnitude may be the difference, or the gap between actual sales, for example, indicated by references $C_{12}$ 2704, $C_{13}$ 2706, $C_{14}$ 2708, and a baseline 2702 for non-promotional sales.

Figure 28:
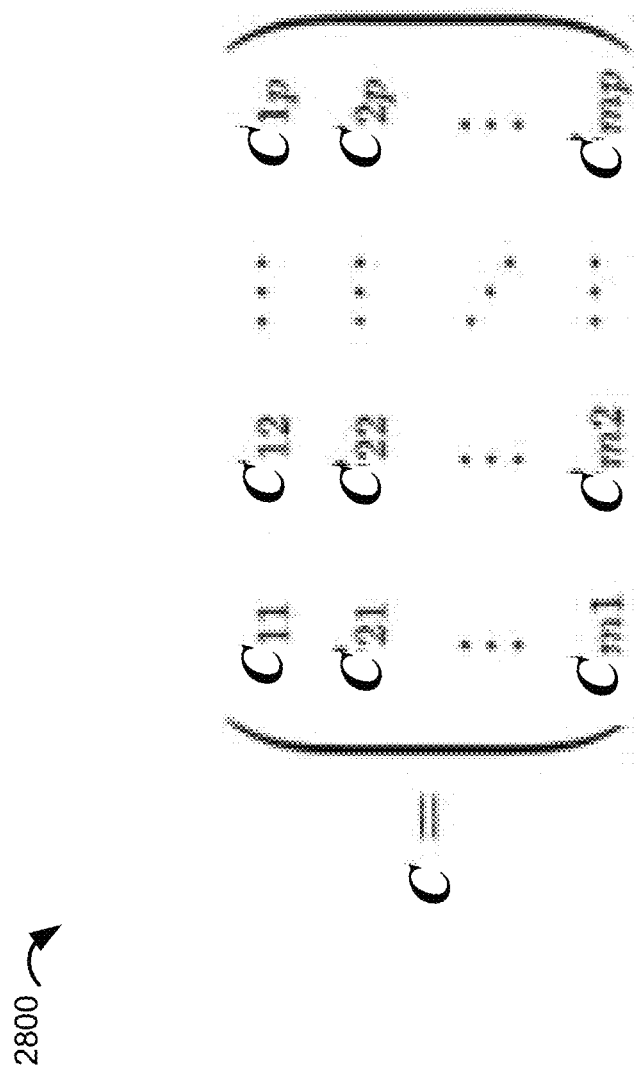
FIG. 28 shows a matrix diagram for determining cannibalization over time according to one or more embodiments.

Reference is next made to FIG. 28, which shows cannibalization matrix 2800 for representing cannibalization over time according to one or more embodiments. The cannibalization matrix 2800 may comprise a four-dimensional $C_{ijmp}$ for determining cannibalization between product i versus product j when product i is promoted on week m and product j is promoted on week n. Each product cannibalization ij may have an N×N matrix (i.e. represented by m and p), where N is the number of periods allowed for measuring cannibalization. The cadence value for each product combination ij may be less than or equal to 2N.

Reference is next made to FIG. 29, which shows a data set 2900 for determining cannibalization cadence and magnitude according to one or more embodiments. The data set 2900 may have a header 2902 and data 2904. Each record 2916, 2918, 2920, 2922, 2924 in the data set 2900 may represent a week, or other time period, that the product in question was promoted and the following weeks or time period immediately following the promoted period. The first column indicated by reference 2906 may have a promotional id for the product in the data set. The second column 2908 in the data set 2900 may represent a promoted period for sales, and subsequent columns 2910, 2912, . . . 2914 may represent the sales for the subsequent periods for the product in question. The data set 2900 may be used for determining self-cannibalization over time, or for determining cross-product cannibalization of a different product. In FIG. 29, P may be the Sales, Margin, Margin % or Transactions for the time period. The parameter Z may be the number of times that a product has been promoted over a period time, i.e. product history. If Product J is used for periods 1 to Y, then cross-cannibalization may be determined. If Product i is used for periods 1 to Y, then product cannibalization may be determined. Cannibalization may be calculated at any level in the product hierarchy.

The cadence of the cannibalization may be determined by correlating the subsequent columns 2910, 2912, . . . 2914 against the promoted column 2908 to determine a Pearson correlation coefficient and its p-value for each time period. If the subsequent period is affected (cannibalized) by the product promotion there may be a correlation. Once the correlation is reduced, the cannibalization may no longer occur and may be considered finished if below a threshold. The difference in time expressed as a number of periods may be the difference between the period where the correlation is sufficiently reduced and the promotion period. One method for determining when the correlation is sufficiently reduced may be by looking when the p-value shows a low correlation at some confidence level. A second method may comprise fitting an exponential decay curve ($e^{-\lambda t}$) to the correlation values and using the decay constant A which best fits correlation values where t represents the number of time periods since the promotion.

It will be appreciated that for some products, it may not be possible to determine cannibalization because (a) the product has not been promoted enough to get a statistically significant measurement; (b) the product is promoted frequently; or (c) the product does not have any cannibalization effect. For these products, a retailer may implement a rule setting a pre-determined default cannibalization period and a default magnitude, i.e. the matrix 2800 in FIG. 28. Cannibalization may be calculated at any level in the product hierarchy.

Referring back to FIG. 5A, at 506, feature detection to identify relevant features is performed. The feature detection may comprise selecting relevant actionable features and non-actionable features.

According to one or more embodiments, the feature detection may comprise a process for reducing features to those features that are relevant for the current period being processed. According to one or more embodiments, the feature detection process may comprise a linear correlation on the features versus the metric being selected (e.g. sales, gross margin, transactions) and a selection of the most linearly correlated features followed by removal of all redundant features that are correlated to each other.

In one or more embodiments, principal components analysis may be performed to form a linear basis of the dimensionality of the number of features followed by correlation of the components versus the metric being selected.

In one or more embodiments, LASSO regularized regression may be used to select relevant features that are most predictive of the metric being selected.

In one or more embodiments, a Deep Neural Network (DNN) Auto Encoder may be trained so that the input feature layer matches an identical output layer, the innermost layer of the network representing a non-linear reduced feature set to be correlated to the metric being selected.

At 508, a retail pricing model may be generated for determining sales, gross margins, transactions and other retail metric derivable from transaction data may be determined, as described below.

In one or more embodiments, generating a retailer state model may involve solving Equation (1). Equation (1) comprises a mathematical function that is executed by the retail pricing model 418 of the intelligent agent 400 (see FIG. 4), the mathematical function may be executed to model a retail environment and simulate retail metrics, for instance, year-over-year sales, margins and/or transactions as a function of year-over-year promotional difference, i.e. associated sales impact minus cannibalization impact.

In order to generate the retail pricing model, several years of historical retail data may be used in order to minimize external effects on a balance of averages over the years.

According to one or more embodiments, Equation (1) takes the following form:

$$\hat{s(t)} = \sum_{i=1}^{N}\left[\sum_{mo=1}^{n_m}\left\{\sum_{ps=1}^{n_{ps}}\left(\sum_{p=1}^{n}f_p(a(t_{ps}),b(x,t_{ps}))+\right.\right.\right.$$
$$\left[\sum_{j=1}^{m}\left\{(x(t)_j-x'(t_{ps})_j)y_j(t_{ps})\sigma_jP_j(t_{ps})\sum_{k=1}^{m}\beta_{c(j)}(A_{jk}(t_{ps})\right.\right.$$
$$\left.\left.\left.\left.-B_{jk}(t_{ps}))R_{d(k)}\right\}+Vj\right]\right)_{ps}\right\}_{mo}\right]$$

where

ŝ=total sales, gross margin or transactions for the period in question (i.e. time t) Feature values and theory components may be for time $t_{ps}$ the relevant power spectrum peaks.

N=number of weeks for the historical data used for the calibration $n_{ps}$=number of power spectrum peaks used $n_m$=number of sub-segments (i.e. geographic region, price zone, store cluster, store type, customer segment)

n=number of terms in the predictive model (i.e. number of coefficients)

m=the number of elements of the product hierarchy level used in the equation $x_j$=the number of products being promoted in the week in question where the product can be represented by any level in the product hierarchy whose elements are identified by index j. This is an integer.

$x'_j$=the number of products promoted in a prior period of interest for hierarchy level value j. This is an integer.

$f_p(a,b(x_p))$=linear or non-linear model with features calculated at prior periods of interest, with a=non-actionable features (these variables don't depend on the solution vector x)

b(x)=actionable features (depend on the solution vector x)

In linear form, $$f_p(a,b(x))=C_0+C_1a_1+C_2a_2+\ldots+C_ra_r+C_{r+1}b_1+C_{r+2}b_2+\ldots+C_nb_{n-1-r}; \text{ where } p=(1,n)$$

Figure 30:
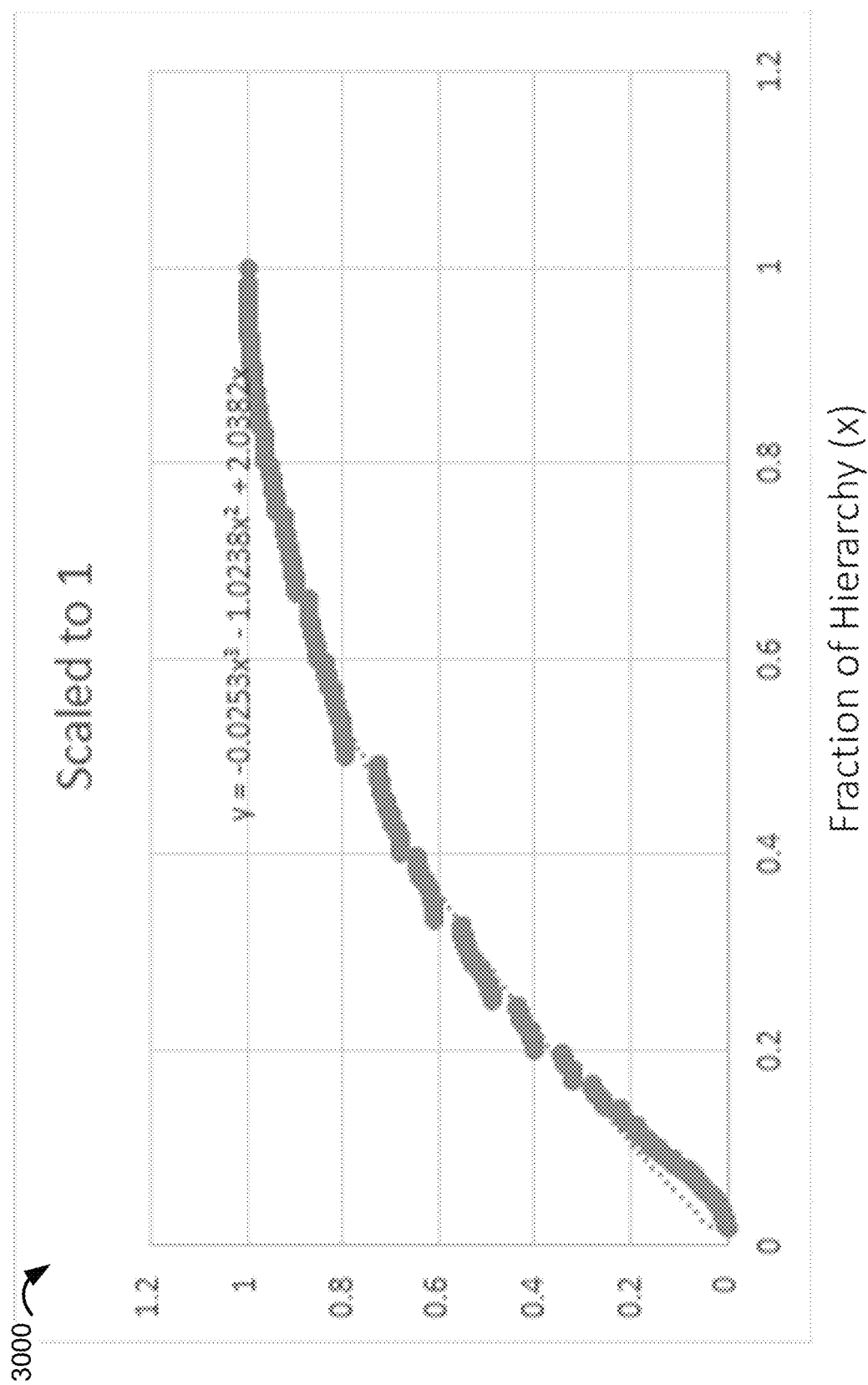
FIG. 30 shows a scaling diagram having a curve representing an increasing number of products promoted within a hierarchy sub-tree.

$C_p$=coefficients (that will be calibrated)

r=number of non-actionable features in the model n-r=number of actionable features in the model P=Average sales, margin or transactions per week P may be further decomposed to q (quantity) times p (average price) for sales, q times gm (Average margin) where the solution vector becomes p for price optimization $\sigma_j$=Aggregated promotional elasticity of promotion placement for promotion items $y_j$ may be a fraction of the total average sales, margin or transactions per week representing the fact the increasing the number of products promoted within a hierarchy sub-tree does not scale linearly and it may not scale beyond the maximum number of products available. Based on actual data unique to each product hierarchy sub-tree, it may be possible to fit a polynomial curve or other diminishing curve to the actual data, for example, as shown in FIG. 30.

$A_{jk}$=affinity matrix showing affinity between itemset j with itemset k. Item could be any level in the product hierarchy. For sales or margin optimization, affinity elements are confidence, for transaction optimization the elements are support.

$B_{jk}$=cannibalization matrix showing cannibalization between itemset j with itemset k. Item could be any level in the product hierarchy. For sales or margin optimization, cannibalization elements are scaled to affinity confidence, for transaction optimization the elements are scaled to affinity support.

$R_{d(k)}$=resultant binary of item k ... the coefficient is a function of k, the number of coefficients is less than or equal to k $$R_k = \begin{cases} 0 & \text{if } (x_k - x'_k) = 0 \\ 0 < c < 1 & \text{otherwise} \end{cases}$$

the constant c to be calibrated $\beta_{c(j)}$=unknown model coefficient to be calibrated ... the coefficient may be a function of j, the number of coefficients is less than or equal to k $V_j$=any marketing funding provided to the retailer in exchange for including the product j in the promotion for a specific period or periods.

At 508, the retail pricing model 418 of the intelligent agent 400 (see FIG. 4) may be generated by executing Equation (1) and determining the coefficient values of Equation (1) that minimizes the error between predicted values and historical data.

At 510, a control policy (e.g. for the price planning model) may be selected to identify preferred pricing decision options for the retailer. This may involve defining or using a selected policy derived from the retailer state model in order to simulate pricing decisions and generate a retail pricing plan that may comprise a sequence (e.g. long term) of item level prices which can increase long term reward or return for the retailer.

To select the selected control policy, the intelligent agent 400 may search for a control policy using the control policy search 420 (see FIG. 4). The control policy search 420 may be configured to assemble and execute Equation (1) for historical periods where features and a metric of interest are known. Equation (1) may be configured using weekly values of the affinity and cannibalization at the category level of the product hierarchy. In another embodiment, other period sizes and hierarchy levels may be used. The solution vector $p_j$ may be at a lower level of the product hierarchy (typically sub-category if category or sub-department is used for the affinity and cannibalization matrices).

Referring next to FIG. 31, there is shown a table diagram 3100 of an example data set. The data in table diagram 3100 may include a header 3102 and data 3104. The summations in Equation (1) may be expanded to form a data set structure 3100 which may be used for searching for the selected control policy. The data set 3100 may be based on Z periods, and each period may comprise a promotional week, but may be selected to have a shorter or a longer duration. As shown, the header 3102 includes an "Actual Sales or Gross Margin or Transactions" column 3108, where Yi may represent the actual value of the metric of interest and taken from historical data; and a "Predicted or Gross Margin or Transactions" column 3110, where Yi(hat) may represent the predicted value of the metric of interest based execution of Equation (1) with historical data. The remaining columns 3112, 3114, 3116 in the data set 3100 may comprise the resultant features generated through the execution of Equation (1), where $X_{11}$, to $X_{ZN}$ represent the features or component for Equation (1).

According to one or more embodiments, the known historical data may be used to identify the floating point coefficients $C_p$ in the equation $f_p(a,b(x_p))$ and also the coefficients $\beta_{c(j)}$ by minimizing $|s-\hat{s}|$ where s is the known value of the metric of interest from historical data and $\hat{s}$ is the value of the metric calculated from the above. It is appreciated that the above equation is linear and the coefficients $C_p$ and $\beta_{c(j)}$ may be determined using gradient descent. The equation and coefficient values which minimize $|s-\hat{s}|$ may comprise the selected control policy which may be used to choose the control input vector $p_j$, the price of the promoted and/or non-promoted products in a given period for each item level in the product hierarchy.

Referring back to FIG. 5A, at 512 the selected control policy may be used to simulate pricing decisions by the retailer. According to one or more embodiments, the retail system planning process 500 may be configured to execute Equation (1) using the selected control policy to make pricing decision evaluations as follows in order to simulate selected planning options for the retailer.

According to one or more embodiments, Equation (1) may be used with selected coefficients $C_p$ and $\beta_{c(j)}$ that reduce $|s-\hat{s}|$ over historical time periods to forecast the future performance of the desired metric. The selected sequence of actions $p_j(t)$ may be the one that increases the reward $\hat{s}(t)$ over a sequence of times t. For example, if Equation (1) is set up for the category level in the hierarchy (i.e. the affinity and cannibalization matrices are calculated at the category level) and if the control input $p_j$ is set up to be the aggregate price of products promoted at the sub-category level, then maximizing $\hat{s}(t)$ for various sequential times t by varying the control input $p_j(t)$ is equivalent to finding the selected action or promotion/regular/markdown price $p_j(t)$ at each time t.

The detailed item level prices that comprise the solution vector $p_j(t)$ may be subject to minimum and maximum constraints on the range of allowable prices to be considered. For example, the pricing decisions may have a target gross margin typically by department or sub-department or category level in the hierarchy. The constraints may be expressed in Equation (2) as a series of constraints of the form:

$$Pr_{minl} < p_l(t) < Pr_{maxl} \quad \text{Equation (2)}$$

where $p_l(t)$ may be the price for item l which is constrained to be between $Pr_{minl}$ and $Pr_{maxl}$. The minimum and maximum prices may be based on the cost of the product, competitor pricing and desired gross margin. The constraints may be unique to each item.

At 514, for each price point of each pricing decision, quantity forecasts may be determined for all the potential price levels. The quantity forecasts for each price point of all potential price levels may be pre-computed by a forecasting agent. The method 500 may iterate between 514 and 512 in order to evaluate multiple price points to find selected prices over time. In one or more embodiments, the iteration may involve using the selected control policy to generate a long-term sequence of item level prices for promotional items and/or non-promotional items that increases the long-term reward or other objectives of the retailer.

The plurality of price points for each pricing decision may be stored in a prediction table in a cache or database. This plurality of price points may be reviewed based on business rules to reduce the plurality of price points that are within the bounds of the business rules. For example, there may be a fixed number of price suffixes, such as 99 cents, 9 cents, 81 cents, etc. This example may reflect the fact that particular organizations always price products using a fixed number of suffixes. There may be other business rules for the organization and they may be configurable. Other rules may include price margins (minimum), quantities (for example, large pack size or limited capability for storage), etc.

At 516, the item level prices and quantities may be aggregated by sales or quantity weighted averaging to each level in the product hierarchy. Similar to the business rules for product prices, there may be product hierarchy level business rules addressing particular prices and quantities.

At 518, a retail pricing plan may be determined based upon the sequence of solution vectors for a period of time $p_j(t_1)$ to $p_j(t_N)$ a pricing plan (regular, promotion or markdown) may be generated for periods $t_1$ to $t_N$.

The retail pricing plan may be a subset of the pricing decisions, quantity forecasts for a plurality of products, or levels in the product hierarchy. This subset may be selected in order to maintain halo effects of the individual products or product hierarchy levels. The halo effects may refer to the increase in sales of other products in the product hierarchy, other levels in the product hierarchy, etc.

The retail pricing model may be periodically trained based on the predicted quantities, prices, elasticities and cross-elasticities as compared to the actual data collected from the organization that has applied the price changes in order to provide a measure of reinforcement learning.

Figure 32:
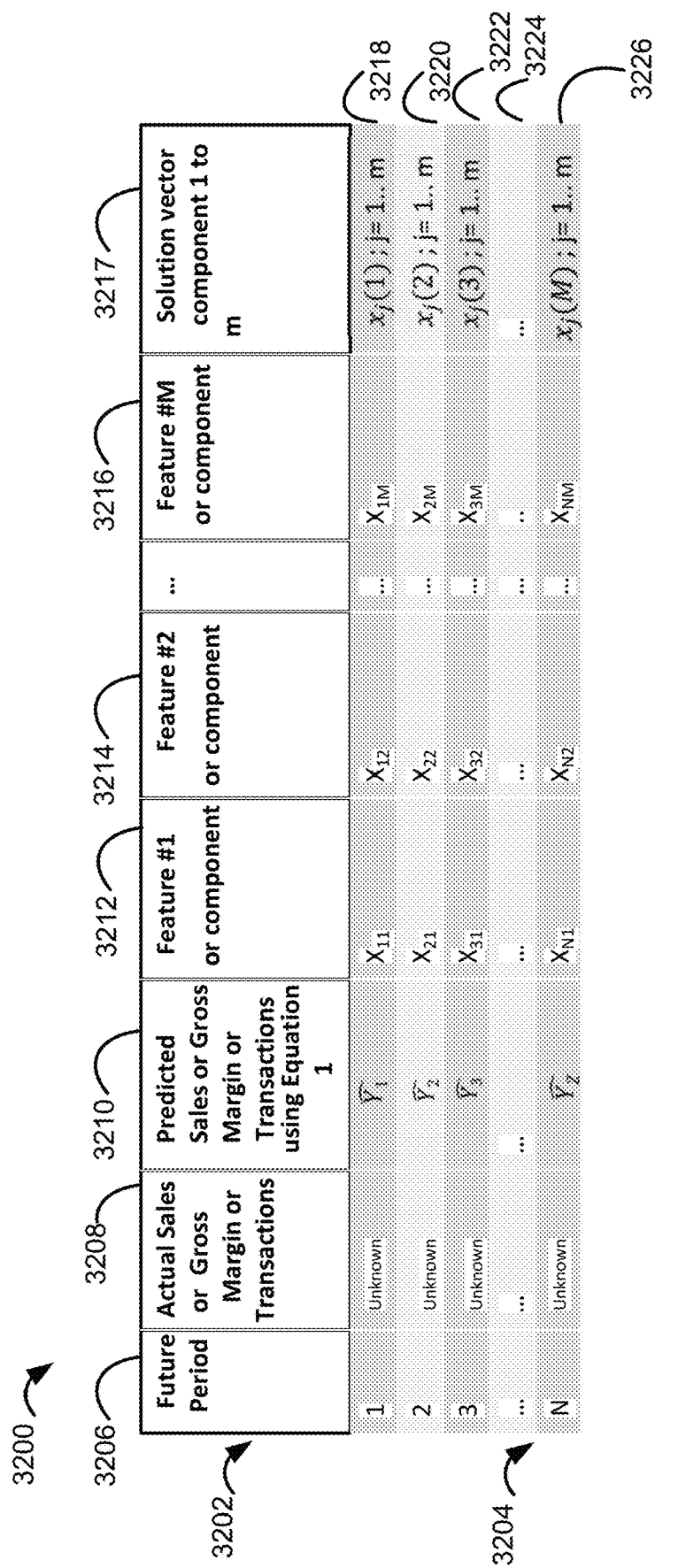
FIG. 32 shows a table diagram of an example data set configured for using the selected control policy for determining selected control inputs according to one or more embodiments.

Referring to FIG. 32, there is shown a data set 3200 for using the selected control policy to define selected control inputs. The data set 3200 may have headers 3202 and data 3204. The headers 3202 may include a future period identifier 3206, Actual Sales or Gross Margin or Transactions 3208, Predicted Sales or Gross Margin or Transactions 3210, a Feature #1 component 3212, a Feature #2 component 3214, to Feature #M 3216. The header may also include a solution vector component. It is appreciated that there may be many features for each data point in the data set 3200. The period of data set 3200 may be a promotional week, or another period of shorter or longer duration. There may be N periods of optimal actions to plan. $\hat{Y}_t$ may represent the predicted value of the metric of interest. $X_{11}$ through $X_{ZM}$ may represent the features and components. The features 3212, 3214 to 3216 may be one or more price elasticity curves, including a family of price elasticity curves (see e.g. FIGS. 33, 34 and 35). The family of curves may include curves determined by region, by time, by seasons, etc. The features 3212, 3214, 3216 may further comprise a family of price cross-elasticity curves for different products (see e.g. FIG. 35). $x_j(t)$, j=1 . . . m may be the control inputs in Equation (1) to be selected (i.e. price).

According to one or more embodiments, to solve Equation (1) with constraints of Equation (2) and the data set 3200, the retail system planning process 500 is configured to execute a genetic algorithm or particle swarm optimization in order to simulate the future and choose a selected control strategy. It will be appreciated that genetic algorithms may be a form of reinforcement learning that introduces a combined element of exploitation (using long term and short term known history) and search (using a random searching capability to learn new actions not taken in the past).

Figure 33:
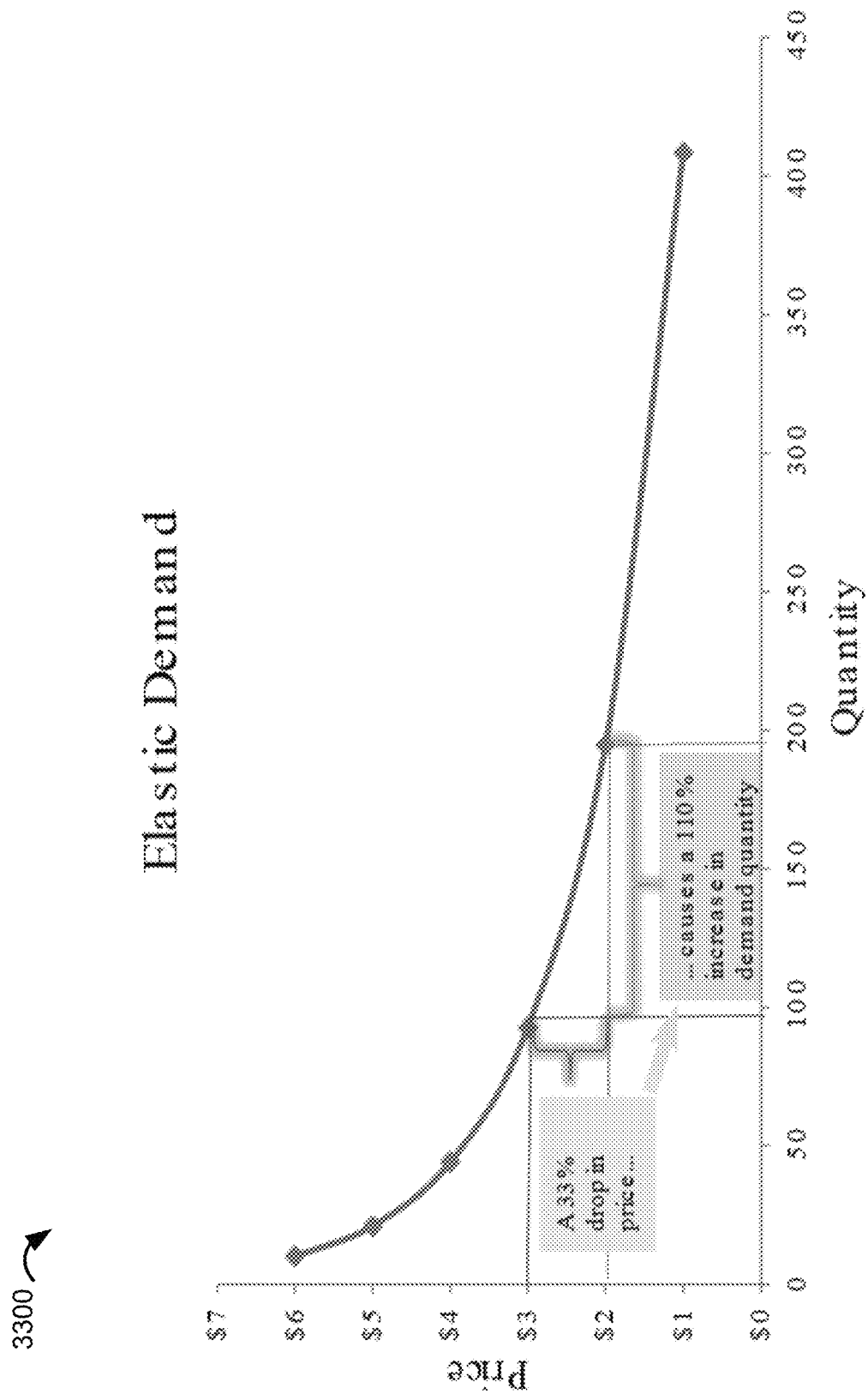
FIG. 33 shows a price elasticity diagram including a demand curve.

Referring next to FIG. 33, there is shown a simplified price elasticity diagram 3300. The price elasticity curve may reflect the price elasticity of demand for a product, a hierarchy level in the product hierarchy, etc. Price elasticity of demand (PED) is a measure used in economics to show the responsiveness, or elasticity, of the quantity demanded of a good or service to increase in its price when nothing but the price changes. More precisely, it gives the percentage change in quantity demanded in response to a one percent change in price.

Figure 34:
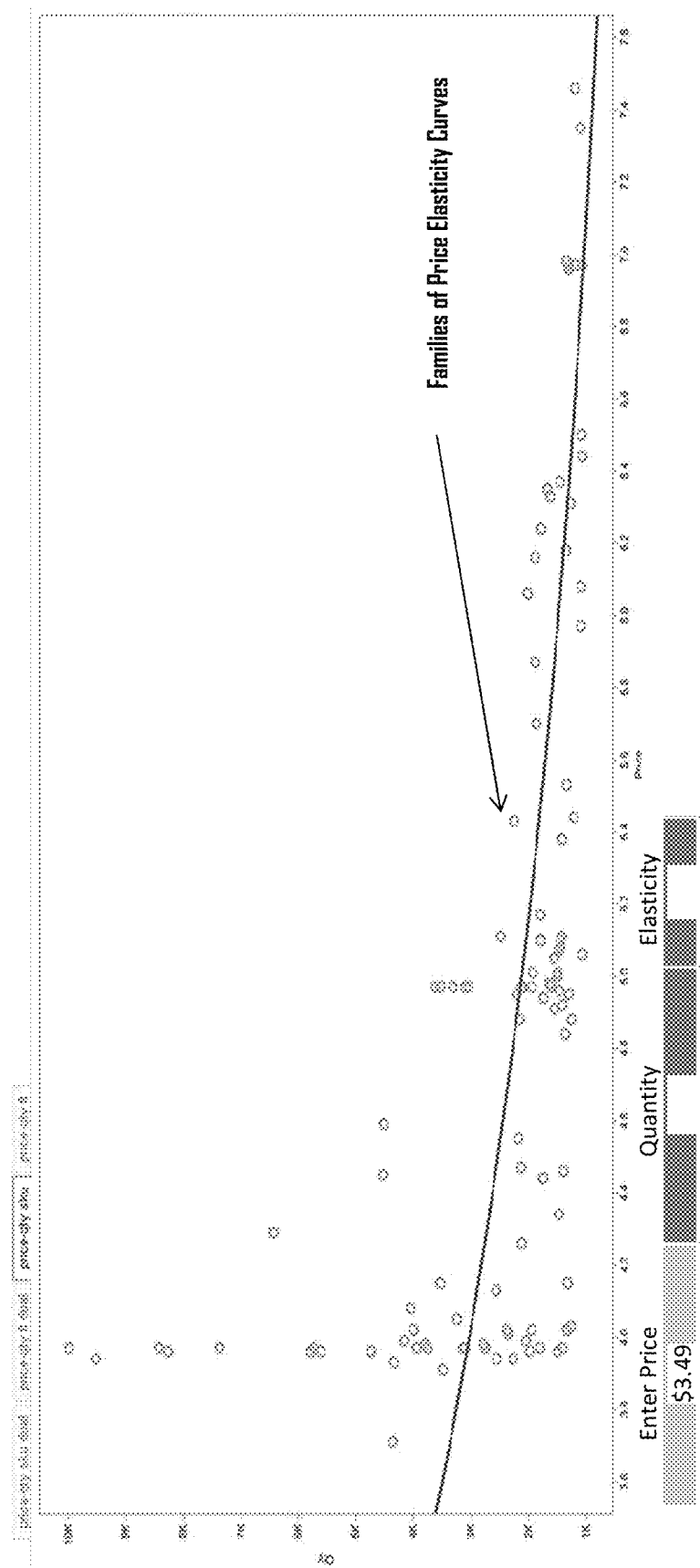
FIG. 34 shows a price elasticity diagram including an example of price-quantity data for a single product and how a family of price elasticity curves best represents the data.

Referring next to FIG. 34, there is shown a family of price elasticity curve diagram 3400. The family of price elasticity curves in 3400 may be determined for a plurality of products, a plurality of product hierarchy levels, and may be used as features for the determination of product pricing decisions in the electronic retail pricing plan as disclosed herein.

Figure 35:
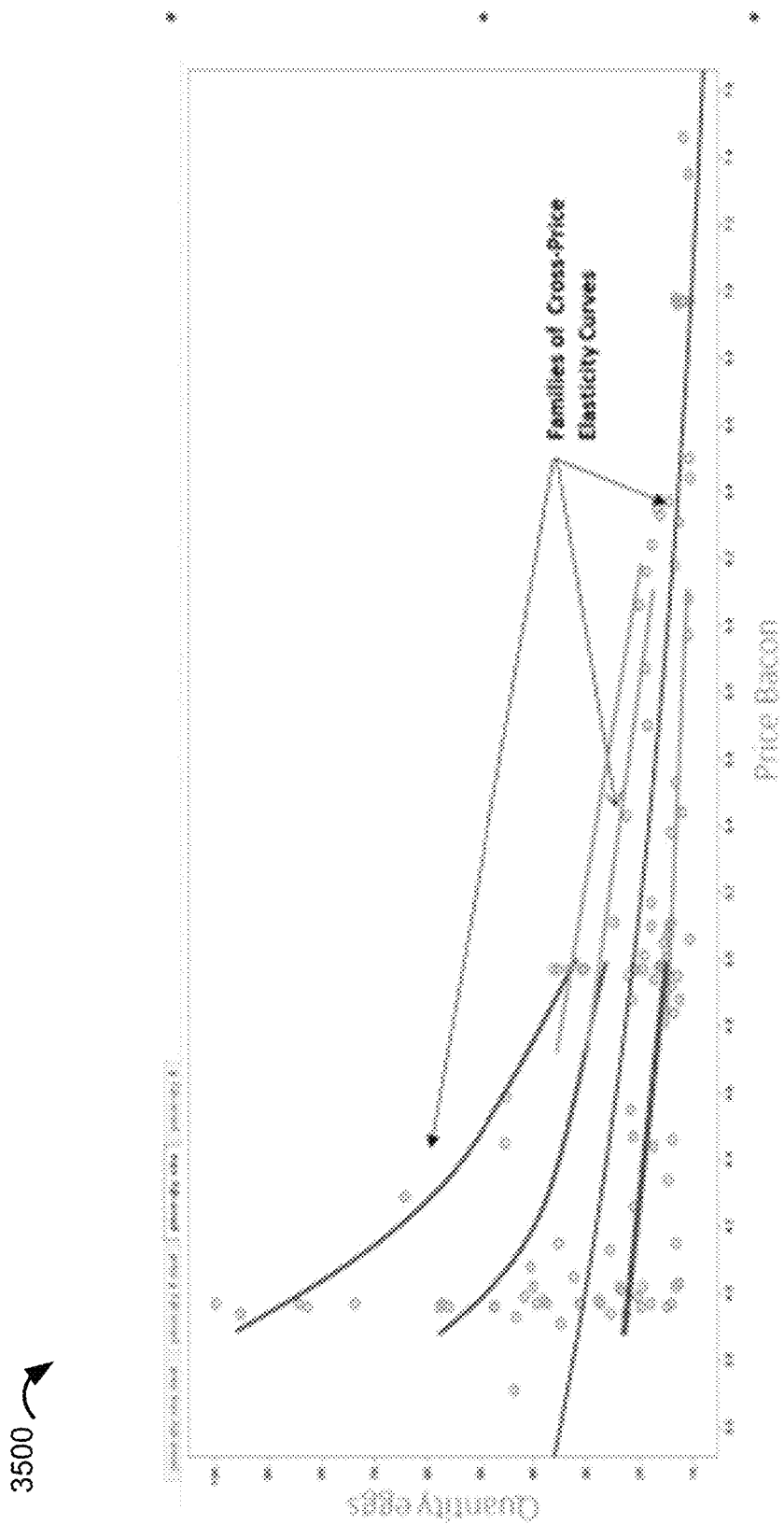
FIG. 35 shows a price elasticity diagram including an example of price-quantity data between two different products and how a family of price cross-elasticity curves best represents the data.

Referring next to FIG. 35, there is shown an example of a family of price cross-elasticity curves 3500. In this example, two products or hierarchy levels that are used in order to determine the family of price cross-elasticities are eggs and bacon. The vertical axis of diagram 3500 is quantity of eggs and the horizontal axis is the price of bacon. The family of price cross-elasticity may reflect the quantity of eggs sold as a function of the price of bacon, two products where a strong halo effect exists.

Referring back to FIG. 5A, at 518, a retail pricing plan is determined. According to one or more embodiments, the output retail plan may comprise a selected multi-period decision set with a gamified reward measure.

The output retail pricing plan may be based on the execution of Equation (1) subject to the constraints of Equation (2).

At 520, the retail pricing plan may be implemented by the retailer. This may be performed by a user applying the price decisions in an enterprise software system. According to one or more embodiments, the output retail price plan may be directly integrated into the retailer's computer systems, for instance, the operational computer systems configured for executing purchasing, pricing and forecasting such as retailer operational system 240.

In operation, it is desirable for retailer users to modify the retail pricing plan decisions provided, including the recommended pricing solutions (or control inputs) for reasons of product availability, competitive pricing concerns, product cost and in some cases human intuition. The retail pricing plan may further comprise one or more alternative price points previously evaluated and stored in short term agent memory. The alternative price points may be ranked by a relative index score, indicating the desirability in their selection for accomplishing the goals of the retail pricing plan (i.e. increasing sales). Based on the incremental value of each altered product price combination in the solution vector, the alternate pricing decisions include a larger set of products for alternative consideration when the selected control input solution is modified for each product price decision. These alternate pricing decisions may be ranked and may provide an index correlated to the incremental value of that product price to the decision set. The relative index can be used to compare the difference in expected sales performance of two ranked pricing decisions. This ranking and relative index may permit gamification of the otherwise complex output of the intelligent agent process.

Figure 7:
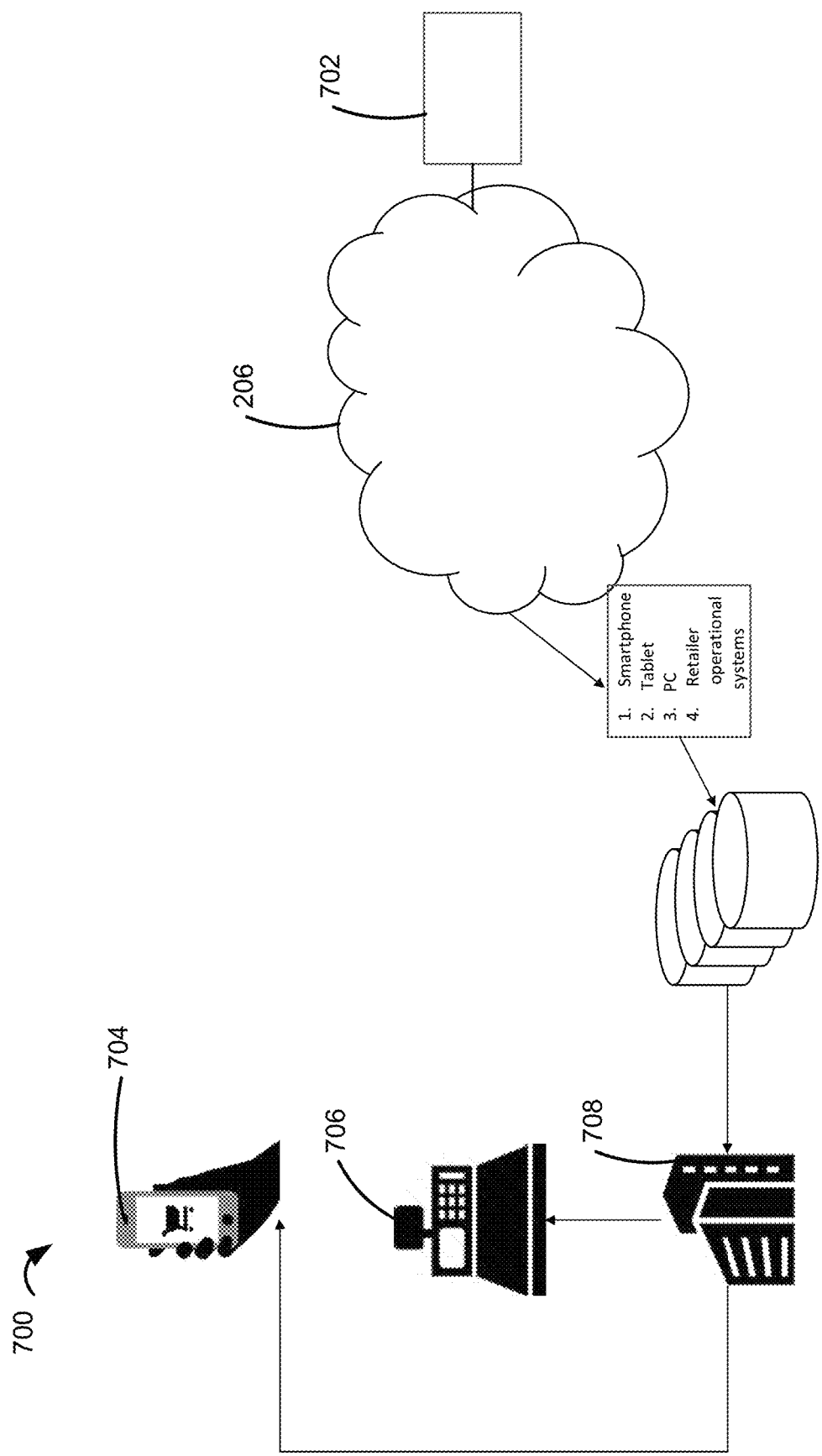
FIG. 7 is a data flow diagram from the retail merchandise price planning system to retailer entities according to one or more embodiments.

Referring next to FIG. 7, there is shown a data flow diagram 700 from the retail merchandise price planning system to retailer entities.

The retail pricing plan 702 may be transmitted from the retail price planning system 202 via network 206 to the retailer system 204. The retail pricing plan 702 may be received by a retailer system 708 and implemented to change product prices based on the plan for users at an ecommerce point of sale 704 and/or a retail point of sale 706. The retail pricing plan 702 may be gamified, and may be used by, for example, an automated approval engine that may be configured to execute pricing decisions at the retailer based on thresholding or to trade off alternative decisions to determine the alternatives. Accordingly, the pricing determination may be determined based upon two measures, such as a rank and an index, and a partial differentiation may be used to determine a gamification index, as described in more detail below.

In an alternate embodiment where the retail price planning system 202 is "locally hosted", the retail price plan 702 may instead be transmitted from within the retailer network.

Referring back to FIG. 4, a gamified price plan may facilitate the evaluation of the overall impact on rank and relative index on the selected pricing decision set by changes to the product price recommendations. The rank and relative index may be determined by a simulated system 460. The retailer may compare the rank and index of multiple pricing options with the goal to reduce rank and increase relative index.

In one or more embodiments, sub-games may be executed within the product hierarchy sub-trees by choosing a minimum rank and maximum relative index that would be possible within the sub-tree. For example, a sub-game may show a set of pricing decisions within a particular sub-tree of the product hierarchy. The price plan may therefore be produced for a particular department or sub-organization of a retailer such that individual employees of a larger retailer may price products within their respective department, and understand the relative value of each proposed price point in the price plan.

The gamification may involve, for the price points in the price plan, determining sales or margin for the price points, a global ranking for each price point, and or a relative index for each price point. This may be performed in order to identify the "low hanging" pricing decisions that may have a more significant impact over others. The ranking and/or index may show a relative value of a first pricing decision as compared with a second pricing decision. The gamification of price points may exist for a product, or for a level within the product hierarchy.

The execution of the retail pricing plan by the retailer system may be monitored and collected using the retailer operational system 240 (see FIG. 2A). For example, the execution of the retail pricing plan 520 may occur on an ongoing basis and data collected at 502 in a feedback loop as indicated to determine the effect of the retail pricing plan. The data collection may be done at data input 410 (see FIG. 4).

Referring next to FIG. 5B, there is shown a method drawing 530 of generating an electronic retail price model and a selected control policy for retail operations performed within an enterprise network comprising a plurality of distributed computing devices, the plurality of distributed computing devices comprising a plurality of point-of-sale devices and a plurality of enterprise servers, the plurality of distributed computing devices in network communication.

At 532, receiving, at a first server of the plurality of enterprise servers, transaction data from the plurality of point-of-sale devices, the transaction data defined as a time series including a plurality of transaction data items corresponding to one or more previous time periods, the plurality of transaction data items comprising at least one of price data, product data, and customer data.

At 534, determining, at the first server, transformed transaction data based on the transaction data.

At 536, determining one or more features from the transformed transaction data.

At 538, determining one or more actionable features from the one or more features.

At 540, generating an electronic retail price model from the one or more actionable features.

Figure 5C:
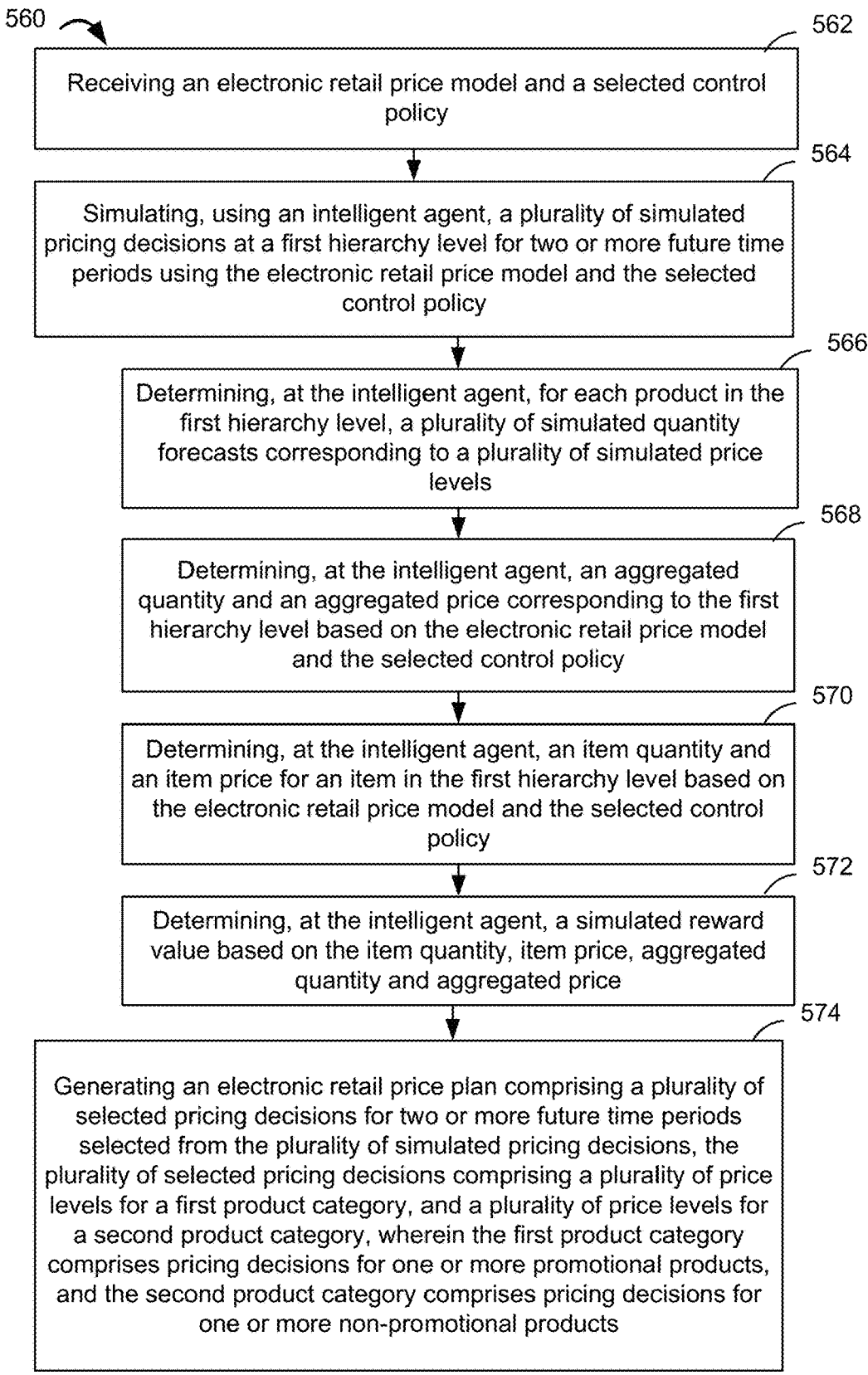
FIG. 5C is a method diagram for generating an electronic retail price plan according to one or more embodiments.

At 542, selecting a selected control policy for the electronic retail price model, and wherein the electronic retail price model and the selected control policy cooperate with an intelligent agent to determine an electronic retail price plan by simulating a plurality of simulated pricing decisions Referring next to FIG. 5C, there is shown a method drawing 560 of generating an electronic retail price plan for retail operations performed within an enterprise network comprising a plurality of distributed computing devices, the plurality of distributed computing devices comprising a plurality of point-of-sale devices and a plurality of enterprise servers, the plurality of distributed computing devices in network communication.

At 562, receiving an electronic retail price model and a selected control policy.

At 564, simulating, using an intelligent agent, a plurality of simulated pricing decisions at a first hierarchy level for two or more future time periods using the electronic retail price model and the selected control policy.

At 566, determining, at the intelligent agent, for each product in the first hierarchy level, a plurality of simulated quantity forecasts corresponding to a plurality of simulated price levels.

At 568, determining, at the intelligent agent, an aggregated quantity and an aggregated price corresponding to the first hierarchy level based on the electronic retail price model and the selected control policy.

At 570, determining, at the intelligent agent, an item quantity and an item price for an item in the first hierarchy level based on the electronic retail price model and the selected control policy.

At 572, determining, at the intelligent agent, a simulated reward value based on the item quantity, item price, aggregated quantity and aggregated price.

At 574, generating an electronic retail price plan comprising a plurality of selected pricing decisions for two or more future time periods selected from the plurality of simulated pricing decisions, the plurality of selected pricing decisions comprising a plurality of price levels for a first product category, and a plurality of price levels for a second product category, wherein the first product category comprises pricing decisions for one or more promotional products, and the second product category comprises pricing decisions for one or more non-promotional products.

Figure 6:
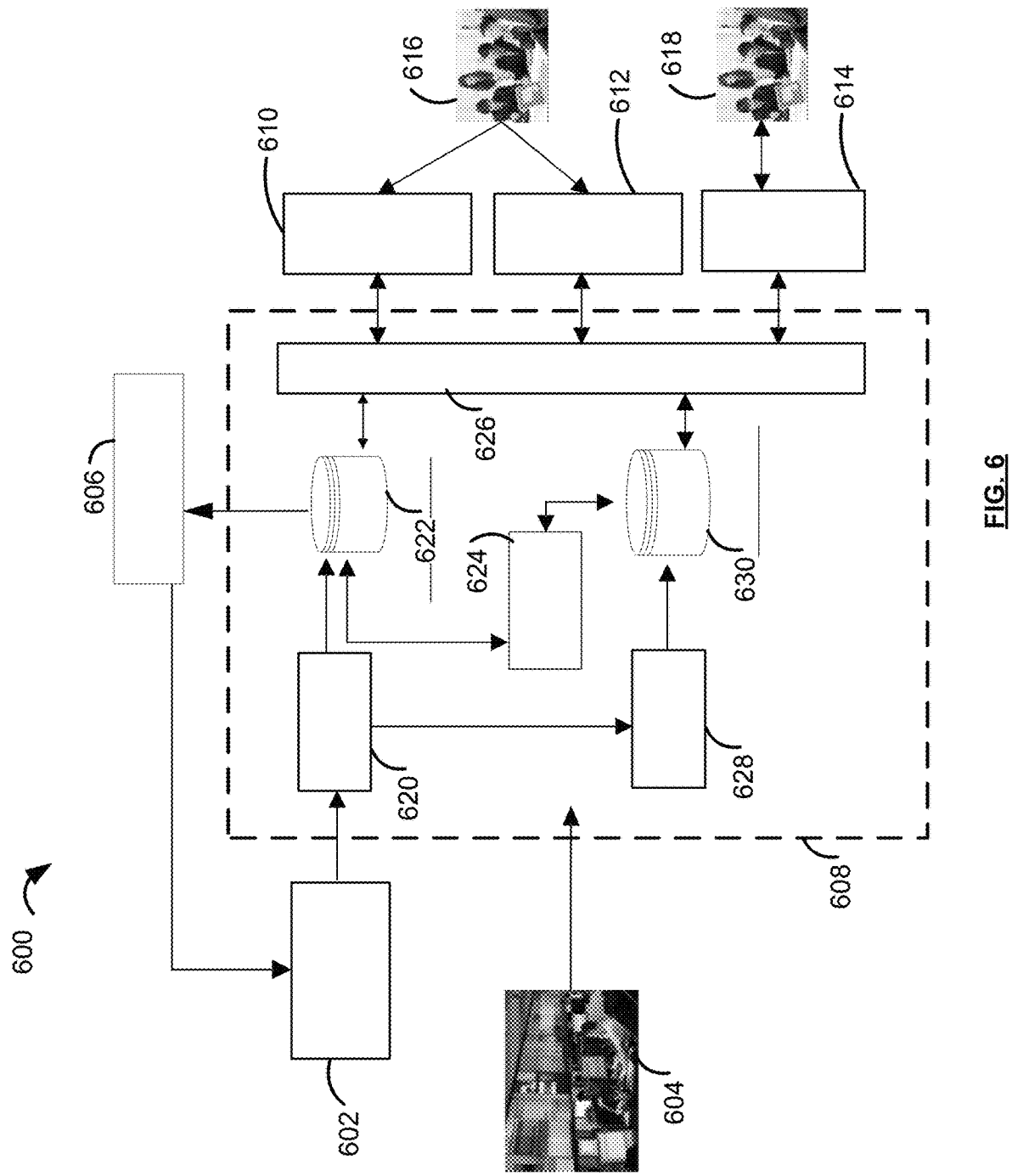
FIG. 6 is a system diagram of a merchandise price planning system according to one or more embodiments.

Referring next to FIG. 6, which shows a high level data architecture drawing 600 for the retail planning system 100 of FIG. 1. The data platform architecture 600 includes a regular data extraction 602, a network operations team 604, retailer operational systems 606, retail data system 608, retailer workflow software 610, retail data system workflow software 612, retail system reporting software 614, workflow users 616 and reporting users 618. The network operations team 604 may configure the data architecture 600 to perform Extract Transform and Load operations for the retailers retail data. The workflow users 616 may use retailer workflow software 610 and retail data system workflow software 612 in order to affect price changes based on the retail pricing plan received from the retail data system 608. The reporting users 618 may use the retail data system workflow software 612 and retail system reporting software 614.

The retail data system 608 may include an ETL component 620, one or more analytic databases 622, a data staging (i.e. Enterprise Data Warehouse or EDW) component 628, a computational platform 624, a data Application Programming Interface (API) service 626 and one or more reporting databases 630.

In one or more embodiments, the computational platform 624 may comprise a parallel computing architecture implemented in computer hardware and software and including MPI's (Message Passing Interfaces). The computational platform 624 may comprise one or more GPU's (Graphical Processing Units) configured to provide parallel computer processing functions. In one or more embodiments, the intelligent agent module 400, as described above with reference to FIG. 4, may be configured to run on the computational platform 624.

Referring to FIG. 6, the data system 608 may be configured with an input interface at the ETL component 620, and an output API service 626. The input interface 620 may be configured to provide an interface for receiving "retail data" from the client operational systems, i.e. the retailer system 204 (see FIG. 2A). The retail data may be received as regular data extract 602 at a regular interval. The output interface 626 may be coupled to the client operational systems of a retailer, for example, the retailer operational computer system 240 (see FIG. 2A). The output port 626 may be configured to output the retailer product plan generated by the intelligent agent module 400, and other product pricing, product forecasting or product promotional plans.

As shown in FIG. 6, the ETL module 620 may receive a data extraction 602 from one or more of the client operational systems. The ETL component 620 may be configured to receive retail data and information from the client, for example, on a near real-time, daily or weekly basis. The ETL module 620 may be configured to provide pre-processing of the extracted retailer data, which may then be routed to the data staging (Enterprise Data Warehouse) module 628. ETL data flow according to one or more embodiments may be described in more detail below with reference to FIG. 8. The enterprise data warehouse component 628 may comprise a repository for storing data from a number of sources. A data warehouse according to one or more embodiments may be described in more detail below with reference to FIG. 9. The data extracted from the client operational systems may also comprise feedback data and/or results (for example, as described above for the intelligent agent module 400). According to one or more embodiments, the ETL module 620 may be configured to route this data to the analytic database 622.

According to one or more embodiments, the data flow architecture 600 includes a web service indicated by reference 626. The web service 626 may further be configured to provide a web-based interface for users and/or administrators. According to one or more embodiments, the web service 626 may be configured to provide a web-based interface, i.e. available to a user in a browser such Google Chrome or Safari, and may comprise a reporting system interface 614, an workflow software interface 612 and a client workflow software interface 610. The reporting system interface 614 may be configured to provide management reporting functions, business intelligence reporting functions and/or financial planning reporting functions.

Figure 8:
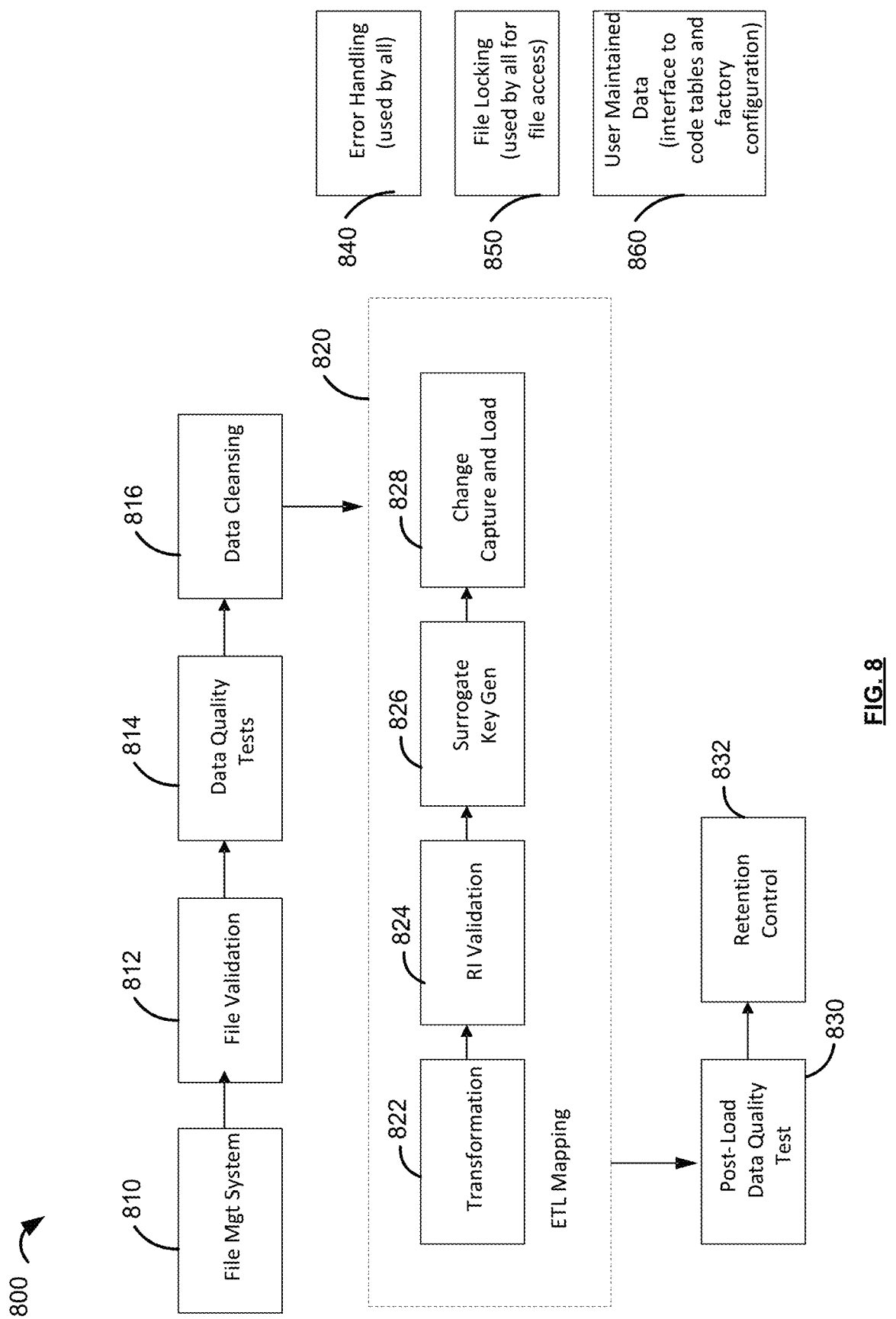
FIG. 8 is an Extract, Transform, Load (ETL) data flow for the retail merchandise price planning system according to one or more embodiments.

Referring next to FIG. 8, there is an Extract, Transform, Load (ETL) data flow 800 for the retail price planning system. The data flow 800 may be for the ETL module 620 and the data system 610 of FIG. 6. The data flow process 800 may comprise a file management module or function 810, a file validation module or function 812, a data quality testing module or function 814, a data cleansing module or function 816, an ETL mapping module 820. The data flow process 800 may include a post-load data quality testing module 830 and a retention control module 832.

The file management component 810 may be configured to operate under stored program control on a computer and execute the following functions:

build an expected source files list
    compare files received to the expected source files list
    verify that files have been received (optionally)
    alert operators if files are missing or received in error
    log (operational metadata) when files arrive and the associated processing status
    implement file acceptance logic In one or more embodiments, the file management module 810 (and the file validation module 812 and the data quality testing module 814) may be configured to accept one file per day per source file type. Multiple files of the same type received from a source within a defined time frame may be rejected if a file has already been accepted and received.

Files received with a future date or a date more than X days in the past will be rejected. Where x is stored in the metadata (e.g. 16 days from current).

The file validation module 812 may be configured to operate under stored program control on a computer and execute the following validation functions:
- the existence of mandatory fields and segments (e.g. headers and trailers)
- internal structural file integrity checks (e.g. file record counts matching header record count value)
- absence of extraneous data
- comparison of file row counts to the value stored in the trailer record
- data type checking by column (can be moved to DQ when implementing)
- validate the specified record count against the actual received record count
- validate source system code
- validate the source system table
- checksum if the source file has an external to firewall origination.
- compare file name date and time with the extract date and time in the header record to ensure data content matches file name.
- compare the header and trailer records for extract date, time and system The data quality testing module 814 may be configured to operate under stored program control on a computer and execute the following testing functions:
- perform file quality checks that identify files that are accepted for downstream ETL processing; identify files that are rejected based on thresholds stored in the Entity table of the metadata.
- perform Row/Column quality checks which will identify data rows within files that are:
  - accepted for downstream ETL processing
  - rejected and will not be forwarded for downstream processing. Once a row has been identified as a rejected row, it will be:
    - written out to a rejected row file
    - logged in metadata at a summary level
    - identified with a warning indicator in the operational metadata logs; the warning identified data rows will remain in the data file so that downstream data cleansing will provide a pre-described response to the warning condition
- the post-load data quality tests 830 may include:
  - domain Checking—for the data content of a column against a list of known values for the column. (e.g. The valid values for a product status are A—Active, I—Inactive, or T—Temporary) if any value isn't in the domain then an exception condition is created
  - range Checking that the data content of a column falls within a given range of values specified by a maximum, minimum or both The data cleansing module 812 may be configured to operate under stored program control on a computer and using the test results from the data quality testing module 814 to execute the following functions:
- perform Row Warning processing
  - replace row attributes identified in the data quality testing with business supplied replacement values
  - perform Data Standardization attribute updates (e.g. customer comes from more than 1 source system and both systems have a customer status code; for enterprise consistency only a single standard code will exist in the EDW
  - data formatting (e.g. Date in consistent form)
- produce data cleansing operational metadata
  - number and type of substitutions
  - number and type of data standardizations In one or more embodiments, rejected files may be re-introduced into the processing stream if they have been approved for processing by the users.

As shown in FIG. 8, the ETL Mapping module 820 may comprise a transformation module or function 822, a RI validation module or function 824, a surrogate key generation module or function 826 and a change capture and load module or function 828.

The transformation module 822 may be configured to operate under stored program control on a computer to execute the following data transformation functions:
- application of all defined business transformation rules for the given input files
- transformation of the validated source files into load-ready files
- for each defined filter criteria, apply the condition to the validated source file, preserve the rows filtered out and log the count The surrogate key generation module 826 may be configured to operate under stored program control on a computer and execute the following functions:
- permanently assign a surrogate key value to an entity for each distinct natural key provided for that entity
- to enable multiple ETL processes to use the same processing logic for surrogate key generation, by using the file locking common component just as a file would be locked
- for each distinct logical entity, this process will maintain a separate cross-reference table in the EDW database that will record the relationships between natural and surrogate key values The change capture and load module 828 may be configured to operate under stored program control on a computer and execute the following functions:
- compare transformed input data to existing data in Slowly Changing Dimension (SCD) Type 2 target tables
- rows that are unchanged between the target table and source extract will not be modified
- insert new rows
- preserve history, the old row will be updated to set the expiry date to the extract date—1
- rows that have been deleted from source system will not be physically deleted from the EDW table. To preserve history, these rows will be updated to set the expiry date to the extract date—1

The output from the ETL mapping module 820 may then be processed by the post-load data quality testing module 830 and the retention control module 832.

The retention control module 832 may be configured to operate under stored program control on a computer to execute the following functions:
- export fact type data only from the EDW database to files that are stored in the archiving directory when data in the table has expired dates greater than the retention period specified for the table
- copy files from the archive directories to tape, confirming the copy and removing the files from the archiving directories The data flow process 800 may further comprise an error handling module or function 840, a file locking module or function 850 and a user maintained database interface 860. The modules may comprise functions that can be called or invoked by the other modules in the data flow process 800.

Figure 9:
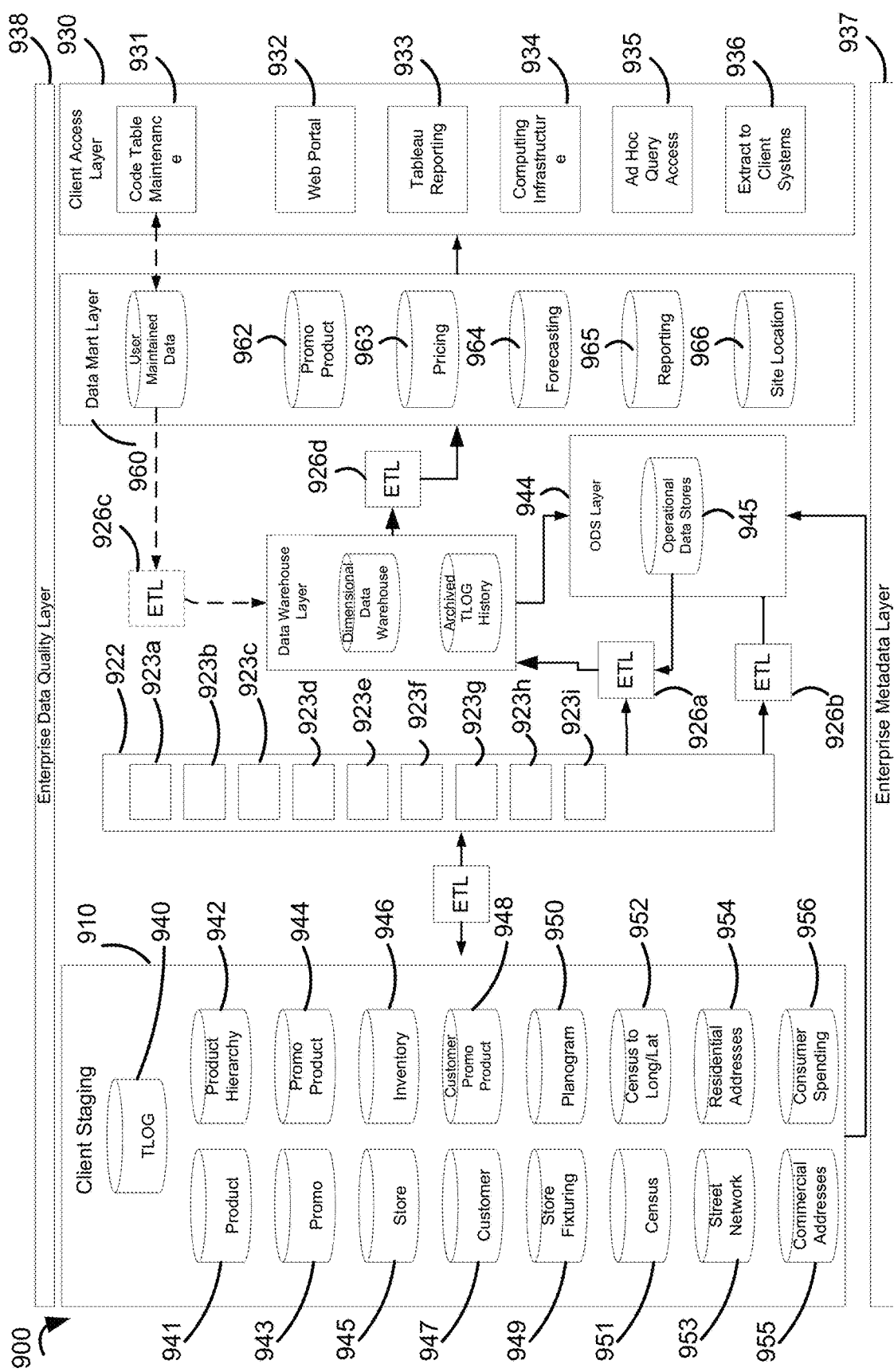
FIG. 9 is an architecture drawing of a data warehouse for the retail merchandise price planning system according to one or more embodiments.

The error handling or exception processing module 840 may be configured to operate under stored program control on a computer and execute the following functions:
    facilitate exception logging for all EDW processing
    minimize the hard coding effort by using operational metadata to drive the exception process; this minimizes code maintenance efforts
    provide a standardized recovery process for all file transformations
    provide simple notification functionality
    provide a consistent interface for exception handling
The exception processing module 840 may includes three standardized component interfaces configured to perform the following tasks:
    exception logging
    file recovery
    exception notification The file locking module 850 may be configured to operate under stored program control on a computer and execute the following functions:
    facilitate the exclusive use of a given file resource for serial file updating
    facilitate shared and consistent file read usage
    establish consistent queuing of file lock requests
    integrate with common component for exception and error handling
    the two process flows within this component are the file locking request process and the file locking release process The user maintained database interface 860 may be configured to provide the following functionality:
    a user interface to permit users controlled access to maintain select metadata
    a user interface to permit users to review rejection processing logs
    source data for EDW and ETL processing from the User Maintained Data database
    data flow between the EDW and the User Maintained Database by separate ETL processes Referring next to FIG. 9, there is shown a data warehouse architecture 900 for the retail merchandise planning system 100 according to one or more embodiments.

The data warehouse architecture 900 may comprise a client staging layer 910, a data warehouse 920 and a client access layer 930. According to one or more embodiments, the data warehouse 920 may comprise a staging layer 922, a data warehouse layer (i.e. enterprise level) 924 and a data mart layer 960. The data warehouse 920 may also include an operational data stores (ODS) layer 944. The data warehouse architecture 900 may further comprise an enterprise data quality layer 938 and an enterprise metadata layer 937.

The client staging layer 910 may comprise real-time or batch data associated with the retailer operational systems. The retailer data may comprise a transaction database or log (TLOG) 940, a product database 941, a product hierarchy database 942, a promotions database 943, a promotion products database 944, a store database 945, an inventory database 946, a customer database 947, a customer promotion products database 948, a store fixturing database 949, a planogram database 950, a census database 951, a census to longitude/latitude database 952, a street network database 953, a residential addresses database 954, a commercial addresses database 955 and a consumer spending database 956. As shown, an ETL module 959 may be used to extract or transfer data from the retailer database(s) to the staging layer 922. In one or more embodiments, the staging layer 922 may be configured for a single extract 923 per data source, indicated individually by references 923A, 923B ... 923I. Data may be selected from the staging layer 922 and transferred to the data warehouse layer 924 using an ETL module 926A. In one or more embodiments, the data warehouse layer 924 may comprise a dimensional data warehouse 941 and may also include an archived transaction log (TLOG) database 942. As described above, data from the data warehouse 924 may be processed to generate promotional product(s) planning, product pricing and/or product forecasting. The data mart layer 960 may be configured to receive the output generated from the data warehouse layer 924 via an ETL module 926D. In one or more embodiments, the data mart layer 960 comprises a promo product database 962, a product pricing database 963 and a product or sales forecasting database 964. As shown, the data mart layer 960 may also include a user maintained database 961, a reporting database 965 and/or a site location database 966.

As shown in FIG. 9, the operational data stores layer 944 may receive data from the staging layer 922 through an ETL module 926B, and may be configured to provide one or more of the following functions: batch scoring; real-time scoring; batch reporting; and/or near-time reporting.

The client access layer 930 may be configured to provide access to the data mart layer 960. In one or more embodiments, the client access layer 930 may comprise a web portal 932, a tableau reporting module 933, a computing infrastructure access module 934, an Ad Hoc query access module 935 and an extract to client system access module 936. The client access layer 930 may also include a code table maintenance access module 931.

Figure 11:
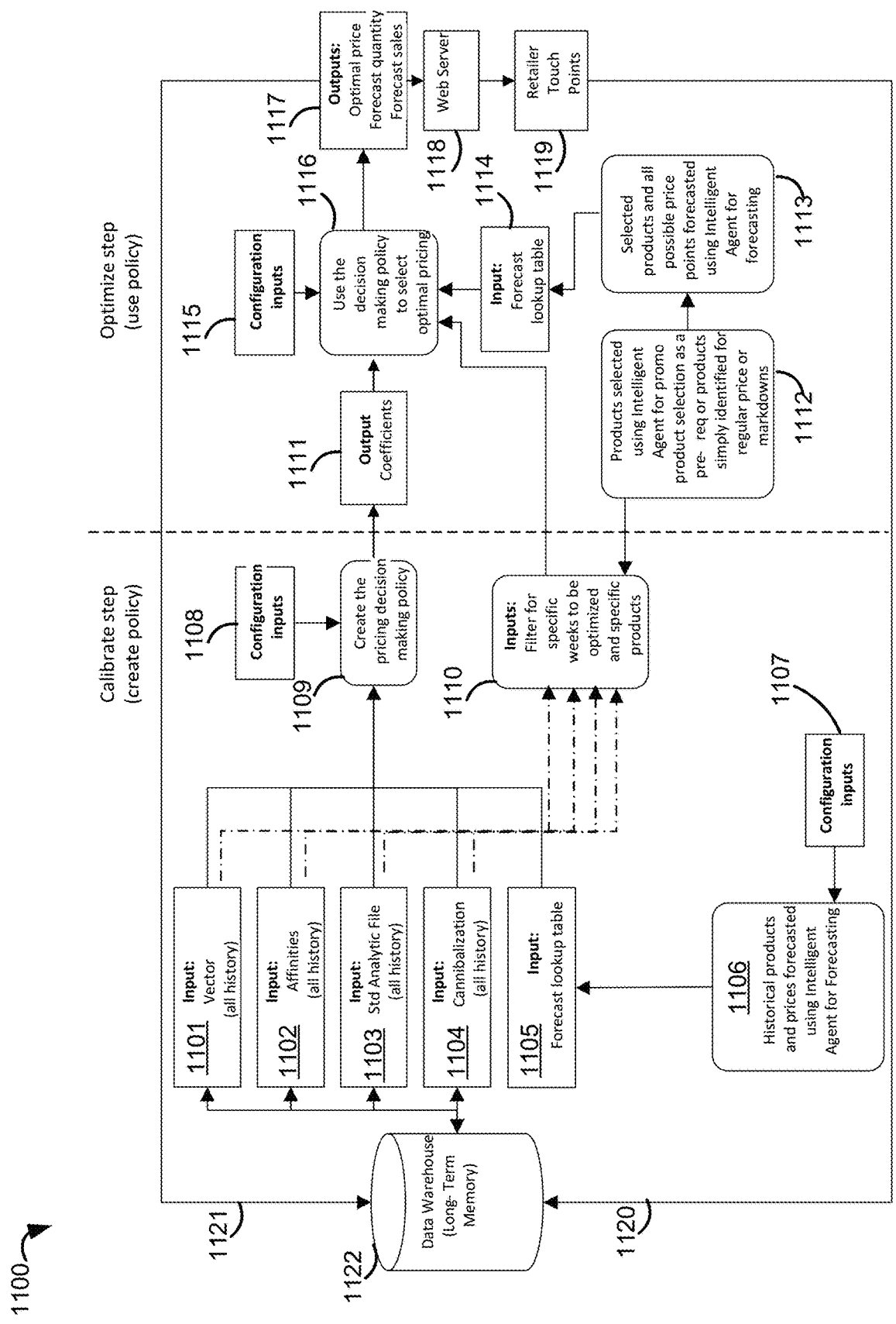
FIG. 11 shows a method diagram of a price optimization control process flow for the intelligent agent module according to one or more embodiments.

Referring next to FIG. 11, which shows in more detail the process or control flow 1100 for the intelligent agent module 400 (see FIG. 4) according to one or more embodiments. The control process 1100 may be executed by the intelligent agent module as described above and may comprise generating a model or simulated model of the retailer or retailer environment used as a pricing decision policy 1109. The retail pricing decision policy function 1109 may receive a vector input 1101, an affinities input 1102, a cannibalization input 1104, a forecast lookup table input 1105 (created by forecasting selected products using an intelligent agent for forecasting with its configuration inputs 1107) and a configuration data input 1108, generated for example as described above. For instance, the control server may be configured using the data input 1108 to execute steps 504, 506 and 508 (FIG. 5A) to determine the coefficients for Equation (1) with the constraints of Equation (2) as described above. The retailer pricing decision policy function 1109 may also receive as an input a standard analytics file, as shown in FIG. 31 and indicated by reference 1103. The retail state model function 1109 may be executed, including for example, executing Equation (1) as described above, and may generate a decision making policy for pricing also described above and indicated by reference 1111. The next step as indicated by reference 1116 may comprise executing a function to use the decision making policy based on constraints/configuration data 1115, for example, the control server may solve Equation (1) using a genetic algorithm to determine the solution vector p; as described above for steps 510 and 512 in FIG. 5A. The vector input 1101, Affinities 1102, standard analytic file 1103, Cannibalization 1104, and forecast lookup table 1113 may be filtered by function 1110 for the specific weeks and products whose price is being simulated/selected; the products may be selected by the intelligent agent for promo product selection in the case of promotional pricing or a selection of products for regular pricing or products with excess inventory for markdown pricing. An intelligent agent for forecasting may forecast allowable prices for the products and time periods in question to also be used as input 1113 for decision making policy function 1116. The output 1117 generated by the decision making policy function 1116 may comprise product prices, product quantity forecasts, product price increments and sales/gross margin/transaction forecast, and may be transmitted by 1121 to long term memory 414 (see FIG. 4) as described above.

As described above, the selected price plan 1117 may comprise step 518 (FIG. 5A) which may be generated or provided to an output to the web server 214 (FIG. 2A) for the retailer system 204 (FIG. 2A). The selected action plan 1117 may be accessible by a client system via a Web server as indicated by reference 1118. The results of executing and/or applying the selected actions plan by the retailer may be applied to a retail touch points function 1119 which may be configured to generate input(s) for a feedback loop as described above, and which is indicated generally by reference 1120.

Figure 10A:
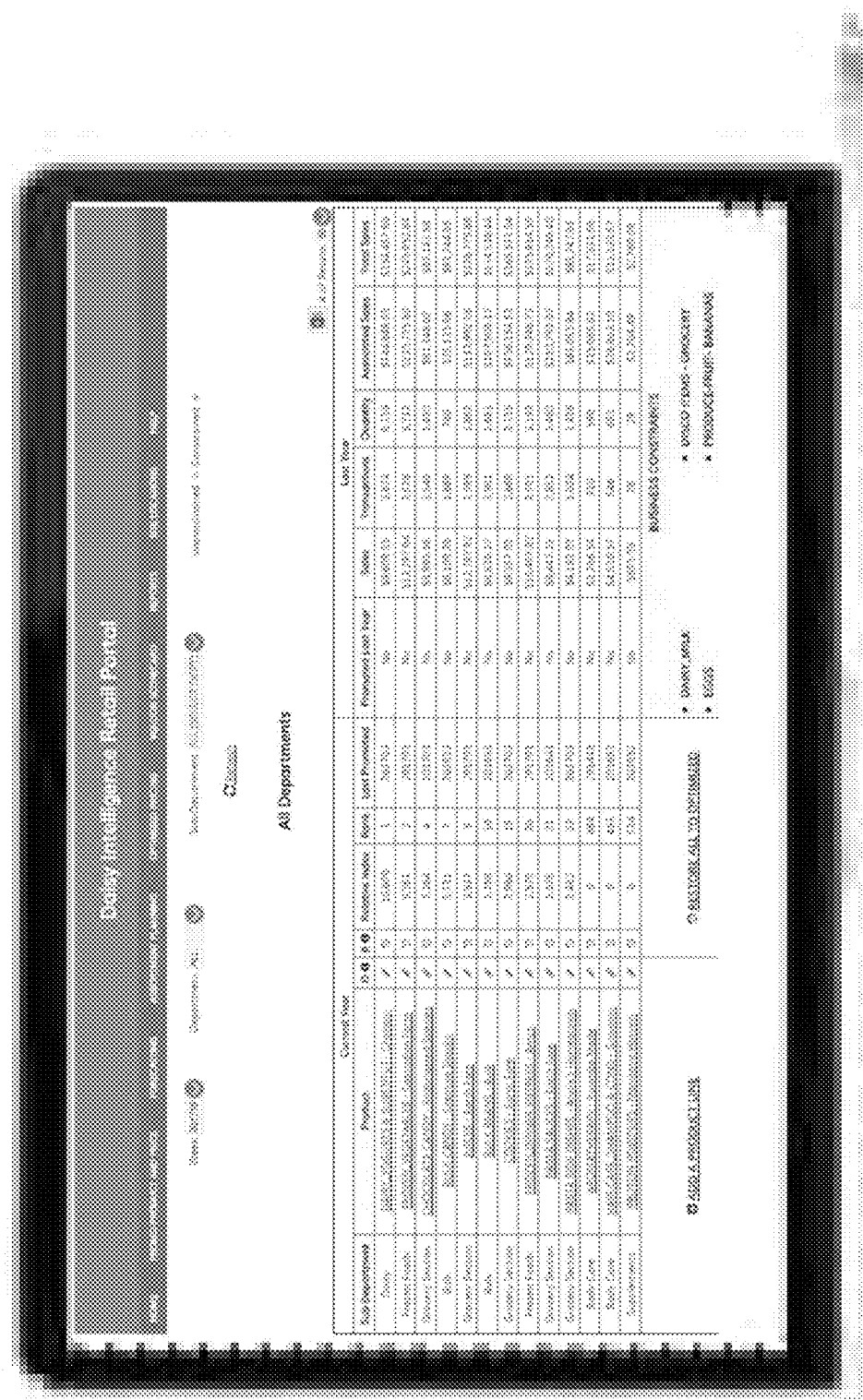
FIG. 10A shows a user interface diagram of a web portal for accessing an output retail price plan according to one or more embodiments.

Reference is next made to FIG. 10A, which shows a user interface diagram 1000 of a web portal for accessing an output retail price plan according to one or more embodiments. The web portal 1000 may be configured to provide web based, i.e. browser, access to the output retail plan generated for a retailer as described above. In one or more embodiments, the web portal 1000 may be configured to generate and display a weekly promotions and recommendations web page based on the output retail plan for a retailer. In one or more embodiments, the web page 1000 may be configured to provide a constrained view of promotions based on parameters defined for the output retail plan. In one or more embodiments, the web page 1000 may be configured to provide an unconstrained view comprising upside promotions and/or recommendations not considered per se in the output retail plan. In one or more embodiments, the web page 1000 may be configured for a pre-determined, e.g. current, planning cycle. In one or more embodiments, the web portal 1000 may comprise an archive function storing and searching weekly recommendation and promotional pages.

Figure 10B:
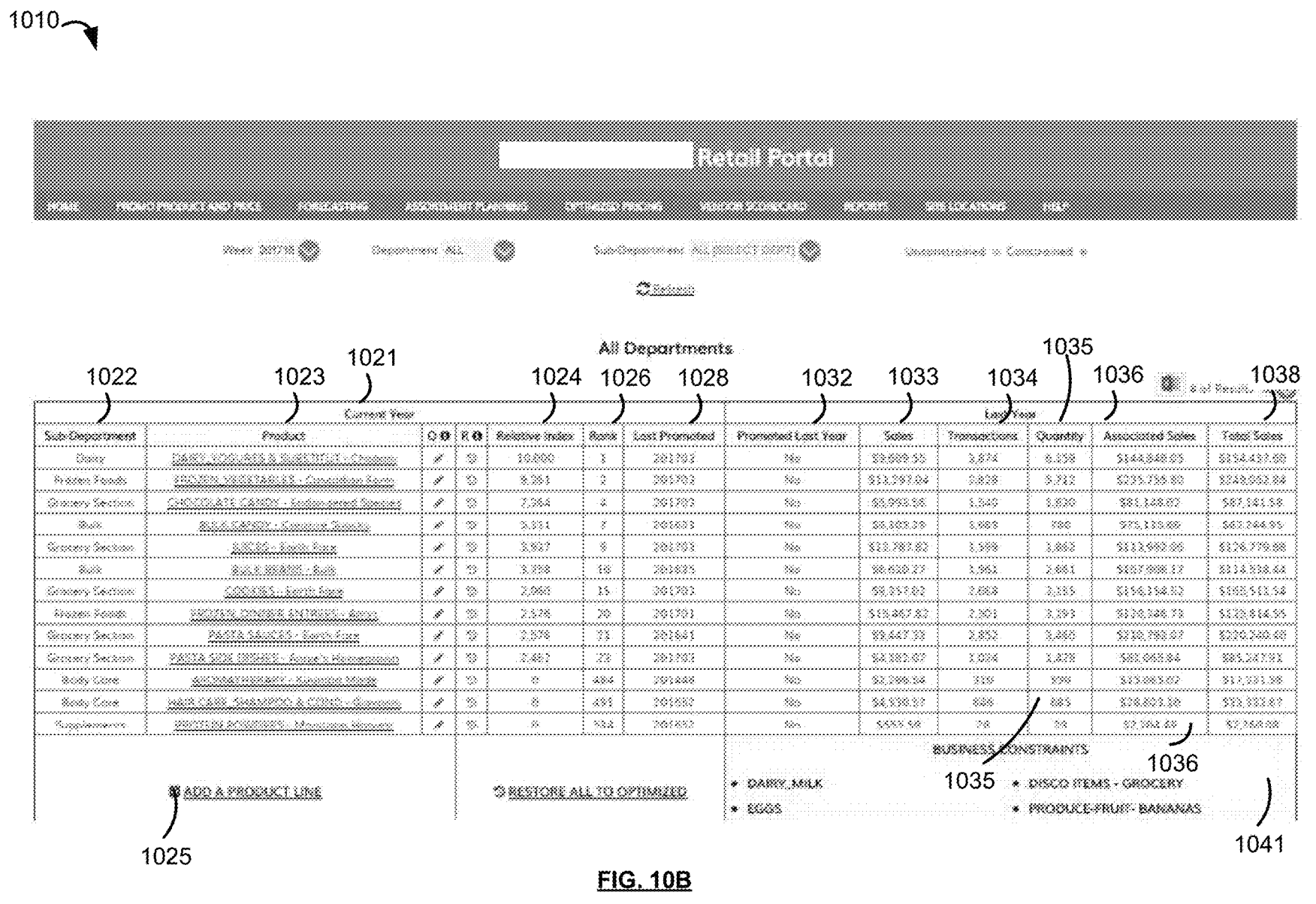

Reference is next made to FIG. 10B which shows a user interface diagram 1010 of an output retail price plan generated according to one or more embodiments. In one or more embodiments, the output retail plan web page 1010 may be generated at a retailer level and may include "All Departments" for the retailer. The web page 1010 may comprise a "Current Year" display grid 1021 and a "Last Year" display grid 1031. In one or more embodiments, the Current Year display grid 1021 may comprise a "Sub-Department" column 1022, a "Product" column 1023, a "Relative Index" column 1024, a "Rank" column 1026, and a "Last Promoted" column 1028. The Last Year display grid 1031 may comprise a "Promoted Last Year" column 1032, a "Sales" column 1033, a "Transactions" column 1034, a "Quantity" 1035, an "Associated Sales" column 1036 and a "Total Sales" column 1038.

In one or more embodiments, the Relative Index column 1024 may be configured to illustrate or show the relative strength of one product recommendation over another product recommendation. The Rank column 1026 may be generated as described above, and provides the retailer with a ranked list of products for promotion and/or driving sales. According to this aspect, the rankings may provide a visual reference to assist the retailer in making promotional choices on a product and/or departmental basis. In one or more embodiments, the Product column 1025 for the retail plan web page 1010 may be configured with active links, e.g. HTML links, that allow a user, e.g. a retailer, to 'click' a product link and access further information, i.e. "drill down", associated with the product. In one or more embodiments, the product entry links may be configured to display additional product information and/or SKU's for the product. In one or more embodiments, the output retail plan web page 1010 may include an "ADD A PRODUCT LINK" 1025, which may be configured to allow a user, e.g. the retailer, to add another product to the retail plan 1010, and populate the associated columns, i.e. Relative Index 1024, Rank 1026 and Last Promoted 1028. According to one or more embodiments, the output retail plan web page 1020 may be configured with one or more business constraints indicated generally by reference 1041. In one or more embodiments, the business constraints window 1041 may provide a quick reference view of business constraints considered in the generation of the output retail plan, for example, as described in more detail above.

Figure 10C:
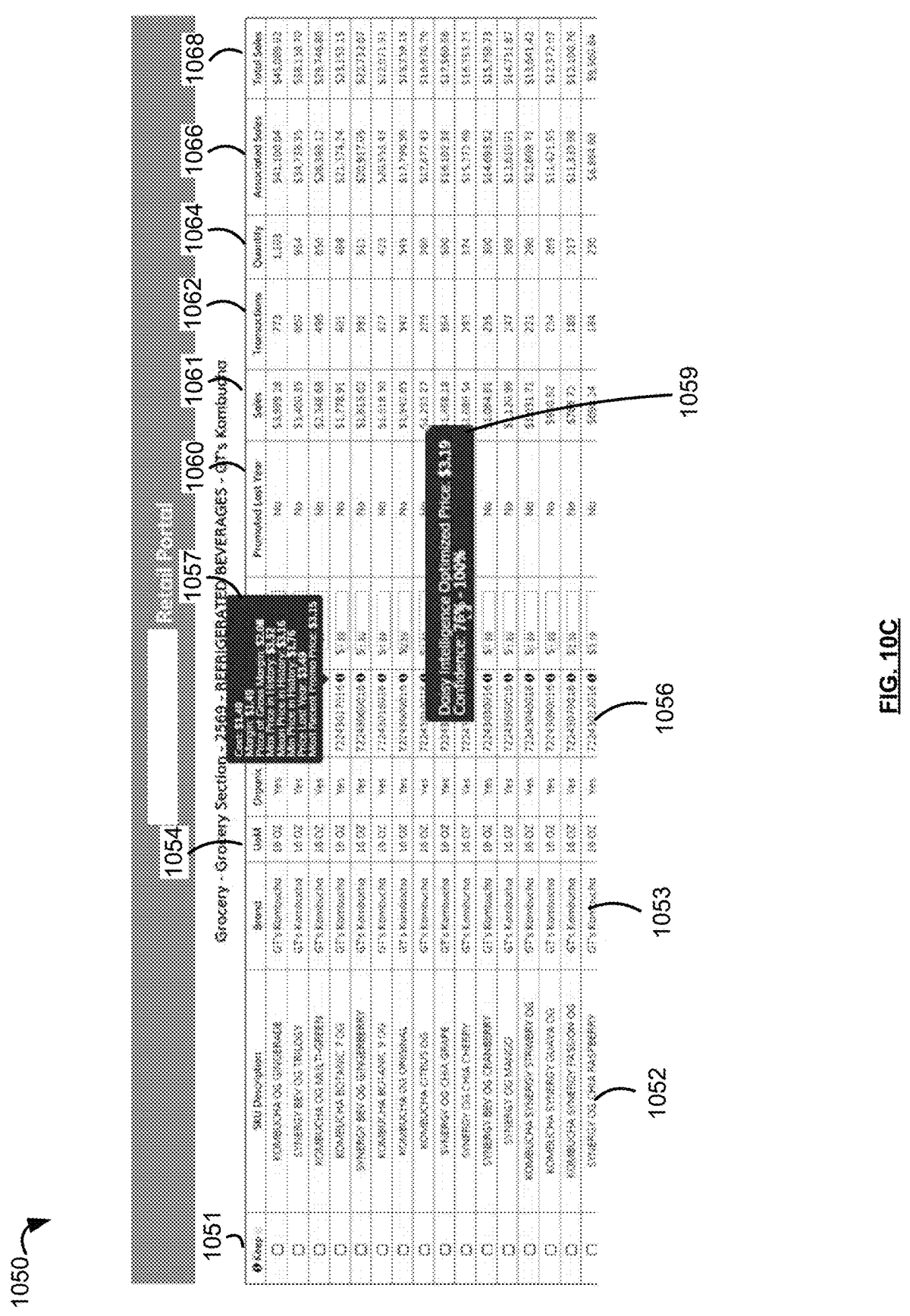

Reference is next made to FIG. 10C which shows a user interface diagram 1050 of an output retail price plan generated according to one or more embodiments. As shown, the output retail web page 1050 may be generated at the product level and includes a "Product Name" column 1052, a "Product Brand" column 1053, a "UoM" (Unit of Measurement) column 1054, a "Pricing History" column 1056, a "Selected Price" column 1058, and a "Promoted Last Year" column 1060. According to another aspect, the output retail plan page 1050 may be configured with a "Keep" column 1051, which may allow the retailer or merchant to select which specific product(s), i.e. SKU(s), to keep in the retail plan.

According to one or more embodiments, the Pricing History column 1056 may be configured to provide the retailer or merchant with a 'pop-up' window 1057 that may comprise a history of prices which can be compared to the selected or recommended price that is generated (for example, as described above) and presented for each product in the Selected Price column 1058. The selected price according to one or more embodiments may comprise the selected price as calculated above, subject to parameters such as target margin, price ladder constraints, as described above. According to another aspect, the selected price for each product may be configured with a 'pop-up' window 1059 that includes a "Confidence Level" indicator, e.g. 76%-100%, which may be calculated based on amount of historical price variation that exists for each SKU.

In one or more embodiments, the retail plan web page 1050 may be configured with historical data to provide the retailer or merchant with a benchmark for comparing expected outcomes based on last year's prices or sales. In one or more embodiments, the web page 1050 may comprise a "Sales" column 1061, a "Transactions" column 1062, a "Quantity" column 1064, an "Associated Sales" column 1066 and a "Total Sales" column 1068.

Figure 10D:
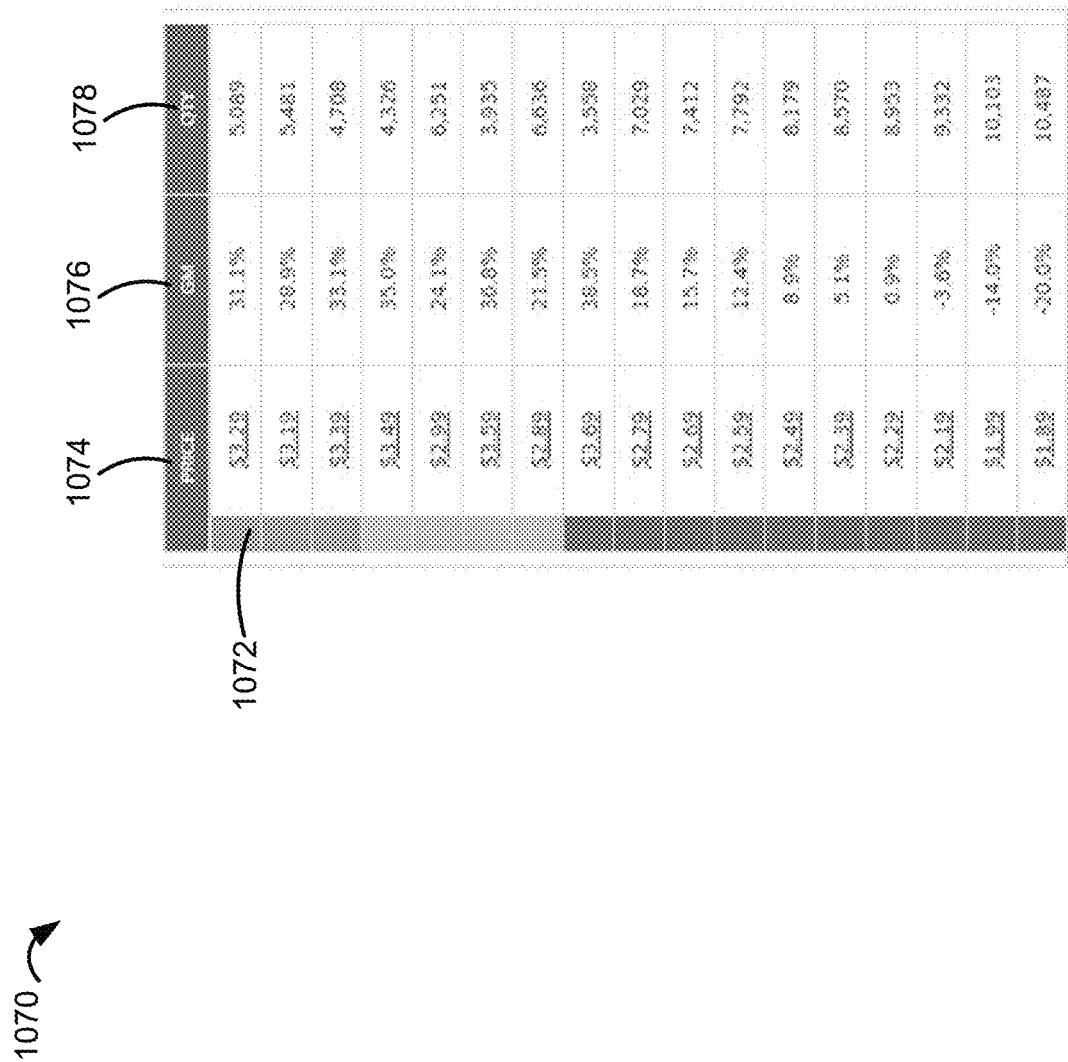
FIG. 10D shows a portion view of a user interface diagram of an output retail price plan generated according to one or more embodiments.

Referring next to FIG. 10D, there is a shown a portion view 1070 of a user interface diagram of an output retail price plan generated according to one or more embodiments. The portion view 1070 shows a user interface provided to a user for viewing or editing a retail pricing plan for a product. The portion view 1070 includes a ranking column 1072, price column 1074, gross margin column 1076 and a forecast quantity 1078. For each pricing point simulated by the intelligent agent 400 (see FIG. 4), a ranking 1072 is determined along with a gross margin 1076 and a forecasted quantity 1078. The ranking 1072 may be displayed as an indexed value, i.e. red—bad, yellow—acceptable, green— good. The relative index may also be a numerical value. Alternatively, the ranking 1072 may be provided as a numerical ranking as described above. The portion view 1070 may have links for each of the price points, allowing a user to modify a price point for a product and select from a ranked list of other available price points.

I claim:

1. A method of generating an electronic retail price model and a selected control policy, the electronic retail price model and the selected control policy for generating an electronic retail price plan for retail operations performed within an enterprise network comprising a plurality of distributed computing devices, the plurality of distributed computing devices comprising a plurality of point-of-sale devices and a plurality of enterprise servers, the plurality of distributed computing devices in network communication, comprising:

receiving, at a first server of the plurality of enterprise servers, transaction data from the plurality of point-of-sale devices, the transaction data defined as a time series including a plurality of transaction data items corresponding to one or more previous time periods, the plurality of transaction data items comprising at least one of price data, product data, and customer data;

providing, at the first server, an intelligent agent configured to operate in an operational control loop and a simulated control loop, the intelligent agent comprising:

a memory component comprising a short-term memory, the short-term memory storing one or more simulated system states and one or more simulated system rewards, and a long-term memory, the long-term memory storing a plurality of long-term sensor data; and a simulation component to simulate an operational system of the operational control loop;

determining, by the intelligent agent, transformed transaction data including a power spectrum of the time series transaction data, the power spectrum comprising a vertical axis of amplitude and a horizontal axis of frequency and the transformed transaction data indicating gross or aberrant trends in the transaction data;

determining, by the intelligent agent, one or more features from the transformed transaction data;

determining, by the intelligent agent, one or more actionable features from the one or more features;

generating an electronic retail price model of the intelligent agent from the one or more actionable features;

selecting a selected control policy for the electronic retail price model;

executing a reinforcement learning algorithm to simulate, at the simulation component of the intelligent agent, a plurality of simulated pricing decisions based on the electronic retail price model and the selected control policy to update the one or more simulated system states and the one or more simulated system rewards;

receiving, at the intelligent agent, the updated one or more simulated system states and the updated one or more simulated system rewards from the simulation component of the intelligent agent;

receiving, at the intelligent agent, a measured state of the operational system and a measured reward of the operational system;

correcting, using the reinforcement learning algorithm, the one or more simulated system states based on the measured state of the operational system and the measured reward of the operational system; and determining, by the intelligent agent operating in the operational control loop, the electronic retail price plan based on the one or more simulated system states and the one or more simulated system rewards.

2. The method of claim 1, further comprising:
transmitting the electronic retail price model to a second server in the plurality of enterprise servers.

3. The method of claim 2, wherein the determining the one or more features from the transformed transaction data further comprises:

determining at least one of a plurality of cannibalization matrices, a plurality of cadence matrices, or a plurality of affinity matrices.

4. The method of claim 3, further comprising:

the determining, at the first server, transformed transaction data based on the transaction data further comprises:

sorting the transaction data into a first transaction set and a second transaction set, wherein the transformed transaction data further comprises a first transaction set comprising transactions having one or more promotional products, and a second transaction set comprising transactions having one or more non-promotional products.

5. The method of claim 4, further comprising:

sorting the first transaction set into a promoted products set, a promoted item associated product set, and an associated product set;

wherein the first transaction set comprises the promoted products set, the promoted item associated product set, and the associated product set.

6. The method of claim 5, wherein the determining the transformed transaction data further comprises:

determining one or more transaction values of the transaction data for each of the two or more previous time periods.

7. The method of claim 6, wherein the selecting the selected control policy further comprises:

executing a reward function based on the retail data for each time period in the one or more time periods; and selecting one or more coefficients that maximize the output of the reward function for the one or more time periods.

8. A system for generating a retail price model and a selected control policy, the electronic retail price model and the selected control policy for generating an electronic retail price plan for retail operations performed within an enterprise network comprising a plurality of distributed computing devices, the plurality of distributed computing devices comprising a plurality of point-of-sale devices and a plurality of enterprise servers, the plurality of distributed computing devices in network communication, comprising:

a memory, the memory comprising:

transaction data from the plurality of point-of-sale devices, the transaction data defined as a time series including a plurality of transaction data items corresponding to one or more previous time periods, the plurality of transaction data items comprising at least one of price data, product data, and customer data;

a short-term memory storing one or more simulated system states and one or more simulated system rewards;

a long-term memory storing a plurality of long-term sensor data; and an intelligent agent module comprising a simulation component;

a processor in communication with the memory, the processor configured to:
  determine transformed transaction data including a power spectrum of the time series transaction data, the power spectrum comprising a vertical axis of amplitude and a horizontal axis of frequency and the transformed transaction data indicating gross or aberrant trends in the transaction data by,
    determining one or more transaction values of the transaction data for each of the two or more previous time periods,
  determine one or more features from the transformed transaction data;
  determine one or more actionable features from the one or more features;
  generate an electronic retail price model from the one or more actionable features;
  store the electronic retail price model in the memory;
  select a selected control policy for the retail promotional model, by,
    executing a reward function based on the retail data for each time period in the one or more time periods; and
    selecting one or more coefficients that maximize the output of the reward function for the one or more time periods,
  store the selected control policy in the memory;
  simulate, using the simulation component, a plurality of simulated pricing decisions based on the electronic retail price model and the selected control policy to update the one or more simulated system states and the one or more simulated system rewards;
  receive, the updated one or more simulated system states and the updated one or more simulated system rewards from the simulation component;
  receive, a measured state of an operational system and a measured reward of the operational system;
  correct, at the intelligent agent, the one or more simulated system states based on the updated one or more simulated system states, the measured state of the operational system, the updated one or more simulated system rewards and the measured reward of the operational system; and
  determine the electronic retail price plan based on the one or more simulated system states and the one or more simulated system rewards.

9. The system of claim 8, wherein the processor is further configured to:
  transmit, using a network interface in communication with the processor, the electronic retail price model to a second server in the plurality of enterprise servers.

10. The system of claim 9, wherein the processor is further configured to:
  determine at least one of a plurality of cannibalization matrices, a plurality of cadence matrices, or a plurality of affinity matrices; and
  store the at least one of a plurality of cannibalization matrices, a plurality of cadence matrices, or a plurality of affinity matrices in the memory.

11. The system of claim 10, wherein the processor is further configured to:
  determine, at the first server, transformed transaction data based on the transaction data further comprises:
    sorting the transaction data into a first transaction set and a second transaction set;
  wherein the transformed transaction data further comprises a first transaction set comprising transactions having one or more promotional products, and a second transaction set comprising transactions having one or more non-promotional products.

12. The system of claim 11, wherein the processor is further configured to:
  sort the first transaction set into a promoted products set, a promoted item associated product set, and an associated product set;
  wherein the first transaction set comprises the promoted products set, the promoted item associated product set, and the associated product set.

* * * * *